(12) United States Patent
Perry et al.

(10) Patent No.: US 9,087,164 B2
(45) Date of Patent: *Jul. 21, 2015

(54) VISUALIZATION OF TRADEOFFS BETWEEN CIRCUIT DESIGNS

(75) Inventors: Jeffrey R. Perry, Cupertino, CA (US); Khanh Nhat Vo, Milpitas, CA (US); Dien Mac, San Jose, CA (US); Martin Garrison, San Jose, CA (US); Phil Gibson, Sunnyvale, CA (US)

(73) Assignee: NATIONAL SEMICONDUCTOR CORPORATION, Santa Clara, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 12/869,201

(22) Filed: Aug. 26, 2010

(65) Prior Publication Data

US 2010/0325599 A1 Dec. 23, 2010

Related U.S. Application Data

(63) Continuation-in-part of application No. 12/020,535, filed on Jan. 26, 2008, now Pat. No. 7,966,588.

(51) Int. Cl.
*G06F 17/50* (2006.01)
*G06F 19/00* (2011.01)

(52) U.S. Cl.
CPC ............ *G06F 17/50* (2013.01); *G06F 2217/70* (2013.01); *G06F 2217/78* (2013.01); *G06F 2217/80* (2013.01)

(58) Field of Classification Search
CPC . G06F 17/50; G06F 2217/70; G06F 2217/78; G06F 2217/80
USPC ......... 716/106, 110, 111, 112, 132, 136, 138, 716/139; 700/97, 103, 105, 108
See application file for complete search history.

(56) References Cited

U.S. PATENT DOCUMENTS

| 3,628,004 A | 12/1971 | Claxton |
| 4,546,434 A | 10/1985 | Gloello |

(Continued)

FOREIGN PATENT DOCUMENTS

| EP | 0 302 843 A2 | 2/1989 |
| EP | 0 520 927 A3 | 12/1992 |

(Continued)

OTHER PUBLICATIONS

Non-Final Office Action dated Dec. 29, 2011 for U.S. Appl. No. 13/104,552.

(Continued)

*Primary Examiner* — Helen Rossoshek
(74) *Attorney, Agent, or Firm* — Andrew Viger; Frank D. Cimino

(57) ABSTRACT

A system may include a database configured to store information including characteristics of a plurality of components. The system may further include a server in communication with the database and configured to receive design requirements indicative of desired power supply designs; query the database for components that satisfy the design requirements; determine a plurality of power supply designs in accordance with the components and the design parameters; determine key parameters of at least a subset of the determined power supply designs; and rank the power supply designs.

17 Claims, 12 Drawing Sheets

(56) References Cited

U.S. PATENT DOCUMENTS

| | | |
|---|---|---|
| 4,703,423 A | 10/1987 | Bado et al. |
| 5,138,657 A | 8/1992 | Colton et al. |
| 5,173,051 A | 12/1992 | May |
| 5,206,804 A | 4/1993 | Thies |
| 5,293,479 A | 3/1994 | Quintero et al. |
| 5,513,116 A | 4/1996 | Buckley |
| 5,550,746 A | 8/1996 | Jacobs |
| 5,592,511 A | 1/1997 | Schoen |
| 5,615,342 A | 3/1997 | Johnson |
| 5,666,215 A | 9/1997 | Fredlund et al. |
| 5,708,798 A | 1/1998 | Lynch et al. |
| 5,745,765 A | 4/1998 | Paseman |
| 5,751,829 A | 5/1998 | Ringland |
| 5,825,651 A | 10/1998 | Gupta et al. |
| 5,838,965 A | 11/1998 | Kavanagh et al. |
| 5,850,539 A | 12/1998 | Cook |
| 5,859,414 A | 1/1999 | Grimes et al. |
| 5,870,719 A | 2/1999 | Maritzen |
| 5,870,771 A | 2/1999 | Oberg |
| 5,897,622 A | 4/1999 | Blinn et al. |
| 5,948,040 A | 9/1999 | DeLorme |
| 6,038,546 A | 3/2000 | Ferro |
| 6,052,669 A | 4/2000 | Smith |
| 6,064,982 A | 5/2000 | Puri |
| 6,083,267 A | 7/2000 | Motomiya et al. |
| 6,108,640 A | 8/2000 | Slotznick |
| 6,110,213 A * | 8/2000 | Vinciarelli et al. ............ 703/1 |
| 6,125,353 A | 9/2000 | Yagasaki |
| 6,167,383 A | 12/2000 | Henson |
| 6,169,992 B1 | 1/2001 | Beall et al. |
| 6,206,750 B1 | 3/2001 | Barad |
| 6,215,506 B1 | 4/2001 | Makino |
| 6,223,094 B1 | 4/2001 | Muehleck |
| 6,247,128 B1 | 6/2001 | Fischer |
| 6,275,225 B1 | 8/2001 | Rangarajan |
| 6,275,869 B1 | 8/2001 | Sieffert |
| 6,285,986 B1 | 9/2001 | Andrews |
| 6,295,513 B1 | 9/2001 | Thackston |
| 6,300,948 B1 | 10/2001 | Gellar et al. |
| 6,304,855 B1 | 10/2001 | Burke |
| 6,319,737 B1 | 11/2001 | Putnam et al. |
| 6,324,534 B1 | 11/2001 | Neal |
| 6,336,101 B1 | 1/2002 | Dean |
| 6,353,770 B1 | 3/2002 | Ramsey |
| 6,360,216 B1 | 3/2002 | Hennessey et al. |
| 6,370,513 B1 | 4/2002 | Kolawa et al. |
| 6,414,693 B1 | 7/2002 | Berger |
| 6,421,612 B1 | 7/2002 | Agrafiotis et al. |
| 6,437,866 B1 | 8/2002 | Flynn |
| 6,473,898 B1 | 10/2002 | Waugh |
| 6,487,713 B1 | 11/2002 | Cohen |
| 6,530,065 B1 | 3/2003 | McDonald et al. |
| 6,531,537 B2 | 3/2003 | Friel |
| 6,535,294 B1 | 3/2003 | Arledge |
| 6,578,174 B2 | 6/2003 | Zizzo |
| 6,594,799 B1 | 7/2003 | Robertson et al. |
| 6,636,837 B1 | 10/2003 | Nardozzi |
| 6,654,736 B1 | 11/2003 | Ellis et al. |
| 6,677,160 B1 | 1/2004 | Stockman |
| 6,704,919 B2 * | 3/2004 | Araki et al. ............ 716/112 |
| 6,735,757 B1 | 5/2004 | Kroening |
| 6,782,307 B2 | 8/2004 | Wilmott et al. |
| 6,785,805 B1 | 8/2004 | House et al. |
| 6,836,752 B2 | 12/2004 | Atasoy |
| 6,851,094 B1 | 2/2005 | Robertson et al. |
| 6,862,563 B1 | 3/2005 | Hakewill |
| 6,874,146 B1 | 3/2005 | Iyengar |
| 6,877,033 B1 | 4/2005 | Garrett et al. |
| 6,882,980 B1 | 4/2005 | Schuller |
| 6,901,430 B1 | 5/2005 | Smith |
| 6,937,997 B1 | 8/2005 | Parulski |
| 6,983,236 B1 | 1/2006 | Karlovac |
| 6,985,876 B1 | 1/2006 | Lee |
| 7,003,548 B1 | 2/2006 | Barck et al. |
| 7,006,985 B1 | 2/2006 | Dean |
| 7,062,893 B2 | 6/2006 | Lawton |
| 7,085,729 B1 | 8/2006 | Kennedy |
| 7,099,731 B2 | 8/2006 | Lopez |
| 7,100,126 B2 | 8/2006 | Ashida et al. |
| 7,103,434 B2 * | 9/2006 | Chernyak et al. ............ 700/98 |
| 7,105,769 B2 | 9/2006 | Aktas |
| 7,113,919 B1 | 9/2006 | Norris et al. |
| 7,124,377 B2 | 10/2006 | Catthoor et al. |
| 7,136,790 B1 | 11/2006 | Hobbs |
| 7,191,145 B1 | 3/2007 | Lunetta |
| 7,233,912 B2 | 6/2007 | Walker |
| 7,328,171 B2 | 2/2008 | Helot et al. |
| 7,353,467 B2 | 4/2008 | Robertson et al. |
| 7,367,006 B1 | 4/2008 | O'Riordan et al. |
| 7,376,916 B1 | 5/2008 | Ebergen et al. |
| 7,409,666 B2 | 8/2008 | Almeida et al. |
| 7,441,219 B2 | 10/2008 | Perry et al. |
| 7,480,606 B2 | 1/2009 | Tseng et al. |
| 7,506,296 B1 | 3/2009 | Parpia et al. |
| 7,516,423 B2 | 4/2009 | De Smedt et al. |
| 7,586,299 B2 * | 9/2009 | Fujiyama et al. ............ 323/350 |
| 7,647,540 B2 | 1/2010 | Rajski et al. |
| 7,694,251 B2 * | 4/2010 | Chandramouli et al. ..... 716/106 |
| 7,774,723 B2 | 8/2010 | Banerjee |
| 7,979,251 B2 | 7/2011 | Jakobsen et al. |
| 8,972,751 B2 * | 3/2015 | Perry et al. ............ 713/300 |
| 2001/0000427 A1 | 4/2001 | Miller |
| 2001/0042036 A1 | 11/2001 | Sanders |
| 2002/0004749 A1 | 1/2002 | Froseth et al. |
| 2002/0055892 A1 | 5/2002 | Brown |
| 2003/0097331 A1 | 5/2003 | Cohen |
| 2003/0140017 A1 | 7/2003 | Patton |
| 2004/0030666 A1 | 2/2004 | Marra |
| 2005/0060197 A1 | 3/2005 | Mayaud |
| 2005/0080502 A1 * | 4/2005 | Chernyak et al. ............ 700/97 |
| 2006/0080076 A1 | 4/2006 | Lahiri et al. |
| 2006/0242023 A1 | 10/2006 | Norris et al. |
| 2007/0011059 A1 | 1/2007 | Norris et al. |
| 2007/0103557 A1 | 5/2007 | Prabhu |
| 2007/0294129 A1 | 12/2007 | Froseth |
| 2010/0023151 A1 * | 1/2010 | Shieh et al. ............ 700/105 |
| 2010/0100856 A1 | 4/2010 | Mittal |
| 2010/0281448 A1 | 11/2010 | He |
| 2010/0306722 A1 | 12/2010 | LeHoty et al. |
| 2010/0325599 A1 | 12/2010 | Perry et al. |
| 2011/0320848 A1 * | 12/2011 | Perry et al. ............ 713/340 |

FOREIGN PATENT DOCUMENTS

| | | |
|---|---|---|
| JP | 2000-020589 | 1/2000 |
| WO | WO 92/08671 | 5/1992 |
| WO | WO 92/17851 | 10/1992 |
| WO | WO 96/02882 | 2/1996 |
| WO | WO 97/16886 | 5/1997 |
| WO | WO 97/43737 | 11/1997 |
| WO | WO 98/15408 | 4/1998 |
| WO | WO 98/15904 | 4/1998 |
| WO | WO 98/37475 | 8/1998 |
| WO | WO 99/28845 | 8/1999 |

OTHER PUBLICATIONS

Deborah L, MoGulnness et al, (Jul./Aug. 1998), "An industrial-Strength Description Loglo-Based Configurator Platform," 1094-7167 /EEE, pp. 69-77.

Joh R. Wright et al. (1993). "A Knowledge-Based Configurator That Supports Sales, Engineering, and Manufacturing at At&T Network Systems," vol. 14, No. 3, Al Magazines, pp. 69-80.

Deborah L. MoGulnness et al. (1896). "Description Logic in Practice: A CLASSIC Application," Proceedings of the 14th International Joinl Conference on Artiflolal into Intelligence. Archived web pages http://web,archive.org/web/19971114096933/http;//www.ressaroh. att.com/sw/tools/classlc/papers/Ical-video.ps, providing an extended version at least as early as Nov. 1997. A deolaration from Christopher Butler authenticating the arohived document is included.

AT&T 390-301-004 DACS IV Digital Access and Crossconnect System IV, Issue 1, Jun. 1989.

(56) References Cited

OTHER PUBLICATIONS

U.S. Appl. No. 80/181,282 to Prosath, filed Feb. 2, 2000.
"Comparing the High Speed Comparators," *National Semiconduotor Application Note* 67 Interface Developmont Group, Jun. 1973 (copyright 1999) (published Feb. 24, 1999), Archived web page http://web.arohive.org/web/19991111033022/www.national.com/apnotes/Analog-Comparators_v2.html. A declaration from Christopher Butler authentioating the archived document is included.
"Product Folder LM161", Archived web page http://web.archive.org/web/19991010013450/http://www.national.com/pf/LM/LM161.html avaliable at least as early as Oct. 1999. A declaration from Christopher Butler authentioating the archived document is Included.
"Product Folder 100314", Archived web page http://web.archive.org/web/19990129092202/http://national.com/pf/10/100314.html avaliable at least as early as Jan. 1999. A declaration from Christopher Butler authenticating the archive document is Included.
Phil Frame (Sep. 17, 1990). "GM Upshifting to Eleotronics," *Automotive News*, Crain Communioations, Inc. 3 pages.
Coutinno et al. (Sep. 13,18, 1998). "Active Calalogs: Iniegrated Support for Componeni Engineering," Procceedings of DETC98: 1998 ASME Design Engineering Technloal Conference, Atlanta, GA. DETC98/CIE-5521, 9 pages.
Danieh et al. (1998), Building Database-Driven Web Catalogs, McGraw-Hill. 8 pages.
Nikkel English News (Sep. 17, 1997), "Frontier Koliro Offers Cuslom-made PC Kits," 1 page.
"Frontier" archived web pages, available at least as early as Feb. 4, 1999: )<http://web.archive.org/web/19981203111515/www.urban.ne.jp/home/frontier/Index.html> <http://archive.org/web/19990204024640/www.urban.ne.jp/home/frontier/product/custom/c_kii.html> <http://web.archive.org/web/19990204050917/www.urban.ne.jp/frontier/products/custom/d_kii_p5a.html> <http://web.archive.org/web/19990204022155/www.urban.ne.jp/home/frontier/support/motherboard/p5a.html> <http://web.archive.org/web/19990202203220/www.urban.ne.jp/home/frontier/buy.html> <http://web.archive.org/web/19980203005704/www.urban.ne.jp/home/frontier/buy/purchase/purchase.html>). pp. 1-18 (English translation, pp. 20-78). A seclaration from Christopher Butler authenticating the archived document (labeled as A1) is provided in NPL No. 9.
"Antuque" archived web pages, avaliable at least as early as Mar. 1999: (<http://web.archive.org/web/19990203120130/www.acaulos.com/home.html> <http://web.archive.org/web/19990202230012/www.acaulos.com/427cobra.html> <http://web.archive.org/web/19990202231832/www.acaulos.com/427cobraoptions.html> <http://web.archive.org/web/19990302040225/www.acaulos.com/manual.html>), 12 pages.
A declaration from Christopher Butler authenticating the archived document (labeled es A2) is provided in NPL No. 9.
"CSG" archived web pages, available at least as early as Nov. 1999: (<http://web.archive.org/web/19990429163122/www.csg2000.com/detaull.asp> <http://we.archive.org/web/19991128083818/www.csg2000.com/Equipment/amdbare.asp>), 3 pages, A declaration from Christopher Butler authenticating the archived document (labeled an A3) is provided in NPL No. 9.
"Cooking" archived web pages, available at least as early as Dec. 1999; (<http://web.archive.org/web/19990210110820/www.oooking.com/produots/>, <http://web.archive.org/web/19990830161517/www.oooking.com/produots/shbrowre.asp?oal-gf> <http://web.archive.org/web/19991130165751/www.cooking.com/products/shprodll.asp?Dep1No=8000&ClassNo=0830> <http://web.archives.org/web/19991204080518/www.oooking.com/products/shprodde.asp?SKU-108659> http://web.archive.org/web/19990921224423/www.oooking.com/products/gastance.asp> <http://web.archive.org/web/19991018233610/www.oooking.com/products/ahwalcom.asp>), 11 pages, A declaration from Christopher Butler authenticating the archived document (labeled as A4) Is provided in NPL No. 9.
A deolaration dated Jul. 13, 2010, from Christopher Butler autheniloaling "Frontier" (NPL No. 5), "Anilque" (NPL No. 6), "CSG" (NPL No. 7), and "Cooking" (NPL No. 9) as archived documents.
U.S. Appl. No. 60/179,057, filed Jan. 31, 2000, Wilmott et al.
U.S. Appl. No. 60/181,282, filed Feb. 9, 2000, Froseth et al.
U.S. Appl. No. 60/191,878, filed Mar. 23, 2000, Wilmott et al.
U.S. Appl. No. 60/216,847, filed Jul. 7, 2000, Wilmott et al.
"GetPlastic.com Opens First E-Market to Help Plastics Processors Procure High-Performance Resins, Create Custom Compounds," PR Newswire, Jun. 13, 2000, No. 11483828, 3 pages.
"LNP Introduces Web-Based Data," Flame Retardancy News, Oct. 1999, 9(10), No. 06783318, 2 pages.
"Need2Buy Releases 'Next Generation' E-Proourement Solution for Electronic Components Industry," Business Wire, Mar. 20, 2001, 3 pages.
Author Unknown, "Artesyn Technologies presents . . . E-Tools for Successfully Selling DCIDC Converters," NetSemlnar Overview, 1999, 1 page.
Author Unknown, "National Semiconductor Corporation presents . . . Design Your Power Supply on Line at Power.National.com," NetSeminar Overview, 2000, 2 pages.
Author Unknown, "25$^{th}$ Annual Product of the Year Awards," National Electronic Products, Mar. 15, 2004, 30 pages.
Author Unknown, "ADI—Car Alarms and other Security Systems," Mar. 15, 2004, 1 page.
Author Unknown, "ADI—Three Phase Trivector Energy Meter," Mar. 15, 2004, 1 page.
Author Unknown, "ADI Weigh Scale," Mar. 15, 2004, 1 page.
Author Unknown, "ADI—Audio Solutions," Mar. 15, 2004, p. 1.
Author Unknown, "ADI—Communications and Telephony Solutions," Mar. 15, 2004, 2 pages.
Author Unknown, "ADI—Development Tools and Evaluation Kits," Mar. 15, 2004, 8 pages.
Author Unknown, "ADI—Digital Potentiometers," Mar. 15, 2004, 3 pages.
Author Unknown, "ADI—iMEMS: Integrated Micro Electro Mechanical Acceleration Sensors," Mar. 15, 2004, 1 page.
Author Unknown, "ADI—Instrumentation Amplifier Selection Guide," Mar. 15, 2004, 4 pages.
Author Unknown, "ADI—Interface Products Selection Guide," Mar. 15, 2004, 4 pages.
Author Unknown, "ADI—Low-Power Digital-to-Analog Converters," Mar. 15, 2004, 4 pages.
Author Unknown, "ADI—Major Product Markets & Applications," Mar. 15, 2004, 1 page.
Author Unknown, "ADI—Motor Control," Mar. 15, 2004, 1 page.
Author Unknown, "ADI—Products and Datasheets," Mar. 15, 2004, 1 page.
Author Unknown, "ADI—Products and Datasheets: Selection Guides," Mar. 15, 2004, 1 page.
Author Unknown, "ADI—Signal Chains," Mar. 15, 2004, 2 pages.
Author Unknown, "ADI—Technical Support," Mar. 15, 2004, 1 page.
Author Unknown, Maxim Data Sheets, Mar. 15, 2004, 1 page.
Author Unknown, "Maxim Home Page, On-Line Technical Queries," Mar. 15, 2004, 1 page.
Author Unknown, "Maxim Max2680, Max2681, Max2682," Mar. 15, 2004, 2 pages.
Author Unknown, "Maxim Products," Mar. 15, 2004, 1 page.
Author Unknown, "Maxim Search Data Sheets," Mar. 15, 2004, 1 page.
Author Unknown, "Maxim Video Buffers," Mar. 15, 2004, 2 pages.
Author Unknown, "Maxim's Parametric Search," Mar. 15, 2004, 3 pages.
Author Unknown, "Section 1, System Overview and Benefits," AT&T, Jun. 1989, Issue 1, 43 pages.
BatchMaster eWorkplace Solutions, http://www.batchmaster.com, downloaded Feb. 27, 2001, 14 pages.
Frame, P., "GM Upshifting to Electronics," Automotive News, Sep. 17, 1990, Crain Communications, Inc., 3 pages.
Gregg, "Web Power Cuts Design Time," Translm Press, Electronics Weekly, Nov. 10, 1999, 1 page.

(56) References Cited

OTHER PUBLICATIONS

Hilller, T et al., "Laboratory Module," eWorkplace Solutions, Feb. 2000, 2 pages.
In The United States Patent and Trademark Office, U.S. Appl. No. 09/643,841: Non-Final Office Action, mailed Sep. 23, 2003.
In The United States Patent and Trademark Office, U.S. Appl. No. 09/643,841: Final Office Action, mailed Jun. 8, 2004.
In The United States Patent and Trademark Office, U.S. Appl. No. 09/643,841: Non-Final Office Action, mailed Dec. 30, 2004.
In The United States Patent and Trademark Office, U.S. Appl. No. 09/643,841: Final Office Action, mailed Jul. 28, 2005.
In The United States Patent and Trademark Office, U.S. Appl. No. 09/643,841: Notice of Allowance, mailed Mar. 20, 2006.
Interface Development Group, "Comparing the High Speed Comparators," National Semiconductor Application Note 87, http://web.archive.org.web/19991111033822/www.national.com/apnotes/Analog-Comparators_v2,html, Jun. 1973 (Includes Affidavit of Christopher Butler), 14 pages.
Internet World Magazine, "Voltage Goes Virtual," e-business, http://iw.ccm/magazine,php?inc=030100/3.01.ebusiness.html, 2000, 3 pages.
McGuinness D. L. et al. "Description Logic in Practice: A CLASSIC Application" Available on-line at least as early as Nov. 1997, See, e,g., http://web.archive.org/web/19971114095933/http://www.research.att.co/sw/tools/classic/papers/ijcai-video.ps. McGuinness '97 is an extended version of "Description Logic in Practice: A CLASSIC Application," *Proceedings of the 14th International Joint Conference on Artificial Intelligence* (1995), (Includes Affidavit of Christopher Butler), 10 pages.
McGuinness, D. L. et al., "An Industrial-Strength Description Logic-Based Configurator Platform," IEEE, Jul./Aug. 1998, 69-77.
Morrison, G., "National Power ICs Take to the Internet," EDN.com, http://www.edn.com/index.asp?layout=articlePrint&articleID=CA48127, 1999, 2 pages.
National P/N 100314—"Low Power Quint Differential Line Receiver", http://web.archive.org/web/19990129052202/http://www.national.com/pf/10/100314.html National Semiconductor, avaliable at least as early as Jan. 1999, (Includes Affidavit of Christopher Butler), 5 pages.
National P/N LM161—"High Speed Differential Comparator", http://web.archive.org/web/19991010013450/http://www.national.com/pf/LM/LM161.html National Semlconductor, avaliable at least as early as Oct. 1999, (Includes Affidavit of Christopher Butler), 5 pages.
National Semiconductor Company, "Webench™ 2000," No Month Available, 2000, 2 pages.
National Semiconductor Corporation, "Models & Software," http://web.archive.org/web/l998/www.national.com/models, 1 page, Aug. 26, 2010.
National Semiconductor Corporation, "National Expands Simple Switcher(REG) Family with Two New 5A Flyback Power Converters," National Semidconductor: The Sight & Sound of Information, News Release, http://www.national.com/news/l995/9509/a95003pm.html, 1995, 2 pages.
National Semiconductor Corporation, "National Semiconductor Corporation's Web Site Reaches Finalist Round in Second Annual NII Awards Program," National Semidconductor: The Sight & Sound of ln formation, News Release, http://www.national.com/news/Item/l996/9611/int96001.html, 1996, 2 pages.
National Semiconductor Corporation, "National Semiconductor Extends Simple Switcher DC/DC Converter Family for High-Voltage Applications," National Semidconductor: The Sight & Sound of ln formation, News Release, http://www.national.com/news/item/0,1735,640,00.html, 2001, 2 pages.
National Semiconductor Corporation, "National Semiconductor Introduces WEBENCH 3.0, the Industry's Most Advanced Internet-Based Design, Prototyping, and Overnight Delivery Environment," National Semidconductor: The Sight & Sound of Information, News Release, http://www.national.com/news/item/0,1735,693.00.html, Nov. 5, 2001, 3 pages.

National Semiconductor Corporation, "National Semiconductor Redesigns Web Site to Reduce 'Time-to-Decision' for Engineers," National Semidconductor: News Release, http://www.national.com/news/1997/9703/web2.html, 1997, 3 pages.
National Semiconductor Corporation, "National Semiconductor Wins ' 1999 CIO Web Business 50/50' Award for Online Business Excellence," National Semidconductor: The Sight & Sound of Information, News Release, http://www.national.com/news/item/0,1735,397,00.html, 1999, 2 pages.
National Semiconductor Corporation, "National Semiconductor Wins 'Business on the Internet'—BOTI—Award for Best Extranet Application; Achieves Recognition for Saving Customers Time," National Semidconductor: The Sight & Sound of Information, News Release, http://www.national.com/news/item/0,1735,18,00.html, 1998, 2 pages.
National Semiconductor Corporation, "National Semiconductor's MacPhyter 10/100 Ethernet Controller Captures Top Retail Adapter Design Win in Fast Ethernet Market," National Semidconductor: The Sight & Sound of Information, News Release, http://web.archive.org/web/2000303204552/www.national.com/news/Item/0,1735,432,00.html, 1999, 3 pages.
National Semiconductor Corporation, "National Semiconductor's New 1.3 MHz Simple Switcher Family Delivers High Performance and Power Density With Easy-to-Use Design Tools," National Semidconductor. The Sight & Sound of Information, News Release, http://www.national.com/news/item/O,1736,686,00,html, 2001, 2 pages.
National Semiconductor Corporation, "NEC Uses National Semiconductor Two-Chip Solution in World's First Bluetooth Enabled Notebook PCs with Built-In Antenna Shown at Cebit," National Semidconductor: The Sight & Sound of Information, News Release, http://web.archive.org/web/0090408155328/www.national.com/news/item/0,1735,473,00.html, 2000, 3 pages.
National Semiconductor Corporation, "Space-Saver Simple Switcher® Power Converters from National Semiconductor Offer Guaranteed 1A and 3A Performance," National Semidconductor: News Release, http://www.national.com/news/l996/9605/a96001pm.html, 1996,2 pages.
National Semiconductor Corporation, National Semiconductor Announces the Market's Most Integrated Digital Cordless Phone Solution for the 900MHZ and 2.4GHZ ISM Bands, National Semidconductor: The Sight & Sound of Information, News Release, http://web.archive.org/web/20001058214107/www.national.com/news/Item/0,l753,518,00.html, 2000, 3 pages.
National Semiconductor Corporation, "National Semiconductor Introduces Power.National.Com—First Advanced Online Design Solution for Analog Engineers," National Sernidconductor: The Sight & Sound of Information, News Release, Oct. 25, 1999, 3 pages.
National Semiconductor Corporation, "National Semiconductor Wins 'Outstanding Web Site' Award for Corporate Web Site Excellence," National Semidconductor: The Sight & Sound of Information,.News Release, http://www.national.com/news/item/0,1735,342,00.html, 1998, 2 pages.
National Semiconductor Corporation, "National Semicondutor's WEBENCH® Online Design Tool Named 'Innovation of the Year,'" National Semidconductor: The Sight & Sound of Information, News Release, http://www.national.com/news/item/0,1735,744,00.html, 2002, 2 pages.
National Semiconductor Corporation, "NEC Uses National Semiconductor Two-Chip Solution in World's First Bluetooth Enabled Notebook PC with Built-in Antenna Shown at Cebit," National Semidconductor: News Release, http://web.archive.org/web/0000408155328/www.national.com/news/item/0,1735,473,00.html, 2000, 3 pages.
National Semiconductor, "Power.National.Com: Design Software for Simple Switcher DC-DC Converters," National Semldconductor: The Sight & Sound of Information, News Release, 2000, http://web.archive.org/web/20000991232637/www.national.com/appinfo/power/0,1768,383,00.html, 2 pages.
Penton Media, Inc., "Free Web-Based Tools Simulate PLLs and Power Cicuits," eepn, http://www.eepn.com/locator/Products/ArticleID/22705/22705.html, 2000, 2 pages.

(56) References Cited

OTHER PUBLICATIONS

Perry et al., "Design Your Power Supply on Line at Power.Nalional. Com," National Semiconductor Corporation, Jul. 11, 2000, 2 pages.
Schweber, B., "Tools put supply-design resource at your fingertips," EDN.com, http://www.edn.com/index.asp?layout=articlePrint&articleID=CA46439, 1999, 1 page.
Staff, National Unveils WEBBENCH 2.0, ECN, http://www.ecnmaq.com/Index.asp?layout=articlePrint&articleID=CA56103, 2000, 1 page.
Wright, J. R. et al., "A Knowledge-Based Configurator That Supports Sales, Engineering, and Manufacturing at AT&T Network Systems," AI Magazine, Fall 1993, 14(3), 69-80.
"A/D Converters," Maxim Integrated Products, downloaded Jun. 1, 2009, 3 pages, http://web.archive.org/web/19991009030358/www.maxim-Ic.com/Saqqara.htm.
"ADI—Industry Solutions: Technologies / Applications," 1995-2000, Analog Devices, Inc, 2 pages, http://web.archive.org/web/20000302091639/www.analog.com/industry/industry_Solutions.html.
"ADI—Measurement & Control Systems," Analog Devices, Inc., 1995-2000, 1 page, http://web.archive.org/web/20000901051423/www.analog.com/industry/signal_chains/auto/industrial/Ind_14.html.
"ADI—Measurement & Control Systems," Analog Devices, Inc., 1995-1999, 1 page, http://web.archive.org/web/19990508143405/www.analog.com/industry/signal_chains/auto/industrial/ind_14.html.
"ADI—Typical ATE Signal Chain," Analog Devices, Inc., 1995-1999, 1 page, http://web.archive.org/web/19991006022217/www.analog.com/industry/signal_chains/auto/instrumentation/inst_4.html.
"ADI—Typical ATE Signal Chain," Analog Devices, Inc., 1995-2000, 1 page, http://web.archive.org/web/20000901051522/www.analog.com/industry/signal_chains/auto/instrumentation/inst_4.html.
"ADI—ADSL," Analog Devices, Inc., 1995-2000, 1 page, http://web.archive.org/web/20000606154943/www.analog.com/industry/signal_chains/auto/communications/comms_1.html.
"ADI-ADSL," Analog Devices, Inc., 1995-1999, 1 page, http://web.archive.org/web/19990500131527/www.analog.com/industry/signal_chains/auto/communications/comms_1.html.
"ADI-Digital Still Camera," Analog Devices, Inc., 1995-2000, 1 page, http://web.archive.org/web/20000303235546/www.analog.com/industry/signal_chains/auto/consumer/cons_2.html.
"ADI-Industry Solutions," Analog Devices, Inc., 1995-1999, 1 page, http://web.archive.org/web/19990417141144/www.analog.com/Industry/Industry_Solutions.html.
"ADI—Wireless Infrastructure: IF Sampling Diversity Receiver," Analog Devices, Inc., 1995-2000, 1 page, http://web.archive.org/web/20000510010949/www.analog.com/industry/signal_chains/auto/communications/comms_2.html.
"Advanced Search," "Advanced Search," Autobytel Inc., 1999-2006, 2 pages, http://web.archive.org/web/20060521232750/www.autobytel.com/content/research/Decision/index.cfm.
"Advanced Search," Autobytel Inc., 1999-2006, 2 pages, http://web.archive.org/web/20060527191852/www.autobytel.com/content/Research/Decision/index.cfm.
"Analog Devices brings AUDIO SOLUTIONS . . . to the STUDIO and the HOME," Analog Devices, Inc., 1996-2000, 1 page, http://web.archive.org/web/20000817161010/www.analog.com/Industry/audio/.
"Analog Devices," Analog Devices, Inc., 1995-1999, 1 page, http://web.archive.org/web/19990429060160/http:/www.analog.com/Index.html.
"Analog Devices," Analog Devices, Inc., 1996-1999, 1 page, http://web.archive.org/web/199911041539513/http:/www.analog.com/Index.html.
"Analog Devices: Today's Headlines," Analog Devices, Inc., 1995-1999, 1 page, http://web.archive.org/web/19990429060150/http:/www.analog.com/Index.html.

"Analog Devices' Audio Products Portfolio," Analog Devices, Inc., 1995-2000, 3 pages, http://web.archive.org/web/20000901075854/www.analog.com/industry/audio/product_portfolio.html.
"Analog Search Engine," Analog Devices, Inc., 1996-1999, 1 page, http://web.archive.org/web/19990429132810/www.analog.com/misc/simple_search.html.
"Analog, Mixed Signal, RF, and Fiber ICs From DC to GHz," Maxim Integrated Products, 2000, 2 pages, http://web.archive.org/web/20000511114513/http:/www.maxim-ic.com/.
"Analog, Mixed Signal, RF, and Fiber ICs From DC to GHz," Maxim Integrated Products, 2000, 2 pages, http://web.archive.org/web/20000303050821/http:/www.maxim-ic.com/.
"Analog-to-Digital Converters," Maxim Integrated Products, 2001, 1 page, http://web.archive.org/web/20010606235321/para.maxim-ic.com/ADConverters.asp.
"Applications Active Matrix," Texas Instruments Incorporated, 1999, 1 page, http://web.archive.org/web/19990508044944/www.ti.com/sc/docs/apps/index.htm.
"Automotive Application Resources by Application," Texas Instruments Incorporated, 2000, 1 page, http://web.archive.org/web/20000414075551/www.ti.com/sc/docs/apps/automotive/automotive.html.
"Automotive Block Diagrams," Texas Instruments Incorporated, 2000, 1 page, http://web.archive.org/web/20000526020637/www.ti.com/sc/docs/apps/automotive/blkdiag.html.
"Automotive: Car Multi-Media," Texas Instruments Incorporated, 2000, 2 pages, http://web.archive.org/web/20000711080234/www.ti.com/sc/docs/apps/automotive/car_multi_media.html.
"Automotive: Car Radio," Texas Instruments Incorporated, 2000, 2 pages, http://web.archive.org/web/20000818083834/www.tl.com/sc/docs/apps/automotive/car_radio.html.
"Buffer Amplifiers for Pagers," Maxim Integrated Products, 2001, 1 page, http://web.archive.org/web/20010620102819/www.maxim-ic.com/DesignApps/EndEquipment/Pagers/BufferAmp.htm.
"Car Multi Media System—Codecs," Texas Instruments Incorporated, 2000, 1 page, http://web.archive.org/web/20000818133609/www.ti.com/sc/docs/psheets/diagrams/subsys/cmms_cdc.htm.
"Car Multi Media System—Video Decoder," Texas Instruments Incorporated, 2001, 1 page, http://web.archive.org/web/20010629145154/www.tl.com/sc/docs/psheets/diagrams/subsys/cmmsdcdr.htm.
"Car Prices and Research," Autobytel Inc., 1999-2006, 2 pages, http://web.archive.org/web/20060518135120/www.autobytel.com/content/resources/researchIndex.cfm?id=abt&fuseaction=MakeList.
"Car Radio—ADC/DAC," Texas Instruments Incorporated, 2000, 1 page, http://web.archive.org/web/20000818133701/www.ti.com/sc/docs/psheets/diagrams/subsys/car_adc.htm.
"Car Radio—Power Amp," Texas Instruments Incorporated, 2000, 1 page, http://web.archive.org/web/20000818133655/www.ti.com/sc/docs/psheets/diagrams/subsys/car_pamp.htm.
"Category Tree," Analog Devices, Inc., 1995-2000, 1 page, http://web.archive.org/web/20000303055418/products.analog.com/products_html/list_gen_category_tree.html.
"Chevrolet Malibu," Autobytel.com, downloaded Jun. 1, 2009, 1 page, http://web.archive.org/web/20000602161656/www.autobytel.com/content/RBPath/selectSeries.cfm?id=abt&newUsed=new&make_voh=Chevrolet&postal_code_vch=&model_vch=Malibu&searchType=cat&sction=home&getAllSeries=&category=PASS&categoryName=Passenger+Car.
"Choose a Product Index: Communications Products," Analog Devices Inc., 1995-2000, 2 page, http://web.archive.org/web/20000308041518/products.analog.com/products_html/list_gen_36_2_1.html.
"Comparators: Step Search Selector," Saqqara Systems, Inc., downloaded Jun. 1, 2009, 2 pages, http://web.archive.org/web/19990202080117/209.1.238.248/scripts/oSelector.exe/comparators2/.
"Contact Maxim: On-Line Technical Queries,", Maxim Integrated Products, 1999, 1 page, http://web.archive.org/web/19991012153147/http:/maxim-ic.com/.
"Data Sheets," http://web.archive.org/web/19991013030248/maxim-ic.com/Datasheets.htm, 1 page, downloaded Jun. 1, 2009.

(56) References Cited

OTHER PUBLICATIONS

"Delivering Designs in Internet Time," National Semiconductor Corporation, Oct. 27, 1999, 41 pages.

"Display Power for Digital Cameras," Maxim Integrated Products, 2000, 1 page, http://web.archive.org/web/20000830123009/www.maxim-ic.com/DesignApps/EndEquipment/Digital/DisplayPower.htm.

"Display Power for Pagers," Maxim Integrated Products, 2000, 1 page, http://web.archive.org/web/20000830124354/www.maxim-ic.com/DesignApps/EndEquipment/Pagers/DisplayPower.htm.

"Downconverter, Demodulator, Receiver for Pagers," Maxim Integrated Products, 2000, 1 page, http://web.archive.org/web/20000830124201/www.maxim- ic.com/DesignApps/EndEquipment/Pagers/DwnConverter.htm.

"Easy PLL—Part Selector (Final)," National Semiconductor Corporation, downloaded May 27, 2009, 1 page, http://web.archive.org/web/20000901044000/www.national.com/appinfo/wireless/EasyPLL/easypll.cgi.

"Experience the Communications Breakthrough with Analog Devices," Analog Devices, Inc., 1995-2000, 1 page, http://web.archive.org/web/20000815214109/www.analog.com/industry/communications/.

"High Speed Amplifiers," Analog Devices, Inc., 1995-2000, 3 pages, http://web.archive.org/web/20000831045850/www.analog.com/support/standard_linear/selection_guides/chart.html.

"Information Appliances," National Semiconductor Corporation, downloaded May 27, 2009, 2 pages, http://web.archive.org/web/20000815214228/www.national.com/appinfo/solutions/.

"Information Appliances; IA Technology," National Semiconductor Corporation, downloaded May 27, 2009, 2 pages, http://web.archive.org/web/20000816235911/www.national.com/appinfo/solutions/0,2062,398, 00.html.

"Interface Products Selection Guide," Analog Devices, Inc., 1995-1999, 4 pages, http://web.archive.org/web/19990508220544/www.analog.com/support/standard_linear/selection_guides/interface.html.

"Maxim Master Product Tree," Maxim Integrated Products, 2000, 2 pages, http://web.archive.org/web/20000817053442/para.maxim-ic.com/.

"Melody Lucasfilm THX Processor: Multichannel Audio-Post Processing Reference Design," Analog Devices, Inc., 1995-2009, 3 pages, http://web.archive.org/web/20011120160550/www.analog.com/pdf/briefs/html/thx_dec.html.

"Models and Software: Design Software for Simple Switcher DC-DC Converters," National Semiconductor Corporation, downloaded May 27, 2009, pp. 1-3, http://web.archive.org/web/20000301132222/www.national.com/sw/SimpleSwitcher/0,1619,0,00.html.

"Modern Times" National Semiconductor Corporation, 1995, 26 pages.

"National Semiconductor Product Catalog: Deflection—Time-Base(2)," National Semiconductor Corporation, downloaded May 27, 2009, 1 page, http://web.archive.org/web/19990203212907/www.national.com/catalog/AnalogDisplayCircuits_MonitorsCRT_DeflectionTimeBase.html.

"National Semiconductor Products Catalog: National Semiconductor Products," National Semiconductor Corporation, downloaded May 27, 2009, 2 pages, http://web.archive.org/web/20001110050900/www.national.com/catalog/.

"National Semiconductor," National Semiconductor Corporation, downloaded May 27, 2009, 1 page, http://web.archive.org/web/19991105212204/http://www.national.com/index.html.

"National Semiconductor: Sign On," National Semiconductor Corporation, downloaded May 27, 2009, 1 page, http://web.archive.org/web/19991105212204/http:/www.national.com/index.html.

"National Welcomes You," National Semiconductor Corporation, 2000, downloaded May 27, 2009, 1 page, http://web.archive.org/web/20000815063130/http:/www.national.com/.

"National Welcomes You," National Semiconductor Corporation, downloaded May 27, 2009, 1 page, http://web.archive.org/web/20000511020107/www.national.com/.

"New Car Buyer's Guide," Autobytel Inc., 1999-2006, 2 pages, http://web.archive.org/web/20060521233212/www.autobytel.com/content/research/buyersguide/index.cfm.

"New Car Purchase Center," Autobytel.com, downloaded Jun. 1, 2009, 1.page, http://web.archive.org/web/20000408144256/www.autobytel.com/content/buy/Newindex.cfm?Id=abt.

"Parametric Product Catalog," National Semiconductor Corporation, downloaded May 27, 2009, 2 pages, http://web.archive.org/web/19991004171048/www.national.com/catalog/.

"Parametric Product Catalog: Analog Display Circuits," National Semiconductor Corporation, downloaded May 27, 2009, 1 page, http://web.archive.org/web/19991006161509/www.national.com/catalog/AnalogDisplayCircuits.html.

"Parametric Product Catalog: LCD(3)," National Semiconductor Corporation, downloaded May 27, 2009, 1 page, http://web.archive.org/web/19991006181750/www.national.com/catalog/AnalogDisplayCircuits_GeneralPurposeDisplayDrivers_LCD.html.

"Parametric Product Catalog: Logic," National Semiconductor Corporation, downloaded May 27, 2009, 1 page, http://web.archive.org/web/19991018211856/www.national.com/catalog/MilltaryAerospace.html.

"Parametric Product Catalog: National Semiconductor Products," National Semiconductor Corporation, downloaded May 27, 2009, 1 page, http://web.archive.org/web/19991004171048/www.national.com/catalog/.

"Parametric Product Catalog: Wireless Communications(25)," National Semiconductor Corporation, downloaded May 27, 2009, 1 page, http://web.archive.org/web/19991009103320/www.national.com/catalog/WirelessCommunications.html.

"Parametric Search," Maxim Integrated Products, 2000, 2 pages, http://web.archive.org/web/20000302042105/www.maxim-ic.com/MaximProducts/para.htm.

"Parametric Table for FCT—Advanced Search," National Semiconductor Corporation, 2000, downloaded May 27, 2009, 2 pages.

"Parametric Table for FCT," National Semiconductor Corporation, 2000, downloaded May 27, 2009, 2 pages, http://web.archive.org/web/20001027104843/www.national.com/parametric/0,1850,2128,00.html.

"Parametric Table: LCD," National Semiconductor Corporation, downloaded May 27, 2009, 1 page, http://web.archive.org/web/20000229152650/www.national.com/parametric/0,1850,970,00.html.

"Parametric Table: LVDC Display Interface (OpenLDI)," National Semiconductor Corporation, downloaded May 27, 2009, 1 page, http://web.archive.org/web/20000303154720/www.national.com/parametric/0,1850,2703,00.html.

"Parametric Table: Single PLLs," National Semiconductor Corporation, downloaded May 27, 2009, 1 page, http://web.archive.org/web/20000302194152/www.national.com/parametric/0,1850,1951.00.html.

"Passenger Car," Autobytel.com, downloaded Jun. 1, 2009, 2 pages, http://web.archive.org/web/20000510131235/www.autobytel.com/content/RBPAth/selectModel.cfm?id=abt&searchType=cat&fromHomePage=yes&category=PASS&categoryName=Passenger+Car&newUsed=new.

"Please select a voltage for the device 'LM2676':" National Semiconductor Corporation, downloaded May 13, 2009, 1 page.

"Power-Webench Page: Welcome to your Power Webench™ |," National Semiconductor Corporation, downloaded May 27, 2009, 1 page, http://web.archive.org/web/20000817172405/www.national.com/appinfo/power/webench/.

"Pricing and Research," Autobytel.com, downloaded Jun. 1, 2009, 1 page, http://web.archive.org/web/20000409000806/www.autobytel.com/content/resources/researchindex.cfm?id=abt&fuseaction=CatList.

"Product Center," Analog Devices, Inc., 1995-1999, 1 page, http://web.archive.org/web/19990427014038/www.analog.com/product/Product_Center.html.

(56) References Cited

OTHER PUBLICATIONS

"Product Folder: 54FCT138," National Semiconductor Corporation, downloaded May 27, 2009, 2 pages, http://web.archive.org/web/20001006175007/www.national.com/pf/54/54FCT138.html.
"Product Folder: LMX1501A," National Semiconductor Corporation, downloaded May 27, 2009, 3 pages, http://web.archive.org/web/20000303083553/www.national.com/pf/LM/LMX1501A.html.
"Product Folder: LMX2325," National Semiconductor Corporation, downloaded May 27, 2009, 3 pages, http://web.archive.org/web/20000304075734/www.national.com/pf/LM/LMX2325.html.
"Product Index: Audio, Microphone Pre-Amplifiers," Analog Devices, Inc., 1995-2000, 1 page, http://web.archive.org/web/20000418175330/products.analog.com/products_html/list_gen_181_2_1.html.
"Product Index: Communications Products, Cable Modem/CATV," 1995-2000, 1 page, http://web.archive.org/web/20000709033436/products.analog.com/products_html/list_gen_242_2_1.html.
"Product Index: Sensors & Signal Con, Accelerometers," Analog Devices, 1995-2000, 1 page, http://web.archive.org/web/20000304053953/products.analog.com/products_html/list_gen_121_2_1.html.
"Product Index: System Solutions, Algorithm Solutions," Analog Devices, Inc., 1995-2000, 2 pages, http://web.archive.org/web/20000516154457/products.analog.com/products_html/list_gen_202_2_1.html.
"Product Index: System Solutions, Audio Solutions," Analog Devices, Inc., 1995-2000, 1 page, http://web.archive.org/web/20000408200823/products.analog.com/products_html/list_gen_200_2_1.html.
"Product Index: System Solutions, Comms/Telephony Solutions," Analog Devices, Inc., 1995-2000, 1 page, http://web.archive.org/web/20000523100647/products.analog.com/products_html/list_gen_204_2_1.html.
"Product Index: System Solutions, Energy Meter Solutions," Analog Devices, Inc, 1995-2000, 1 page, http://web.archive.org/web/20000517020015/products.analog.com/products_html/list_gen_203_2_1.html.
"Product Index: System Solutions, GPS Solutions," Analog Devices, Inc., 1995-2000, 1 page, http://web.archive.org/web/20000523094528/products.analog.com/products_html/list_gen_205_2_1.html.
"Product Index: Systems Solutions, Video Conferencing," Analog Devices, Inc., 1995-2000, 1 page, http://web.archive.org/web/20000302200630/products.analog.com/products_html/list_gen_201_2_1.html.
"Products & Databases Parametric Search: Using ADI's Parametric Search," Analog Devices, Inc., downloaded May 27, 2009, 1 page, http://web.archive.org/web/20000304142419/catalog.analog.com/.
"Products & Databases," Analog Devices, Inc., 1995-2000, 1 page, http://web.archive.org/web/20000302135136/www.analog.com/product/Product_Center.html.
"Products and Information," Maxim Integrated Products, downloaded Jun. 1, 2009, 1 page, http://web.archive.org/web/19991013102332/maxim-ic.com/Products.htm.
"Products Overview," Texas Instruments Incorporated, 1999, 1 page, http://web.archive.org/web/19990508055810/www.ti.com/sc/docs/products/prodover.htm.
"Selection Guides," Analog Devices, Inc., 1995-1999, 1 page, http://web.archive.org/web/19990508192623/www.analog.com/product/selection_guides.html.
"Selection Guides," Analog Devices, Inc., downloaded May 28, 2009, 4 pages, http://web.archive.org/web/20010517130348/www.analog.com/product/selection_guides.html.
"Semiconductors," Texas Instruments Incorporated, 1999, 1 page, http://web.archive.org/web/19990427224930/www.ti.com/sc/docs/schome.htm.

"Sigma Delta Digital-To-Analog Converter Selection Guide," Analog Devices, Inc., 1995-2000, 2 pages, http://web.archive.org/web/20001014132954/www.analog.com/industry/audio/selection_guide.html.
"Signal Chain Solutions," Analog Devices, Inc., 1995-2000, 1 page, http://web.archive.org/web/20000901075811/www.analog.com/industry/communications/wireless/wireless_chain.html.
"Simple Switchers Converters and More," National Semiconductor Corporation, downloaded May 27, 2009, 1 page, http://web.archive.org/web/20000115152402/www.national.com/appinfo/power/0,1768,265,00.html.
"System Block Diagrams," Texas Instruments Incorporated, 1999, 1 page, http://web.archive.org/web/20000415035012/www.ti.com/sc/docs/psheets/diagrams/cmms.htm.
"System Block Diagrams: Car Radio," Texas Instruments Incorporated, 2000, 1 page, http://web.archive.org/web/20000621212609/www.ti.com/sc/docs/psheets/diagrams/caradio.htm.
"System Diagrams: 5530 block List of Parts that Fit this block," National Semiconductor Corporation, downloaded May 27, 2009, 1 page, http://web.archive.org/web/20001001000328/www.national.com/diagrams/InformationAppliances_PersonalInternetAccess_5530.html.
"System Diagrams: Audio Codec/Amp Block List of Parts that Fit this Block," National Semiconductor Corporation, © 2001, 1 page, http://web.archive.org/web/20010219193410/www.national.com/diagrams/InformationAppliances_PersonalInternetAccess_AudioCodec_Amp.html.
"System Diagrams: LVDS block List of Parts that Fit this block," National Semiconductor Corporation, ® 2001, 1 page, http://web.archive.org/web/20010219193936/www.national.com/diagrams/InformationAppliances_PersonalinternetAccess_LVDS.html.
"System Diagrams: Personal Internet Access," National Semiconductor Corporation, downloaded May 27, 2009, 1 page, http://web.archive.org/web/20000824150707/www.national.com/diagrams/IA_PersonalInternetAccess.html.
"System Diagrams: Radio Link block List of Parts that Fit this block," National Semiconductor Corporation, © 2001, 2 pages, http://web.archive.org/web/20010219194522/www.national.com/diagrams/InformationAppliances_PersonalInternetAccess_RadioLink.html.
"Technologies / Applications: Signal Chains," Analog Devices, Inc., 1995-2000, 2 pages, http://web.archive.org/web/20000510021331/www.analog.com/Industry/signal_chains/auto/index.html.
"Technologies/Applications," Analog Devices, Inc., 1995-2000, 2 pages, http://web.archive.org/web/20000511132704/www.analog.com/industry/Industry_Solutions.html.
"Temperature Sensors for Printers and Faxes," Maxim Integrated Products, 2000, 1 page, http://web.archive.org/web/20000830125318/www.maxim-ic.com/DesignApps/EndEquipment/Printers/TempSensor.htm.
"Texas Instruments Homepage," Texas Instruments Incorporated, 2000, 2 pages, http://web.archive.org/web/20000229100223/http://www.ti.com/.
"Texas Instruments Homepage: Headlines," Texas Instruments Incorporated, 1999, 1 page, http://web.archive.org/web/19991117072402/http:/www.ti.com/.
"Texas Instruments Welcomes You," Texas Instruments Incorporated, 2000, 1 page, http://web.archive.org/web/20000821152248/http://www.ti.com/.
"Texas Instruments: The World Leader in Digital Signal Processing Solutions," Texas Instruments Incorporated, 1999, 1 page, http://web.archive.org/web/19990428091847/http:/www.ti.com/.
"TI Semiconductors Engineering Design Center," Texas Instruments Incorporated, 1999, 1 page, http://web.archive.org/web/19990430044918/www.ti.com/sc/docs/eedesign.htm.
"TLC320AD58, 18-Bit Stereo Analog-To-Digital Converter," Texas Instruments Incorporated, 2000, 2 pages, http://web.archive.org/web/20001017230355/www.ti.com/sc/docs/products/analog/tio320ad58.html.
"TPA005D2, 2 W Stereo Class-D Audio Amplifier," Texas Instruments Incorporated, 2000, 3 pages, http://web.archive.org/web/20001012044451/www.ti.com/sc/docs/products/analog/tpa005d02.html.

(56) References Cited

OTHER PUBLICATIONS

"Video Buffers: Step Search Selector," Saqqara Systems, Inc., downloaded Jun. 1, 2009, 2 pages, http://web.archive.org/web/19990128105448/209.1.238.248/scripts/cSelector.exe/Video_Buffers/.

"Video/High—Speed Amplifiers: Step Search Selector," Saqqara Systems, Inc., downloaded Jun. 1, 2009, 2 pages, http://web.archive.org/web/19990128071803/209.1.238.248/scripts/cSelector.exe/Video_Amps/.

"Welcome to Power Design Tools WebSIM," http://web.archive.org/web/19991007183131/www.pdt.com/national_sim/nsc_sim.html, downloaded May 27, 2009, 1 page.

"Welcome to your Power Webench™ !" National Semiconductor Corporation, downloaded May 13, 2009, 1 page.

"What are you designing today? Digital Cameras," Maxim Integrated Products, 2000, 1 page, http://web.archive.org/web/20000817053455/www.maxim-ic.com/DesignApps/EndEquipment/Digital/StartPage.htm.

"What are you designing today? Printers and Faxes," Maxim Integrated Products, 2000, 1 page, http://web.archive.org/web/20000817053529/www.maxim-ic.com/DesignApps/EndEquipment/Printers/StartPage.htm.

"What are you designing today?" Maxim Integrated Products, 2000, 1 page, http://web.archive.org/web/20000817053514/www.maxim-ic.com/DesignApps/EndEquipment/Pagers/StartPage.htm.

"Wireless Infrastructure," Analog Devices, Inc., 1995-2000, 1 page, http://web.archive.org/web/20000817160941/www.analog.com/industry/communications/wireless/index.html.

"Wireless Infrastructure: Multimode/Multicarrier IF Sampling Receiver," Analog Devices, Inc., 1995-1999, 1 page, http://web.archive.org/web/19991004083507/www.analog.com/industry/signal_chains/auto/communications/comms_3.html.

"Wireless Infrastructure: Traditional Architecture," Analog Devices, Inc., 1995-2000, 1 page, http://web.archive.org/web/20000901051221/www.analog.com/industry/signal_chains/auto/communications/comms_13.html.

"World Leading Automatic Test Equipment (ATE) Components," Analog Devices, Inc., 1995-2000, 1 page, http://web.archive.org/web/20000817161019/www.analog.com/industry/ate/.

"Industry Solutions: Signal Chains," Analog Devices, Inc., 1995-1999, 2 page, http://web.archive.org/web/19990508135138/www.analog.com/industry/signal_chains/auto/index.html.

Gibson, P., "Customer Relationship Management—Boston," National Semiconductor Corporation, Oct. 27, 1999, 59 pages.

Seybold et al., "Understanding the B2B and E-market Landscape," Patricia Seybold Group, Inc., 2000, 96 pages.

National Semiconductor, "Switchers Made Simple", Exhibit 1, http://web.archive.org/web/19980523202329/http://www.national.com/sw/SimpleSwitcher/0,1043,0,00.html, date accessed May 23, 1998, 3 pages.

National Semiconductor, "Welcome to National Semiconductor", Exhibit 2, http://web.archive.org/web/19980523191833/http://www.national.com/webteam/feedback.html, date accessed May 23, 1998, 1 page.

National Semiconductor, "www.national.com/design/—the Design Engineer Resource", Exhibit 3, http://web.archive.org/web19980523191839/www.national.com/design/, date accessed May 23, 1998, 1 page.

National Semiconductor, "National Semiconductor Models and Software", Exhibit 4, http://web.archive.org/web/19980523192853/www.national.com/models/, date accessed May 23, 1998, 1 page.

Symantec, "Symantec pcANYWHERE32 version 8.0 for Windows 95 and Windows NT", Exhibit 6, http://web.archive.org/web/19980110231023/www.symantec.com/pcanywhere/fs_pca3280.html, date accessed Jan. 10, 1998, 3 pages.

National Semiconductor, "Switchers Made Simple Software v. 5.0 (also known as LM267X Made Easy v.2.01 Software)", Exhibit 6, http://www.national.com/appinfo/power/, date accessed Jun. 19, 1998, 4 pages.

National Semiconductor, "National P/N LM2675—Simple Switcher Power Converter High Efficiency 1A Step-Down Voltage . . . ", Exhibit 7, http://web.archive.org/web/19981201090204/http://www.national.com/pf/LM/LM2675.html, date accessed Dec. 1, 1998, 4 pages.

Panasonic, "OEM Ceramic Capacitors", Exhibit 8, http://web.archive.org/web/19991111215834/wwvw.panasonic.com/industrial_oem/electronic_compotents/e . . . , date accessed Nov. 11, 1999, 1 page.

Coilcraft, "Request Sample", Exhibit 9, http://web.archive.org/web/19981205102727/www/webcom/com/liebman/us/regsamp.html, date accessed Dec. 12, 1998, 3 pages.

Coilcraft, "Request Quotation", Exhibit 10, http://web.archive.org/web/19981205130735/www.webcom.com/liebman/us/reqquote.html, date accessed Dec. 5, 1998, 2 pages.

Coilcraft, "Magnetics for LM259X and LM267X Series Simple Switcher® switching regulators—(Colicraft Chi . . . ", Exhibit 11, http://web.archive.org/web/19990203152931/www.webcom.com/liebman/us/lm259x.html, date accessed Feb. 3, 1999, 2 pages.

Coilcraft, "Simple Switchers Magnetics—Coilcraft DO5022 Surface Mount Power Inductors", Exhibit 12, http://www.web.archlve.org/web/19990507040604/www.webcom.com/liebman/us/ndo5022.html, date accessed May 7, 1998, 2 pages.

Coilcraft, "Coilcraft Designer's Kits", Exhibit 13, http://web.archive.org/web/19981212020215/order.coilcraft.com/, date accessed Dec. 12, 1998, 8 pages.

National Semiconductor, "National Welcomes You", Exhibit 14, http://web.archive.org/web/1999100223355/www.national.com/index.html, date accessed Oct. 2, 1999, 1 page.

National Semiconductor, "Welcome to National Semiconductor", Exhibit 15, http://web.archive.org/web/19990125091026/http://national.com/, date accessed Jan. 25, 1999, 1 page.

National Semiconductor, "National Semiconductor Products Catalog: National Semiconductor", Exhibit 18, http://web.archive.org/web/19991004171048/www.national.com.catalog/, date accessed Oct. 4, 1999, 2 pages.

National Semiconductor, "National Semiconductor Products Catalog: Analog—Display Circuits", Exhibit 17, http://web.archive.org/web/19991006161509/www.national.com/catalog/AnalogDisplayCircuits.html, date accessed Oct. 6, 1999, 1 page.

National Semiconductor, "National P/N MM5452—Liquid Crystal Display Drivers", Exhibit 18, http://web.archive.org/web/19991109122620/www.national.com/pf/MM/MM5452.html, date accessed Nov. 9, 1999, 2 pages.

McDonald, "WEBENCH Video—Exhibit 19", Transim Corp., Oct. 1999.

National Semiconductor, "Si Solutions", Exhibit 20, http://web.archive.org/web/19981203063505/www.national.com/diagrams/, date accessed Dec. 3, 1998, 1 page.

National Semiconductor, "Power Management", Exhibit 21, http://web.archive.org/web/19990202185041/www.national.com/diagrams/1.html, date accessed Feb. 2, 1999, 1 page.

National Semiconductor, "Navigator Parts List", Exhibit 22, http://web.archive.org/web/19990508102458/www.national.com/diagrams/2.html, date accessed May 8, 1999, 1 page.

National Semiconductor, "National Semiconductor SIMPLE SWITCHER Converters", Exhibit 22, http://web.archive.org/web/20000115152402/www.national.com/appinfo/power/0,1768,265,00.html, date accessed Jan. 15, 2000, 1 page.

National Semoconductor, "National P/N LM2676—SIMPLE SWITCHER High Efficiency 3A Step-Down Voltage Regulator", Exhibit 24, http://web.archive.org/web/19991104213412/www.national.com/pf/LM/LM2676.html, date accessed Nov. 4, 1999, 4 pages.

National Semiconductor, "Webench Gatew", Exhibit 25, http://web.archive.org/web/20000123022807/www.national.com/appinfo/power/webench/scripts/gateway.com, date accessed Jan. 23, 2000, 1 page.

National Semiconductor, "Press Release—National Semiconductor Redesigns Web Site to Reduce "Time-to-Decision" for Engineers", Exhibit 26, http://www.national.com/news/1997/9703/web2.html, date accessed Mar. 31, 1997, 3 pages.

(56) References Cited

OTHER PUBLICATIONS

National Semiconductor, "Power-Webench Page", Exhibit 27, http://web.archive.org/web/20000817172405/www.national.com/appinfo/power/webench/, date accessed Aug. 17, 2000, 1 page.
Hleber, "Modern Times Power Supply design in Internet Times using http://Power.National.com", Power Point Presentation, National Semiconductor, Exhibit 28, 1999, 28 pages.
Hieber, "Modern Times: Power Supply Design on the Internet", Exhibit 29, http://power.national.com, date accesses Mar. 27, 2000, 8 pages.
National Semiconductor, "National Semiconductor Products Catalog: National Semiconductor Products", Exhibit 30, http://web.archive.org/web/19990423041920/www.national.com/catalog/index.html, date accessed Apr. 23, 1999, 1 page.
Gibson, "PowerPoint presentation: Relationship Management—Creating Time", Exhibit 31, www.national.com, Oct. 27, 1999, 69 pages.
Gibson, "PowerPoint presentation: Delivering Designs in Internet Time", Exhibit 32, www.national.com, Oct. 27, 1999, 41 pages.
National Semiconductor Corp., "The Design Engineer", Exhibit 33, www.national.com/design/, Jul. 23, 1999, 1 page.
Anderson, "Java for Business: Using Java to Win Customers, Cut Costs, and Drive Growth", Chapter 10, Exhibit 34, 1997, 25 pages.
National Semiconductor, "www.national.com/design/—the Design Engineer Resource", Exhibit 35, http://web.archive.org/web/19971210140744/www.national.com/design/, date accessed Dec. 10, 1997, 1 page.
National Semiconductor, "Si Solutions", Exhibit 36, http://web.archive.org/web/19990508070840/www.national.com/diagrams/, date accessed May 8, 1999, 1 page.
National Semiconductor, "Communications", Exhibit 37, http://web.archive.org/web/19990501225140/www.national.com/diagrams/524.html, date accessed May 12, 1999, 1 page.
National Semiconductor, NSC: Power Management\Distributed Power in Telecommunication\Step-Down Switching Converters, Exhibit 38, http://web.archive.org/web/199902201S3429/www.national.com/diagrams/5.html, date accessed Feb. 20, 1999, 1 page.
National Semiconductor, "National P/N LM2574HV—Series SIMPLE SWITCHER 0.5A Step-Down Voltage Regulator", Echibit 39, http://web.archive.org/web/19990128180722/www.national.com/pf/LM/LM2574HV.html, date accessed Jan. 28, 1999, 4 pages.
National Semiconductor, "National Semiconductor Selection Guide: Analog—Amplifiers: High Speed Operational Amplifiers:", Exhibit 40, http://web.archive.org/web/19981203070922/www.national.com/catalog/sg2199.html, date accessed Dec. 3, 1998, 3 pages.
National Semiconductor, "National Semiconductor Design Engineering Resources", Exhibit 41, http://web.archive.org/web/19961019012403/www.national.com/design/index.html, date accessed Oct. 19, 1996, 1 page.
National Semiconductor, "National Semiconductor Implements Three Worldwide Extranet Services to Streamline Business-to-Business", Exhibit 42, http://www.national.com/news/item/0,1735,289,00.html, date accessed May 11, 1998, 3 pages.
National Semiconductor, "National Semiconductor Launches Buy.National.Com", Exhibit 43, http://www.national.com/news/item/0,1735,353,00.html, date accessed May 1, 1999, 2 pages.
Gibson, "PowerPoint presentation: What Sells—Increasing Transactions and Views", Exhibit 44, www.national.com, Mar. 5, 1999, 61 pages.
National Semiconductor, "National Semiconductor Products Catalog: Analog—Amplifiers: High Speed Operational Amplifiers: Amp", Exhibit 45, http://web.archive.org/web/19981202011551/www.national.com/catalog/AnalogAmplifiers_HighSpeedOpe . . . , date accessed Dec. 2, 1998, 2 pages.
National Semiconductor, "National Semiconductor Power Management Home Page", Exhibit 46, http://web.archive.org/web/19990421013203/www.national.com/appinfo/power/index.html, date accessed Apr. 21, 1999, 1 page.

National Semiconductor, "Design Engineers—Information Tools, Design Tools", Exhibit 47, www.national.com, Nov. 11, 1999, 1 page.
Digital Designers, "Power Supply System Compatibility for Digital Designers", Exhibit 48, High Frequency Power Conversion 1994 Conference, Apr. 17-21, 1994, 112 pages.
National Semiconductor Corp., "The Design Engineer Resource—Primary and Secondary Tools", www.national.com/design/, Apr. 18, 1999, 1 page.
National Semiconductor, "National Semiconductor—Purchasing Resources", Exhibit 50, http://web.archive.org/web/20061206221819m_2/www.national.com/purchasing/, date accessed Dec. 6, 2006, 1 page.
United Sates District Court Eastern District of Texas Marshall Division, "Exhibit List in Support of National Semiconductor Invalidity Contentions for U.S. Patent No. 7,113,919; *eTool Development Inc. v. National Semiconductor*, Case No. 2:08-CV-196", May 19, 2009, 4 pages.
Slater, "Pconfig: a Web-based Configuration Tool for Configure-To Order Products", Knowledge-Based Systems, 1999, vol. 12, pp. 223-230.
Mittal, "Towards a Generic Model of Configuration Tasks", Knowledge Representation, Aug. 20-25, 1989, pp. 1395-1401.
Klein, "A Logic-based Description of Configuration; the Constructive Problem Solving Approach", Position Paper—AAAI 1996 Fall Symposium Workshop on Configuration, MIT, Nov. 1996, pp. 1-10b.
Attardi, "Web-based Configuration Assistants", Artificial Intelligence for Engineering Design, Analysis and Manufacturing, Sep. 1998, vol. 12, No. 4, 12 pages.
Ulrich, "The Role of Product Architecture in the Manufacturing Firm", Research Policy, 1995, vol. 24, pp. 419-440.
National Semiconductor Corp, "National P/N LMX3161—Single Chip Radio Transceiver", Exhibit 51, http://web.archive.org/web/19990129035523/www.national.com/pf/LM/LMX3161.html, Jan. 29, 1999, 3 pages.
National Semiconductor Corp., "National P/N LMV822—Low Voltage, Low Power, RRO, 5MHz OP Amps", Exhibit 52, http://web.archive.org/web/19990127110832/www.national.com/pf/LM/LMV822.html, Jan. 22, 1999, 3 pages.
National Semiconductor Corp., "SI Solutions", Exhibit 53, http://web.archive.org/web/19971210141103/www.national.com/diagrams.html, Dec. 10, 1997, 3 pages.
National Semiconductor Corp., "Design Software for Simple Switcher DC-DC Converters", Exhibit 54, http://web.archive.org/web/19990224233947/www.national.com/sw/SimpleSwitcher/0,1043,0,00.html, Feb. 24, 1999, 3 pages.
National Semiconductor Corp., "Reducing the Barriers to Simulation", Exhibit 55, http://web.archive.org/web/1999427155946/http://www.pdt.com/, Apr. 27, 1999, 1 page.
National Semiconductor Corp., "PDT Announces Breakthrough Simulation Technology, Delivers First True Simulation Over the Web", Exhibit 56, Transim Press Release, Mar. 15, 1999, 2 pages.
National Semiconductor Corp., "Switchers Made Simple", Exhibit 57, http://web.archive.org/web/19961019093743/www.national.com/models/switch/swfich.html, Oct. 19, 1996, 1 page.
National Semiconductor Corp., "Welcome to National Semiconductor", Exhibit 58, http://web.archive.org/web/19981202072829/http://www.national.com/, Dec. 2, 1998, 1 page.
National Semiconductor Corp., "National Semiconductor Models and Software", Exhibit 59, http://web.archive.org/web/19981205190719/http://www.national.com/models/, Dec. 5, 1998, 1 page.
National Semiconductor Corp., "National P/N LM161—High Speed Differential Comparator", Exhibit 60, http://web.archive.org/web/19991010013450/http://www.national.com/pf/LM/LM161.html, Oct. 10, 1999, 3 pages.
National Semiconductor Corp., "Comparing the High Speed Comparators" Exhibit 61, www.national.com, Sep. 1, 2000, 8 pages.
National Semiconductor Corp., Exhibit 62—"Photographs of early SMS Pitch Pack" Oct. 1992, 4 pages.
In the United States District Court Eastern District of Texas Marshal Division, "Defendant's Amended Invalidity Contentions Pursuant to Patent Local Rule 3-3, 3-4 and 3-6(b), including Exhibit B Index",

(56) References Cited

OTHER PUBLICATIONS

*eTool Development, Inc and eTool Patent Holding Corp.* v. *National Semiconductor Corporation*, Case No, 2:08-CV-196, Jan. 29, 2010, 19 pages.
In the United States District Court Eastern District of Texas Marshal Division, "Defendant's Preliminary Invalidity Contentions Pursuant to Patent Local Rule 3-3, 3-4 and 3-6(b), including Exhibit B Index", *eTool Development, Inc and eTool Patent Holding Corp.* v. *National Semiconductor Corporation*, Case No. 2:08-CV-196, May 19, 2009, 13 pages.
Jestice, "APEC '99: Fourteenth Annual Applied Power Electronics Conference and Exposition", Conference Proceedings, vol. 1, Mar. 14-18, 1999, pp. 71-74.
In the United States District Court Eastern District of Texas Marshal Division, Defendant's Preliminary Invalidity Contentions Pursuant to Patent Local Rule 3-3, 3-4 and 3-6(b), "Exhibit B1: Kolawa—US Patent No. 6,370,513", *eTool Development, Inc and eTool Patent Holding Corp.* v. *National Semiconductor Corporation*, Case No. 2-:08-CV-196, May 19, 2009, 37 pages.
In the United States District Court Eastern District of Texas Marshal Division, Defendant's Preliminary Invalidity Contentions Pursuant to Patent Local Rule 3-3, 3-4 and 3-6(b), "Exhibit B1 Supplemental: Kolawa—(US Patent No. 6,370,513) Alone or in Combination With Other Prior Art", *eTool Development, Inc and eTool Patent Holding Corp.* v. *National Semiconductor Corporation*, Case No. 2:08-CV-196, Jan. 29, 2010, 174 pages.
In the United States District Court Eastern District of Texas Marshal Division, Defendant's Preliminary Invalidity Contentions Pursuant to Patent Local Rule 3-3, 3-4 and 3-6(b), "Exhibit B2 Grimes—US Patent No. 5,859,414", *eTool Development, Inc and eTool Patent Holding Corp.* v. *National Semiconductor Corporation*, Case No. 2:08-CV-196, Jan. 29, 2010, 41 pages.
In the United States District Court Eastern District of Texas Marshal Division, Defendant's Preliminary Invalidity Contentions Pursuant to Patent Local Rule 3-3, 3-4 and 3-6(b), "Exhibit B2 Grimes—US Patent No. 5,859,414", *eTool Development, Inc and eTool Patent Holding Corp.* v. *National Semiconductor Corporation*, Case No. 2:08-CV-196, May 19, 2009, 41 pages.
In The United States District Court Eastern District of Texas Marshal Division, Defendant's Preliminary Invalidity Contentions Pursuant to Patent Local Rule 3-3, 3-4 and 3-6(b), "Exhibit B3: Kolawa Patent and Grimes Patent Combination", *eTool Development, Inc and eTool Patent Holding Corp.* v. *National Semiconductor Corporation*, Case No. 2:08-CV-196, Jan. 29, 2010, 50 pages.
In the United States District Court Eastern District of Texas Marshal Division, Defendant's Preliminary Invalidity Contentions Pursuant to Patent Local Rule 3-3, 3-4 and 3-6(b), "Exhibit B3: Kolawa Patent and Grimes Patent Combination", *eTool Development, Inc and eTool Patent Holding Corp.* v. *National Semiconductor Corporation*, Case No. 2:08-CV-196, May 19, 2009, 50 pages.
In the United States District Court Eastern District of Texas Marshal Division, Defendant's Preliminary Invalidity Contentions Pursuant to Patent Local Rule 3-3, 3-4 and 3-6(b), "Exhibit B4: Henson—US Patent No. 6,167,383", *eTool Development, Inc and eTool Patent Holding Corp.* v. *National Semiconductor Corporation*, Case No. 2:08-CV-196, May 19, 2009, 37 pages.
In the United States District Court Eastern District of Texas Marshal Division, Defendant's Preliminary Invalidity Contentions Pursuant to Patent Local Rule 3-3, 3-4 and 3-6(b), "Exhibit B4 Supplemental: Henson—US Patent No. 6,167,383) Alone or in Combination With Other Prior Art", *eTool Development, Inc and eTool Patent Holding Corp.* v. *National Semiconductor Corporation*, Case No. 2:06-CV-196, Jan. 29, 2010, 113 pages.
In the United States District Court Eastern District of Texas Marshal Division, Defendant's Preliminary Invalidity Contentions Pursuant to Patent Local Rule 3-3, 3-4 and 3-6(b), "Exhibit B5: Helot—US Patent No. 7,328,171", *eTool Development, Inc and eTool Patent Holding Corp.* v. *National Semiconductor Corporation*, Case No. 2:08-CV-196, May 19, 2009, 35 pages.

In the United States District Court Eastern District of Texas Marshal Division, Defendant's Preliminary Invalidity Contentions Pursuant to Patent Local Rule 3-3, 3-4 and 3-6(b), "Exhibit B5: Helot—US Patent No. 7,328,171", *eTool Development, Inc and eTool Patent Holding Corp.* v. *National Semiconductor Corporation*, Case No. 2:08-CV-196, Jan. 29, 2010, 35 pages.
In the United States District Court Eastern District of Texas Marshal Division, Defendant's Preliminary Invalidity Contentions Pursuant to Patent Local Rule 3-3, 3-4 and 3-6(b), "Exhibit B6: Henson Patent and Helot Patent Combination", *eTool Development, Inc and eTool Patent Holding Corp.* v. *National Semiconductor Corporation*, Case No. 2:08-CV-196, May 19, 2009, 48 pages.
In the United States District Court Eastern District of Texas Marshal Division, Defendant's Preliminary Invalidity Contentions Pursuant to Patent Local Rule 3-3, 3-4 and 3-6(b), "Exhibit B6: Henson Patent and Helot Patent Combination", *eTool Development, Inc and eTool Patent Holding Corp.* v. *National Semiconductor Corporation*, Case No. 2;08-CV-196, Jan. 29, 2010, 48 pages.
In the United Stales District Court Eastern District of Texas Marshal Division, Defendant's Preliminary Invalidity Contentions Pursuant to Patent Local Rule 3-3, 3-4 and 3-6(b), "Exhibit B7: House—US Patent No. 6,785,805", *eTool Development, Inc and eTool Patent Holding Corp.* v. *National Semiconductor Corporation*, Case No. 2:08-CV-196, May 19, 2009, 33 pages.
In the United States District Court Eastern District of Texas Marshal Division, Defendant's Preliminary Invalidity Contentions Pursuant to Patent Local Rule 3-3, 3-4 and 3-6(b), "Exhibit B7: House—US Patent No. 6,785,805", *eTool Development, Inc and eTool Patent Holding Corp.* v. *National Semiconductor Corporation*, Case No. 2:08-CV-196, Jan. 29, 2010, 33 pages.
In the United States District Court Eastern District of Texas Marshal Division, Defendant's Preliminary Invalidity Contentions Pursuant to Patent Local Rule 3-3, 3-4 and 3-6(b), "Exhibit B8: Robertson—US Patent No. 6,594,799", *eTool Development, Inc and eTool Patent Holding Corp.* v. *National Semiconductor Corporation*, Case No. 2:08-CV-196, May 19, 2009, 34 pages.
In the United States District Court Eastern District of Texas Marshal Division, Defendant's Preliminary Invalidity Contentions Pursuant to Patent Local Rule 3-3, 3-4 and 3-6(b), "Exhibit B8: Robertson—US Patent No. 6,594,799", *eTool Development, Inc and eTool Patent Holding Corp,* v. *National Semiconductor Corporation*, Case No. 2;08-CV-196, Jan. 29, 2010 , 34 pages.
In the United States District Court Eastern District of Texas Marshal Division, Defendant's Preliminary Invalidity Contentions Pursuant to Patent Local Rule 3-3, 3-4 and 3-6(b), "Exhibit B9: Wilmott—US Patent No. 6,782,307, and U.S. Appl. Nos. 60/216,847, 60/191,878 and 60/179,057", *eTool Development, Inc and eTool Patent Holding Corp.* v. *National Semiconductor Corporation*, Case No. 2:08-CV-196, May 19, 2009, 31 pages.
In the United States District Court Eastern District of Texas Marshal Division, Defendant's Preliminary Invalidity Contentions Pursuant to Patent Local Rule 3-3, 3-4 and 3-6(b), "Exhibit B9: Wilmott—US Patent No. 6,782,307, and U.S. Appl. Nos. 60/216,847, 60/191,878 and 60/179,057", *eTool Development, Inc and eTool Patent Holding Corp.* v. *National Semiconductor Corporation*, Case No. 2:08-CV-196, Jan. 29, 2010, 31 pages.
In the United States District Court Eastern District of Texas Marshal Division, Defendant's Preliminary Invalidity Contentions Pursuant to Patent Local Rule 3-3, 3-4 and 3-6(b), "Exhibit B10: Motomiya—US Patent No. 6,083,267", *eTool Development, Inc and eTool Patent Holding Corp.* v. *National Semiconductor Corporation*, Case No. 2:08-CV-196, May 19, 2009, 35 pages.
In the United States District Court Eastern District of Texas Marshal Division, Defendant's Preliminary Invalidity Contentions Pursuant to Patent Local Rule 3-3, 3-4 and 3-6(b), "Exhibit B10: Motomiya—US Patent No. 6,083,267", *eTool Development, Inc and eTool Patent Holding Corp.* v. *National Semiconductor Corporation*, Case No. 2:08-CV-196, Jan. 29, 2010, 35 pages.
In the United States District Court Eastern District of Texas Marshal Division, Defendant's Preliminary Invalidity Contentions Pursuant to Patent Local Rule 3-3, 3-4 and 3-6(b), "Exhibit B11: Delorme—US Patent No. 5,948,040", *eTool Development, Inc and eTool Patent*

(56) References Cited

OTHER PUBLICATIONS

*Holding Corp. v. National Semiconductor Corporation*, Case No. 2:08-CV-196, May 19, 2009, 30 pages.
In the United States District Court Eastern District of Texas Marshal Division, Defendant's Preliminary Invalidity Contentions Pursuant to Patent Local Rule 3-3, 3-4 and 3-6(b), "Exhibit B11: Delorme—US Patent No. 5,948,040", *eTool Development, Inc and eTool Patent Holding Corp. v. National Semiconductor Corporation*, Case No. 2:08-CV-196, Jan. 29, 2010, 30 pages.
In the United States District Court Eastern District of Texas Marshal Division, Defendant's Preliminary Invalidity Contentions Pursuant to Patent Local Rule 3-3, 3-4 and 3-6(b), "Exhibit B12: Beall—US Patent No. 6,169,992", *eTool Development, Inc and eTool Patent Holding Corp. v. National Semiconductor Corporation*, Case No. 2:08-CV-196, May 19, 2009, 36 pages.
In the United States District Court Eastern District of Texas Marshal Division, Defendant's Preliminary Invalidity Contentions Pursuant to Patent Local Rule 3-3, 3-4 and 3-6(b), "Exhibit B12: Beall—US Patent No. 6,169,992", *eTool Development, Inc and eTool Patent Holding Corp. v. National Semiconductor Corporation*, Case No. 2:08-CV-196, Jan. 29, 2010, 36 pages.
In the United States District Court Eastern District of Texas Marshal Division, Defendant's Preliminary Invalidity Contentions Pursuant to Patent Local Rule 3-3, 3-4 and 3-6(b), "Exhibit B13: Lynch—US Patent No. 5,708,798", *eTool Development, Inc and eTool Patent Holding Corp, v. National Semiconductor Corporation*, Case No. 2:08-CV-196, May 19, 2009, 78 pages.
In the United States District Court Eastern District of Texas Marshal Division, Defendant's Preliminary Invalidity Contentions Pursuant to Patent Local Rule 3-3, 3-4 and 3-6(b), "Exhibit B13 Supplemental: Lynch—(US Patent No. 5,708,798) In Combination with other Prior Art", *eTool Development, Inc and eTool Patent Holding Corp. v. National Semiconductor Corporation*, Case No. 2:08-CV-196, Jan. 29, 2010, 115 pages.
In the United States District Court Eastern District of Texas Marshal Division, Defendant's Preliminary Invalidity Contentions Pursuant to Patent Local Rule 3-3, 3-4 and 3-6(b), "Exhibit B14: Puri—US Patent No. 6,064,982", *eTool Development, Inc and eTool Patent Holding Corp. v. National Semiconductor Corporation*, Case No. 2:08-CV-196; May 19, 2009, 144 pages.
In the United States District Court Eastern District of Texas Marshal Division, Defendant's Preliminary Invalidity Contentions Pursuant to Patent Local Rule 3-3, 3-4 and 3-6(b), "Exhibit B14: Puri—US Patent No. 6,064,982", *eTool Development, Inc and eTool Patent Holding Corp. v. National Semiconductor Corporation*, Case No. 2:08-CV-196, Jan. 29, 2010, 144 pages.
In the United States District Court Eastern District of Texas Marshal Division, Defendant's Preliminary Invalidity Contentions Pursuant to Patent Local Rule 3-3, 3-4 and 3-6(b), "Exhibit B15: Hennessey Patent and Blinn Patent Combination", *eTool Development, Inc and eTool Patent Holding Corp. v. National Semiconductor Corporation*, Case No. 2:08-CV-196, May 19, 2009, 30 pages.
In the United States District Court Eastern District of Texas Marshal Division, Defendant's Preliminary Invalidity Contentions Pursuant to Patent Local Rule 3-3, 3-4 and 3-6(b), "Exhibit B15: Hennessey Patent and Blinn Patent Combination", *eTool Development, Inc and eTool Patent Holding Corp. v. National Semiconductor Corporation*, Case No. 2:08-CV-196, Jan. 29, 2010, 30 pages.
In the United States District Court Eastern District of Texas Marshal Division, Defendant's Preliminary Invalidity Contentions Pursuant to Patent Local Rule 3-3, 3-4 and 3-6(b), "Exhibit B16: Motomiya Patent and Paseman Patent Combination", *eTool Development, Inc and eTool Patent Holding Corp. v. National Semiconductor Corporation*, Case No. 2:08-CV-196, May 19, 2009, 49 pages.
In the United States District Court Eastern District of Texas Marshal Division, Defendant's Preliminary Invalidity Contentions Pursuant to Patent Local Rule 3-3, 3-4 and 3-6(b), "Exhibit B16: Motomiya Patent and Paseman Patent Combination", *eTool Development, Inc and eTool Patent Holding Corp. v. National Semiconductor Corporation*, Case No. 2:08-CV-196, Jan. 29, 2010, 49 pages.

In the United States District Court Eastern District of Texas Marshal Division, Defendant's Preliminary Invalidity Contentions Pursuant to Patent Local Rule 3-3, 3-4 and 3-6(b), "Exhibit B17: Fredlund—US Patent No. 5,666,215", *eTool Development, Inc and eTool Patent Holding Corp. v. National Semiconductor Corporation*, Case No. 2:08-CV-196, May 19, 2009, 30 pages.
In the United States District Court Eastern District of Texas Marshal Division, Defendant's Preliminary Invalidity Contentions Pursuant to Patent Local Rule 3-3, 3-4 and 3-6(b), "Exhibit B17: Fredlund—US Patent No. 5,666,215", *eTool Development, Inc and eTool Patent Holding Corp. v. National Semiconductor Corporation*, Case No. 2:08-CV-196, Jan. 29, 2010, 30 pages.
In the Untied States District Court Eastern District of Texas Marshal Division, Defendant's Preliminary Invalidity Contentions Pursuant to Patent Local Rule 3-3, 3-4 and 3-6(b), "Exhibit B18: Barck—US Patent No. 7,003,548", *eTool Development, Inc and eTool Patent Holding Corp. v. National Semiconductor Corporation*, Case No. 2:08-CV-196, May 19, 2009, 29 pages.
In the United States District Court Eastern District of Texas Marshal Division, Defendant's Preliminary Invalidity Contentions Pursuant to Patent Local Rule 3-3, 3-4 and 3-6(b), "Exhibit B18 Supplemental: Barck—(US Patent No. 7,003,548) Alone or In Combination with other prior art", *eTool Development, Inc and eTool Patent Holding Corp. v. National Semiconductor Corporation*, Case No. 2:08-CV-196, Jan. 29, 2010, 106 pages.
In the United States District Court Eastern District of Texas Marshal Division, Defendant's Preliminary Invalidity Contentions Pursuant to Patent Local Rule 3-3, 3-4 and 3-6(b), "Exhibit B19: Gupta Patent and Barck Patent Combination", *eTool Development, Inc and eTool Patent Holding Corp, v. National Semiconductor Corporation*, Case No. 2:08-CV-196, May 19, 2009, 30 pages.
In the United States District Court Eastern District of Texas Marshal Division, Defendant's Preliminary Invalidity Contentions Pursuant to Patent Local Rule 3-3, 3-4 and 3-6(b), "Exhibit B19: Gupta Patent and Barck Patent Combination", *eTool Development, Inc and eTool Patent Holding Corp. v. National Semiconductor Corporation*, Case No. 2:08-CV-196, Jan. 29, 2010, 30 pages.
In the United States District Court Eastern District of Texas Marshal Division, Defendant's Preliminary Invalidity Contentions Pursuant to Patent Local Rule 3-3, 3-4 and 3-6(b), "Exhibit B20: Geller—US Patent No. 6,300,948", *eTool Development, Inc and eTool Patent Holding Corp. v. National Semiconductor Corporation*, Case No. 2:08-CV-196, May 19, 2009, 29 pages.
In the United States District Court Eastern District of Texas Marshal Division, Defendant's Preliminary Invalidity Contentions Pursuant to Patent Local Rule 3-3, 3-4 and 3-6(b), "Exhibit B20: Geller—US Patent No. 6,300,948", *eTool Development, Inc and eTool Patent Holding Corp. v. National Semiconductor Corporation*, Case No. 2:08-CV-196, Jan. 29, 2010, 29 pages.
In the United States District Court Eastern District of Texas Marshal Division, Defendant's Preliminary Invalidity Contentions Pursuant to Patent Local Rule 3-3, 3-4 and 3-6(b), "Exhibit B21: Hiroyuki—Japanese Published Application No. 2000-020589", *eTool Development, Inc and eTool Patent Holding Corp. v. National Semiconductor Corporation*, Case No. 2:08-CV-196, May 19, 2009, 31 pages.
In the United States District Court Eastern District of Texas Marshal Division, Defendant's Preliminary Invalidity Contentions Pursuant to Patent Local Rule 3-3, 3-4 and 3-6(b), "Exhibit B21: Hiroyuki—Japanese Published Application No. 2000-020589", *eTool Development, Inc and eTool Patent Holding Corp. v. National Semiconductor Corporation*, Case No. 2:08-CV-196, Jan. 29, 2010, 31 pages.
In the United States District Court Eastern District of Texas Marshal Division, Defendant's Preliminary Invalidity Contentions Pursuant to Patent Local Rule 3-3, 3-4 and 3-6(b), "Exhibit B22: Rose—PCT Publication No. WO 98/15904", *eTool Development, Inc and eTool Patent Holding Corp. v. National Semiconductor Corporation*, Case No. 2:08-CV-196, May 19, 2009, 31 pages.
In the United States District Court Eastern District of Texas Marshal Division, Defendant's Preliminary Invalidity Contentions Pursuant to Patent Local Rule 3-3, 3-4 and 3-6(b), "Exhibit B22: Rose—PCT Publication No. WO 98/15904", *eTool Development, Inc and eTool Patent Holding Corp. v. National Semiconductor Corporation*, Case No. 2:08-CV-196, Jan. 29, 2010, 31 pages.

(56) References Cited

OTHER PUBLICATIONS

In the United States District Court Eastern District of Texas Marshal Division, Defendant's Preliminary Invalidity Contentions Pursuant to Patent Local Rule 3-3, 3-4 and 3-6(b), "Exhibit B23: Webench Tools when used with the National website", *eTool Development, Inc and eTool Patent Holding Corp. v. National Semiconductor Corporation*, Case No. 2:08-CV-198, May 19, 2009, 80 pages.
In the United States District Court Eastern District of Texas Marshal Division, Defendant's Preliminary Invalidity Contentions Pursuant to Patent Local Rule 3-3, 3-4 and 3-6(b), "Exhibit B23 Supplemental: Webench Tools when used with the National website", *eTool Development, Inc and eTool Patent Holding Corp. v. National Semiconductor Corporation*, Case No. 2:08-CV-196, Jan. 29, 2010, 91 pages.
In the United States District Court Eastern District of Texas Marshal Division, Defendant's Preliminary Invalidity Contentions Pursuant to Patent Local Rule 3-3, 3-4 and 3-6(b), "Exhibit B24: Solutions Tools when used with the National Website", *eTool Development, Inc and eTool Patent Holding Corp. v. National Semiconductor Corporation*, Case No. 2:08-CV-196, May 19, 2009, 79 pages.
In the United States District Court Eastern District of Texas Marshal Division, Defendant's Preliminary Invalidity Contentions Pursuant to Patent Local Rule 3-3, 3-4 and 3-6(b), "Exhibit B24: Solutions Tools when used with the National Website", *eTool Development, Inc and eTool Patent Holding Corp. v. National Semiconductor Corporation*, Case No. 2:08-CV-196, Jan. 29, 2010, 75 pages.
In tho United States District Court Eastern District of Texas Marshal Division, Defendant's Preliminary Invalidity Contentions Pursuant to Patent Local Rule 3-3, 3-4 and 3-6(b), "Exhibit B25: Switichers Made Simple Software v. 5.0", *eTool Development, Inc and eTool Patent Holding Corp. v. National Semiconductor Corporation*, Case No. 2:08-CV-196, May 19, 2009, 65 pages.
In the United States District Court Eastern District of Texas Marshal Division, Defendant's Preliminary Invalidity Contentions Pursuant to Patent Local Rule 3-3, 3-4 and 3-6(b), "Exhibit B25 Supplemental: Switichers Made Simple Software v. 5.0 aka LM267 Made Easy V2,01 ("SMS")", *eTool Development, Inc and eTool Patent Holding Corp, v. National Semiconductor Corporation*, Case No. 2:08-CV-196, Jan. 29, 2010, 92 pages.
In the United States District Court Eastern District of Texas Marshal Division, Defendant's Preliminary Invalidity Contentions Pursuant to Patent Local Rule 3-3, 3-4 and 3-6(b), "Exhibit B26: Combination System SMS 5.0 Software with pcANYWHERE Software", *eTool Development, Inc and eTool Patent Holding Corp. v. National Semiconductor Corporation*, Case No. 2:08-CV-196, May 19, 2009, 67 pages.
In the United States District Court Eastern District of Texas Marshal Division, Defendant's Preliminary Invalidity Contentions Pursuant to Patent Local Rule 3-3, 3-4 and 3-6(b), "Exhibit B26: Combination System SMS 5.0 Software with pcANYWHERE Software", *eTool Development, Inc and eTool Patent Holding Corp. v. National Semiconductor Corporation*, Case No. 2:08-CV-196, Jan. 29, 2010, 67 pages.
In the United States District Court Eastern District of Texas Marshal Division, Defendant's Preliminary Invalidity Contentions Pursuant to Patent Local Rule 3-3, 3-4 and 3-6(b), "Exhibit B27: SEYBOLD—Customers.com® Stratigic Planning Service: Understanding the B2B and E-Market Landscape, Focused Research Collection", *eTool Development, Inc and eTool Patent Holding Corp, v. National Semiconductor Corporation*, Case No. 2:08-CV-196, May 19, 2009, 110 pages.
In the United States District Court Eastern District of Texas Marshal Division, Defendant's Preliminary Invalidity Contentions Pursuant to Patent Local Rule 3-3, 3-4 and 3-6(b), "Exhibit B27: SEYBOLD—Customers.com® Stratigic Planning Service: Understanding the B2B and E-Market Landscape, Focused Research Collection", *eTool Development, Inc and eTool Patent Holding Corp. v. National Semiconductor Corporation*, Case No. 2:08-CV-196, Jan. 29, 2010, 110 pages.
In the United States District Court Eastern District of Texas Marshal Division, Defendant's Preliminary Invalidity Contentions Pursuant to Patent Local Rule 3-3, 3-4 and 3-6(b), "Exhibit B28 (Supplemental): McGuinness and Wright in Combination with other prior art", *eTool Development, Inc and eTool Patent Holding Corp, v. National Semiconductor Corporation*, Case No. 2:08-CV-196, Jan. 29, 2010, 124 pages.
National Semiconductor, "System Diagrams: Battery Monitoring", http://web.archive.org/web/20001121235000/www.national.com/diagrams/PM_BatteryMonitoring.html, May 14, 2009, 1 page.
National Semiconductor, "Systems Diagrams: Battery Power Supply", http://web.archive.org/web/20001122010900/www.national.com/diagrams/PM_BatteryPowerSupply.html, May 14, 2009, 1 page.
National Semiconductor, "Simplls Simulation Login Page: Welcome to Power Design Tools WebSIM", http://web.archive.org/web/19991002040802/www.national.com/appinfo/power/http://web.archive.org/web/19991007183131/www.pdt.com/national_sim/nsc_sim.html, May 14, 2009, 1 page.
National Semiconductor, "National Semiconductors Products Catalog: Analog—Flat Panel Display", http://web.archive.org/web/19991007040406/www.national.com/catalog/AnalogFlatPanelDisplay.html, May 19, 2009, 1 page.
National Semiconductor, "National P/N LMX2325—PLLatinum 2.5 GHz Frequency Synthesizer for RF Personal Communications", http://web.archive.org/web/20000304075734/http://www.national.com/pf/LM/LMX2325.html#Datasheet, May 14, 2009, 3 pages.
National Semiconductor, "National P/N 54FCT138—1-of-8 Decoder/Demultiplexer", http://web.archive.org/web/20001006175007/http://www.national.com/pf/54/54FCT138.html#Datasheet, May 14, 2009, 2 pages.
National Semiconductor, "National Semiconductor Power Home Page: Power.National.Com", http://web.archive.org/web/20010124040200/www.national.com/appinfo/power/, May 14, 2009, 2 pages.
National Semiconductor, "National Semiconductor Power Home Page: Power.National.Com", http://web.archive.org/web/20000919185443/www2.national.com/appinfo/power/, May 14, 2009, 2 pages.
National Semiconductor, "National Semiconductor Power Home Page: Power.National.Com", http://web.archive.org/web/20000815214223/www.national.com/appinfo/power/, May 14, 2009, 2 pages.
National Semiconductor, "National Semiconductor Wireless.National.Com", http://web.archive.org/web/20000817130549/www.national.com/appinfo/wireless/, May 14, 2009, 2 pages.
National Semiconductor, "How to use Webench", http://web.archive.org/web/20000817172026/www.national.com/appinfo/webench/help.html, May 14, 2009.
National Semiconductor, "ADI—Typical ATE Signal Chain" http://web.archive.org/web/200009010522/www.analog.com/industry/signal_chains/auto/instrumentation/inst_4.html, May 14, 2009.
National Semiconductor, "ADI—Digital Still Camera" http://web.archive.org/web/20000303235546/www.analog.com/industry/signal_chains/auto/consumer/cons_2.html, May 14, 2009, 1 page.
National Semiconductor, ADI—Product Center: Industry's First 32-Bit; Floating-Point Implementation of the Lucasfilm THX Multi-Channel Digital Audio Post-Processor http://web.archive.org/web/20000516000537/products.analog.com/products/info.asp?product=ADSST-MEL-THX, May 14, 2009.
National Semiconductor, "DSPTel Caller Identification (Type I, Type II)" http://web.archive.org/web/20000616082804/products.analog.com/products/Info.asp?product=ADSST-CID, May 14, 2009, 3 pages.
National Semiconductor, "ADSST-EM-3010 SalemTM-3T Microcontroller + DSP-Based Tri-Vector Meter" http://web.archive.org/web/20000417100129/products.analog.com/products/info.asp?product=ADSST-EM-3010, May 14, 2009, 1 page.
National Semiconductor, "Using ADI's Parametric Search", http://web.archive.org/web/20000304142419/catalog.analog.com/, May 19, 2009, 1 page.
National Semiconductor, "Signal Chair Solutions", http://web.archive.org/web/20000901075811/www.analog.com/Industry/communications/wireless/wireless_chain.html, May 14, 2009, 1 page.

(56) References Cited

OTHER PUBLICATIONS

National Semiconductor, "High Speed Amplifiers", http://web.archive,org/web/20000831045850/http://www.analog.com/support/standard_linear/selection_guides/chart.html#High, May 14, 2009, 3 pages.

National Semiconductor, "Selection Guides", http://web.archive.org/web/20010517130348/http://www.analog.com/product/selection_guides.html#video, May 14, 2009, 4 pages.

National Semiconductor, "Selection Guides", http://web.archive.org/web/20010517130348/http://www.analog.com/product/selection_guides.html#military, May 14, 2009, 4 pages.

National Semiconductor, "Selections Guides", http://web.archive.org/web/20010517130348/http://www.analog.com/product/selection_guides.html#energy, May 14, 2009, 4 pages.

National Semiconductor, "Maxim—Parametric Search—Product Table", http://web.archive.org/web/20010619084006rn_1/para.maxim-ic.com/ss.asp?FAM=Vid_Line&TREE=Amps.asp&HP=AmpComp.cfm&SORD=, May 14, 2009, 2 pages.

National Semiconductor, "Maxim—Pagers", http://web.archive.org/web/20000706205813/http://www.maxim-ic.com/, May 14, 2009, 1 page.

National Semiconductor, "Automotive: Car Multi-Media", http://web.archive.org/web/20000711080234/http://www.ti.com/sc/docs/apps/automotive/car_multi_media.html#Block_Diagrams, May 14, 2009, 1 page.

National Semiconductor, "Product Folder:TPA005DO2, 2 W Stereo Class-D Audio Amplifier", http://web.archive.org/web/20001012044451/http://www.ti.com/sc/docs/products/analog/tpa005d02.html#Datasheets, May 14, 2009, 3 pages.

Barlas, "Spend Analysis Software-Spend Analysis on a Data-warehouse for detailed spend analysis www.zycus.com", Line56.com National Semiconductor, http://www.line56.com/print/default.asp?ArticleID=4491, Mar. 14, 2003, 1-3.

LaSalle et al., "Turning Ordinary Products into Extraordinary Experiences", Priceless, Harvard Business School Press, Copyright 2003, 6 pages.

National Semiconductor, "Webench Online Design Environment Design Today, Prototype Tomorrow", www.national.com, 2006, 1-4.

Perry, "Power supply Design Using Webench", National Semiconductor, Online Seminar, http://web.archive.orgweb20050228033333www.national.comonlineseminar2003webenchtranscript.html, Copyright 2003, 8 pages.

Perry, "Power Supply Design Using Webench", National Semiconductor, Nov. 6, 2003, 1-60.

* cited by examiner

FIG. 3

VISUALIZATION OF TRADEOFFS BETWEEN CIRCUIT DESIGNS

CROSS-REFERENCE TO RELATED APPLICATIONS

This application is a continuation-in-part of U.S. application Ser. No. 12/020,535, filed on Jan. 26, 2008, which is incorporated herein by reference in its entirety.

BACKGROUND

Power supplies perform the conversion of one form of electrical power to another. Some power supplies convert AC line voltage to a well-regulated and typically lower-voltage DC for electronic devices. Other power supplies convert DC into DC at a desired voltage and current. A power supply may be designed to meet design requirements that call for production of a desired voltage and current from a desired input source. In addition, design parameters such as power supply efficiency, component and printed circuit board footprint size, and overall component cost may be considered when designing a power supply.

BRIEF DESCRIPTION OF THE DRAWINGS

FIG. 3 illustrates an alternate exemplary power supply design.

DETAILED DESCRIPTION

Figure 1:
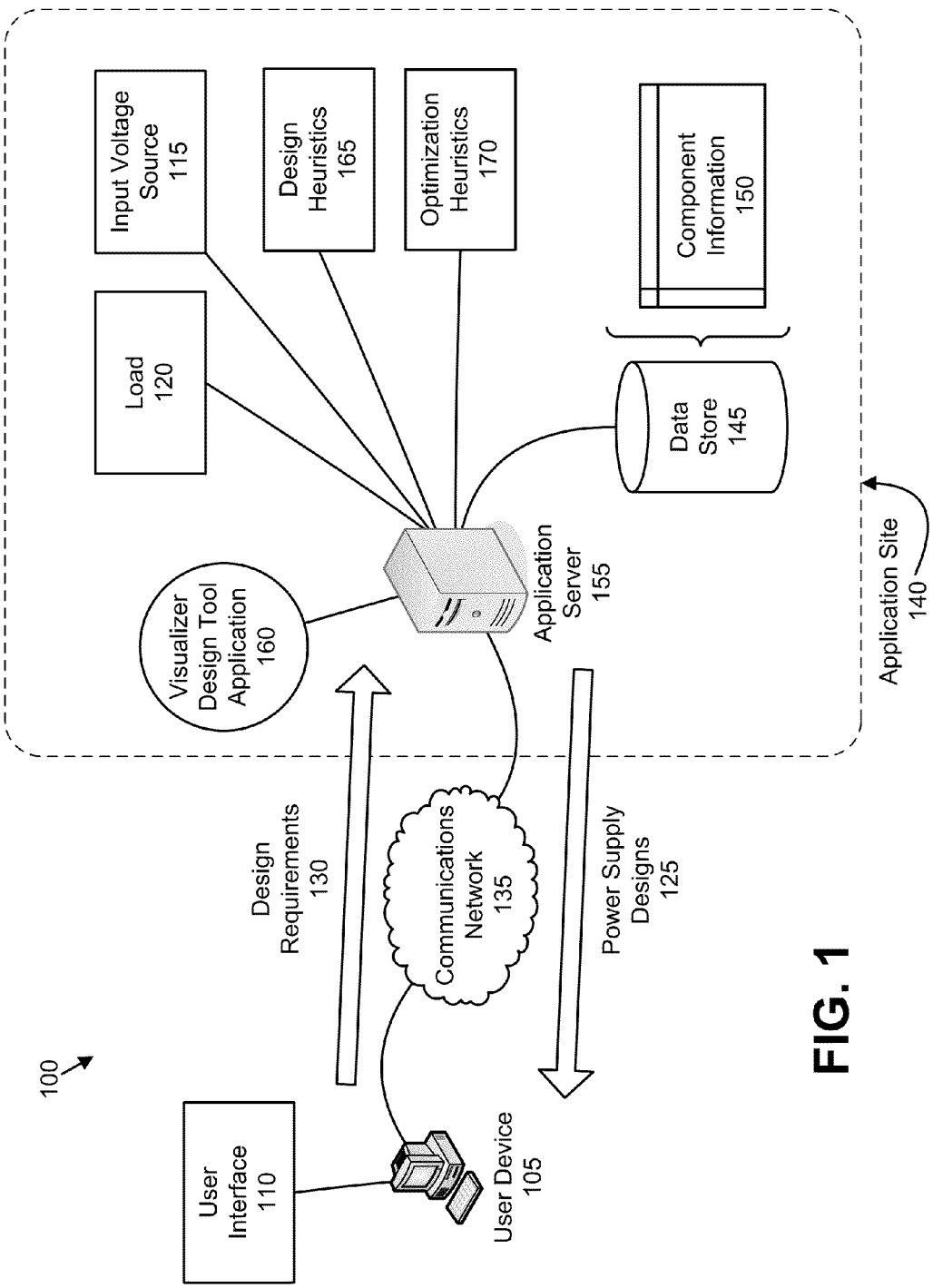
FIG. 1 illustrates an exemplary system for determining and visualizing power supply designs.

A design tool may dynamically calculate many designs for a given circuit design problem, each design having different characteristics and embodying different design tradeoffs. To allow a user to determine which one of the designs is best for the user's application, the design tool may allow the user to visualize the tradeoffs between a multitude of circuit designs.

For example, a manufacturer of power supply components may be able to supply on the order of dozens of possible designs that satisfy a given set of power supply requirements. These designs may include various power supply components and supporting components to allow the power supply components to function for the particular application. Additionally, these different designs may take up different footprints, have different electrical efficiency ratings, and have different component costs.

Comparing each of the possible designs by hand to determine an appropriate power supply design may require significant work. For example, using the WEBENCH Power Designer provided by National Semiconductor, a user may create each power supply design individually, simulate each individual design, and compare the resultant simulations to one another to determine the most preferred design. Depending on the number of possible designs, and the number of loads requiring power, this process may take many days or weeks.

To overcome these and other deficiencies in existing design tools, a design tool may allow a user to create multiple possible designs at once for a given set of design requirements. The design tool may allow the user to create the set of designs optimized for desired characteristics such as efficiency, footprint, bill of materials cost, peak to peak voltage ripple or other key parameters.

The design tool may further allow the user to specify key parameters of the designs to visually compare. This allows the user to immediately compare different options in a graphical manner and choose the best one for the user's needs. The design tool may display the results in a tabular form which can be filtered using various graphical user interface controls such as sliders or selection boxes. In addition to displaying the designs in a tabular list, the design tool may further display the results in graphical form to allow the user to visually see the differences in the designs such as footprint vs. efficiency vs. cost. Plotting of more than two dimensions may be performed using varying dot/bubble sizes and colors. Through use of these visualizations of the design tradeoffs, a user may easily determine which of the designs is best suited to the intended application.

While the design tool is described herein with respect to power supply designs, the design tool may be equally applicable to many other circuit design problems, such as circuit designs for LED arrays, operational amplifiers, audio amplifiers, filters, low-voltage differential signaling systems, analog-to-digital converters, sensor circuits, and phase-locked loops, among others types of circuit designs.

FIG. 1 illustrates an exemplary system 100 for determining and visualizing power supply designs. As illustrated in FIG. 1 the exemplary system includes a user device 105 configured to provide a user interface 110 configured to receive design requirements 130 including an input voltage source 115 and a load 120 and display a set of power supply designs 125 responsive to the design requirements 130. The system 100 further includes a communications network 135 in selective communication with the user device 105 and an application site 140. The application site 140 includes a data store 145 configured to store component information 150. The application site 140 further includes an application server 155 configured to run a visualizer design tool application 160. The visualizer design tool application 160 may receive the design requirements 130, and may produce the set of power supply designs 125 responsive to the design requirements 130, relevant design heuristics 165 and optimization heuristics 170, as well as selected component information 150 from the data store 145. System 100 may take many different forms and include multiple and/or alternate components and facilities. While an exemplary system 100 is shown in FIG. 1, the exemplary components illustrated in Figure are not intended to be limiting. Indeed, additional or alternative components and/or implementations may be used.

The user device 105 may be a device configured to be operated by one or more users, such as a cellular telephone, laptop computer, tablet computing device, personal digital assistant, or desktop computer workstation, among others. The user device 105 may include one or more components capable of receiving input from a user, and providing output to the user.

The user interface 110 may be an interface configured to allow for the effective operation and control of the user device 105. The user interface 110 may further provide feedback and other output to the user to aid the user in making operational decisions with respect to the user device 105. Exemplary user interfaces 110 may include input devices such as keyboards, buttons, and microphones, and output devices such as display screens and loudspeakers. As a particular example, a user interface 110 may be implemented by way of one or more web pages displayed by the user device 105 by way of a web browser software program. Such a web-based user interface 110 may accept input from a user by way of one or more controls on a web page and may provide output by displaying web pages to the user including feedback or other outputs of the system 100. As another example, a user interface 110 may be implemented by way of a self contained rich internet application (RIA) utilizing an engine such as Adobe Flash, where the RIA may accept input from a user by way of one or more controls and provide output that may be viewed by the user on the user device 105.

An input voltage source 115 may be a device or system that produces or derives an electromotive force between its terminals. Input voltage sources 115 may be defined according to the voltage and maximum current draw they provide, and may further be defined according to a name to aid in identification. A load 120 may be an electrical or other circuit that requires electrical power to operate. Loads 120 may be defined as a required voltage and maximum current draw. Loads 120 may further be defined according to a name or other identifier to aid in their identification. A power supply may be a source of electrical power, and a power supply design 125 may be a circuit including various components that draw power from one or more input voltage sources 115 and supply electrical energy to at least one load 120.

The design requirements 130 may include information regarding the design of a set of solutions to a circuit design problem. For example, the design requirements 130 may include information regarding a power supply load 120 to be powered by an input voltage source 115. The information regarding the load 120 to be powered may include information such as a required voltage, a required current, a name or other identifier, and other power supply attributes of the loads 120. The information regarding the input voltage source 115 may include information such as minimum, maximum, and nominal input voltage, maximum input current, and other design inputs about one or more input voltage sources 115. The information may further include additional power supply parameters, such as ambient temperature.

The communications network 135 may include a mixture of wired (e.g., fiber and copper) and wireless mechanisms that incorporate related infrastructure and accompanying network elements. Illustrative communication networks 135 may include the Internet, an intranet, the Public Switched Telephone Network (PSTN), and a cellular telephone network. The communications network 135 may include multiple interconnected networks and/or sub-networks that provide communications services, including data transfer and other network services to at least one user device 105 connected to the communications network 135.

The communications network 135 may be in selective communication with an application site 140. The application site 140 may be a hosting platform, such as a web hosting platform, configured to make applications available over the communications network 135. To perform the hosting functions, the application site 140 may include computing devices such as one or more data stores 145 and application servers 155.

The data store 145 may include one or more data storage mediums, devices, or configurations, and may employ various types, forms, and/or combinations of storage media, including but not limited to hard disk drives, flash drives, read-only memory, and random access memory. The data store 145 may include various technologies useful for storing and accessing any suitable type or form of electronic data, which may be referred to as content. Content may include computer-readable data in any form, including, but not limited to video, image, text, document, audio, audiovisual, metadata, and other types of files or data. In some instances content may be stored in a relational format, such as via a relational database management system (RDBMS), while in other instances content may be stored in a hierarchical or flat file system. In particular, the data store 145 may store content including component information 150. Notably, the data store 145 maintains information with respect to individual components, not completed designs, solutions, or formulations.

The component information 150 may include information on the individual components, such as power supply regulators (switching regulators, low drop out regulators (LDOs), switched capacitors or other types of voltage regulators), capacitors, resistors, diodes, etc. Component information 150 may be received from manufacturers or suppliers in various forms, such as parts information sheets, parts catalogs, schematics, among others. The received component information 150 may be formatted and saved into the data store 145 for use in determining designs. Exemplary component information 150 may include part cost, whether the part is in stock, part dimensions and footprint, pin configuration, minimum and maximum ranges of operation, light output, heat sink requirements, efficiency information, graphs of various characteristics of operation, among other exemplary characteristics. The component information 150 includes information about the components themselves, not the components in combination with other components.

The application site 140 may further include an application server 155. The application server 155 may be implemented as a combination of hardware and software, and may include one or more software applications or processes for causing one or more computer processors to perform the operations of the application server 155 described herein.

A visualizer design tool application 160 may be one application included on the application server 155, wherein the visualizer design tool application 160 may be implemented at least in part by instructions stored on one or more computer-readable media. The visualizer design tool application 160 may include instructions to cause the application server 155 to receive design requirements 130 relating to an input voltage source 115 and a load 120, query the data store 145 for component information 150 related to the design requirements 130, produce a set of power supply designs 125 responsive to the design requirements 130 and component information 150, and provide for visualization of the determined power supply designs 125 for further analysis and use.

The visualizer design tool application 160 may utilize design heuristics 165 when determining the set of power supply designs 125 responsive to the design requirements 130. Design heuristics 165 may include rules related to the generation of different power supply topologies (e.g., Boost, Buck, Buck-Boost, etc.) which may be appropriate to power the loads 120 specified by the design requirements 130.

The visualizer design tool application 160 may utilize optimization heuristics 170 when determining the set of power supply designs 125 responsive to the design requirements 130. These optimizations may guide the determination of some or even all of the components and supporting component of the power supply designs 125. Optimization heuristics 170 may be responsive to design requirements 130 indicative of tradeoffs between various design goals, and may be utilized to prefer one or more parameters over other parameters of a component or design. Design goals to be optimized by optimization heuristics 170 may include small component footprint, efficiency, cost, thermal dissipation, and power utilized, among others. As an example, an optimization heuristic 170 for designs with a smaller footprint may optimize for size by choosing components with relatively smaller footprints that still satisfy the design requirements 130, but at the expense of other parameters such as efficiency. As another example, an optimization heuristic 170 for designs with a higher efficiency may optimize by choosing components capable of being utilized at a relatively lower switching frequency while still satisfying the design requirements 130, but at the expense of other parameters such as cost.

Computer-executable instructions may be compiled or interpreted from computer programs created using a variety of well known programming languages and/or technologies, including, without limitation, and either alone or in combination, Java™, C, C++, Visual Basic, Java Script, Perl, PL/SQL, Actionscript, etc. The visualizer design tool application 160 may accordingly be written at least in part according to a number of these and other programming languages and technologies, or a combination thereof.

In some instances, the visualizer design tool application 160 is provided as software that when executed by a processor of the application server 155 provides the operations described herein. Alternatively, the visualizer design tool application 160 may be provided as hardware or firmware, or combinations of software, hardware and/or firmware. An exemplary modularization of the visualizer design tool application 160 is discussed in further detail below with respect to FIG. 5.

In general, computing systems and/or devices, such as user device 105, application server 155, and data store 145 may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices, such as data store 145 and application server 155 generally include computer-executable instructions, where the instructions may be executable by one or more computing devices such as those listed above. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as such as data store 145 described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While FIG. 1 illustrates an exemplary system 100, other implementations may be used. In some implementations, the system 100 may be implemented as an off-line or self-contained computing device based configuration. In such an implementation, the application server 155 and visualizer design tool application 160 may be implemented by a back-end calculation engine running on the computing device. In some implementations, the visualizer design tool application 160 may be executed by way of a self-contained rich internet application (RIA) utilizing an engine such as Adobe Flash. For example, the RIA may be downloaded by a client from a server by way of a network such as the Internet or an intranet, and where most or substantially all of the calculations performed by the system 100 may be performed on the client using the RIA, without need to go back to the server again during a design session.

Further, additional elements may be included or elements shown in FIG. 1 may be omitted or modified. For example, one or more of the user device 105, data store 145, and application server 155 may be combined in certain implementations. As another example, a system may include multiple data stores 145 and/or application servers 155. In still further examples, visualizer design tool application 160 may be implemented across multiple application servers 155. While communications network 135 is shown in the illustrated embodiment, in other embodiments the communications network 135 may be omitted entirely and the user device 105 may be connected directly to the application site 140. In still other examples, the visualizer design tool application 160 may be executed in whole or in part by the user device 105.

Figure 2:
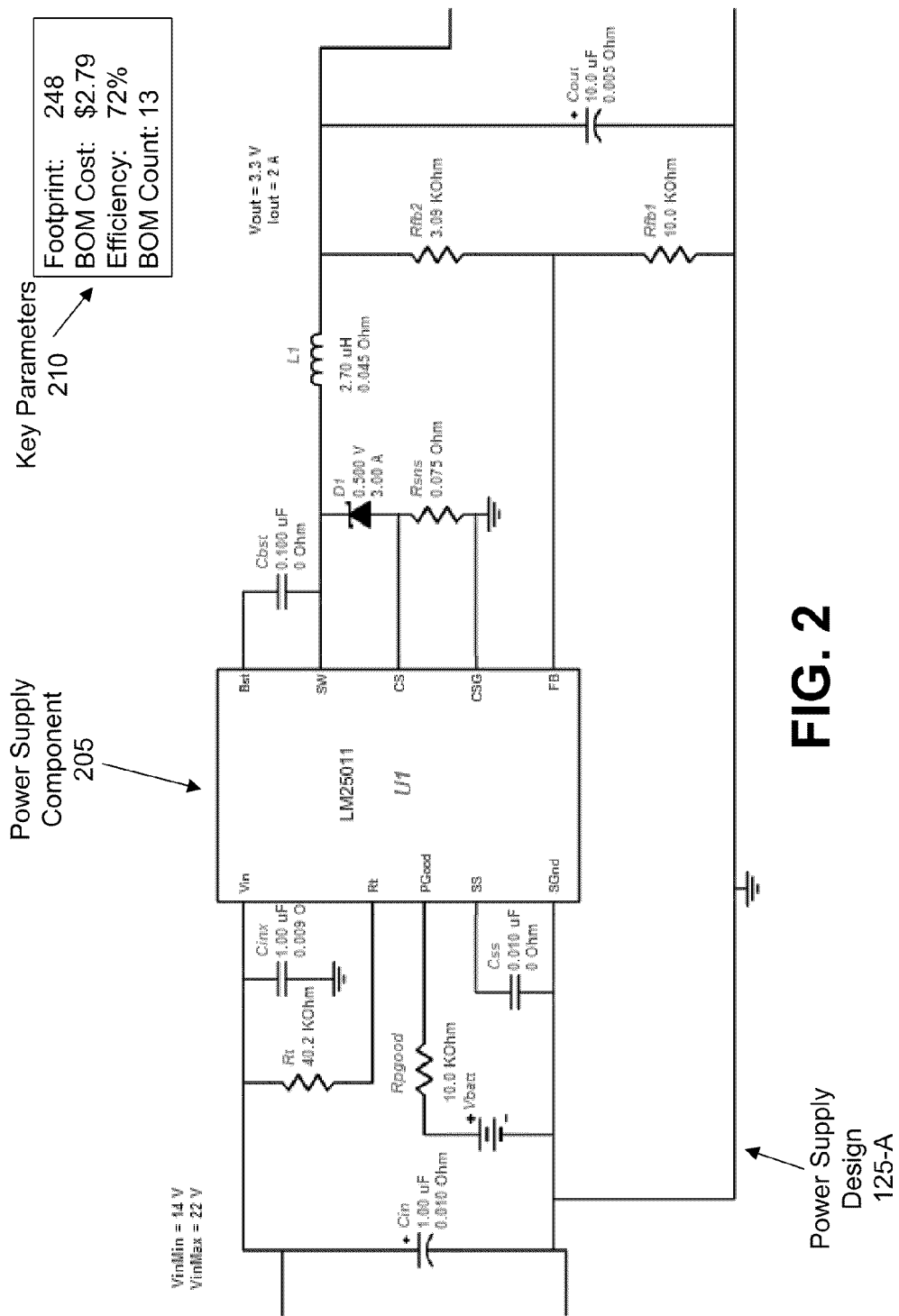
FIG. 2 illustrates an exemplary power supply design.

FIG. 2 illustrates an exemplary power supply design 125-A. The power supply design 125-A is configured to power a load 120 from an input voltage source 115 as specified by exemplary design requirements 130. In particular, the exemplary design requirements 130 specify an input voltage source 115 of 14 to 22 Volts and a load 120 of 3.3 Volts at 2 Amps. As shown in FIG. 2, the power supply design 125-A utilizes an LM25011 power supply component 205 and various supporting components to meet the design requirements 130.

In addition to meeting the design requirements 130, the power supply design 125-A embodies various additional key parameters 210. Key parameters 210 are parameters of power supply designs 125 such as electrical efficiency, footprint, bill of materials cost, bill of materials count, peak to peak voltage ripple or other parameters that may be used to aid in the visualization of tradeoffs between power supply designs 125.

The key parameters 210 may be quantified in various ways. The footprint may be represented as square millimeters of board space utilized by the power supply design 125-A. The bill of materials count may be represented by a number of total components required to build the power supply design 125-A, including a board, a power supply switching component, as well as any supporting components. The bill of materials cost may be represented by the total dollar cost of each of the items used in the construction of the power supply design 125-A. The efficiency may be represented by calculating the power dissipation of the power supply design 125-A, such as by way of the circuit calculation functionality included in the WEBENCH Power Designer provided by National Semiconductor.

As shown, the key parameters 210 of the power supply design 125-A include a footprint of 248 mm, a bill of materials (BOM) cost of $2.79, an electrical efficiency of 72%, and a BOM count of 13 parts.

Figure 3:
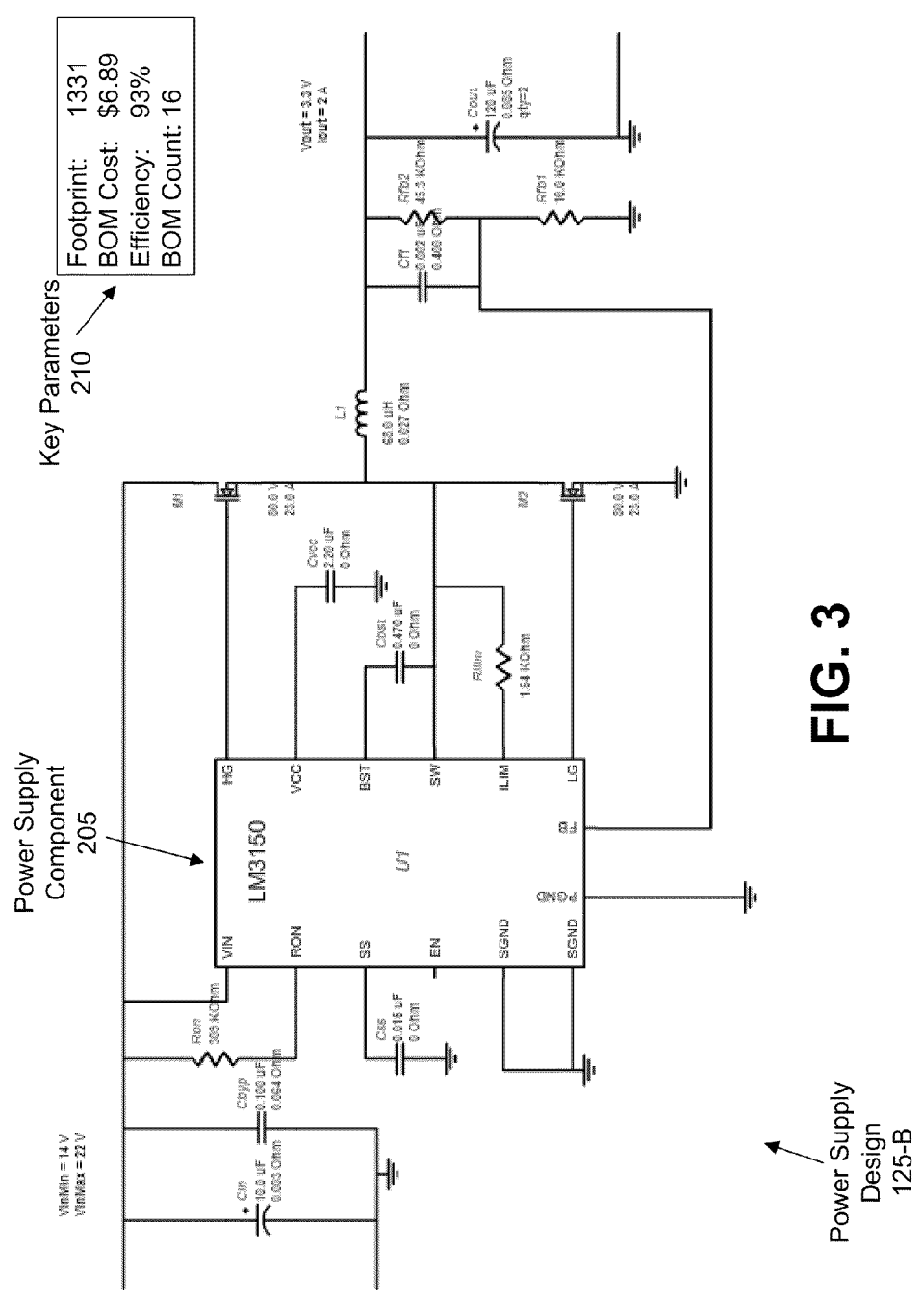

FIG. 3 illustrates an alternate exemplary power supply design 125-B. The illustrated power supply design 125-B is also configured to power the same load 120 of 3.3V at 2 Amps from the same input voltage source 115 of 14 to 22 Volts as specified by the design requirements 130. Rather than utilizing an LM25011 power supply component 205, the power supply design 125-B utilizes an LM3150 power supply component 205 and various supporting components to meet the design requirements 130.

Due to differences in the power supply design 125-B as compared with power supply design 125-A, the key parameters 210 of the power supply design 125-B differ considerably from those of power supply design 125-A. As shown, the key parameters 210 of the power supply design 125-B include a footprint of 1331 mm, a BOM cost of $6.89, an electrical efficiency of 93%, and a BOM count of 16 parts. Thus, power supply design 125-B can be seen to be far more efficient than power supply design 125-A, but at the expense of design footprint, BOM cost, and BOM count.

Figure 4:
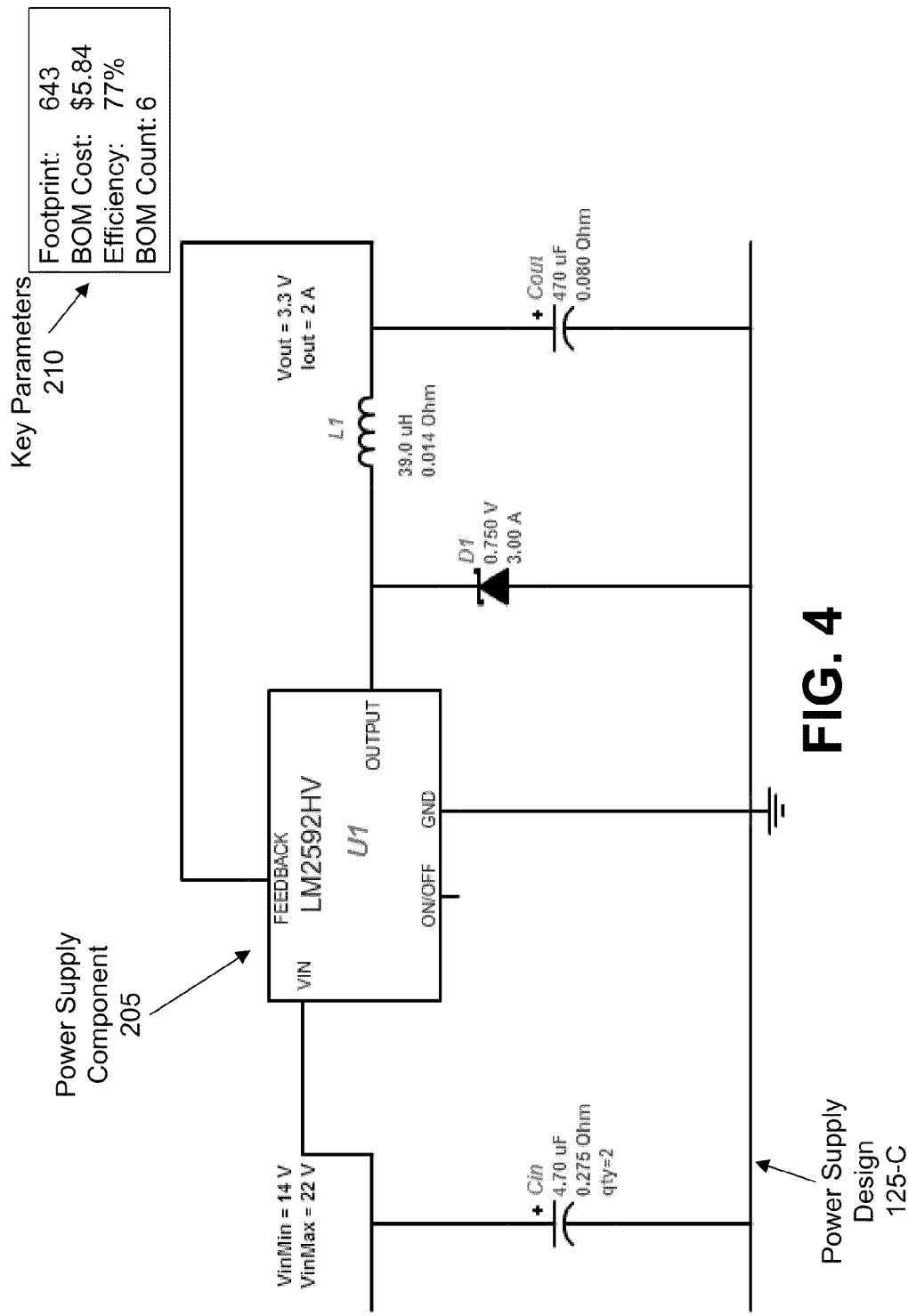
FIG. 4 illustrates another exemplary power supply design.

FIG. 4 illustrates another exemplary power supply design 125-C. The illustrated power supply design 125-C is also configured to power the same load 120 of 3.3V at 2 Amps from the same input voltage source 115 of 14 to 22 Volts as specified by the design requirements 130. Rather than utilizing an LM25011 power supply component 205 or an LM3150 power supply component 205, the power supply design 125-C utilizes an LM2592HV power supply component 205 and various supporting components to meet the design requirements 130.

Due to differences in the power supply design 125-C as compared with power supply designs 125-A and 125-B, the key parameters 210 of the power supply design 125-C differ considerably from those of power supply designs 125-A and 125-B. As shown, the key parameters 210 of the power supply design 125-B include a footprint of 643 mm, a BOM cost of $5.84, an electrical efficiency of 77%, and a BOM count of 6 parts. Thus, power supply design 125-C can be seen to include far fewer parts than power supply designs 125-A and 125-B. However, power supply design 125-C is more expensive and larger than power supply design 125-A. Power supply design 125-C is also less efficient and smaller than power supply design 125-B, while costing almost as much.

While three different power supply designs 125 are shown in FIGS. 2-4, many more power supply designs 125 satisfying the indicted design requirements 130 may be possible, each with its own various key parameters 210. Sorting these power supply designs 125 by one or more key parameters 210 may allow a user to determine which design is best at only one of the key parameters 210 at a time. However, through use of the visualizer design tool application 160, a user may advantageously visualize the tradeoffs between multiple key parameters 210 at once, and between a multitude of power supply designs 125, thus allowing a user to determine the power supply design 125 that embodies tradeoffs best suited to the situation.

Figure 5:
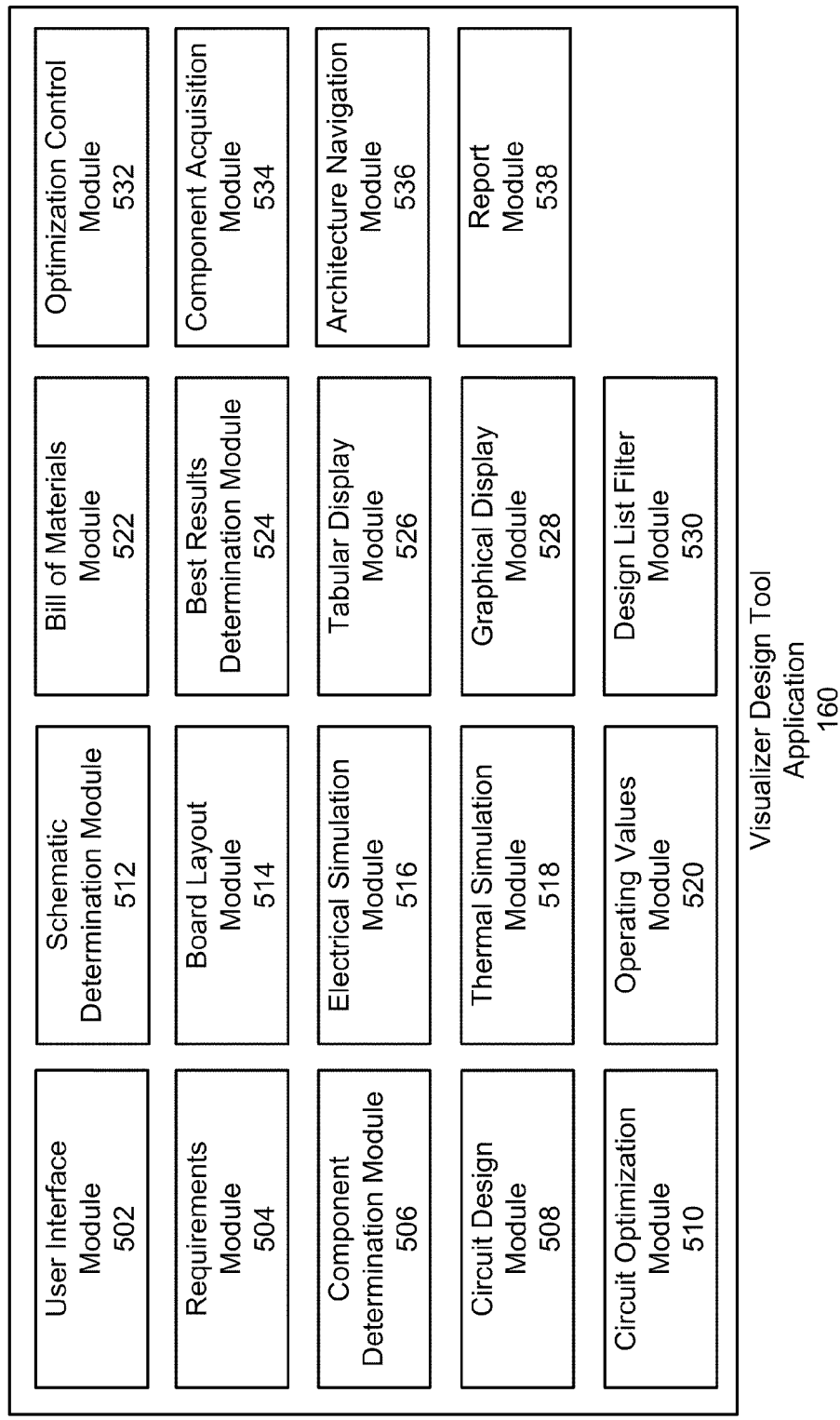
FIG. 5 illustrates an exemplary modularization of a visualizer design tool application.

FIG. 5 illustrates an exemplary modularization of the visualizer design tool application 160. As shown in the Figure, the visualizer design tool application 160 may include a user interface module 502, requirements module 504, a component determination module 506, a circuit design module 508, a circuit optimization module 510, a schematic determination module 512, a board layout module 514, an electrical simulation module 516, a thermal simulation module 518, an operating values module 520, a bill of materials module 522, a best results determination module 524, a tabular display module 526, a graphical display module 528, a design list filter module 530, an optimization control module 532, a component acquisition module 534, an architecture navigation module 536, and a report module 538. Although only one example of the modularization of the visualizer design tool application 160 is illustrated and described, it should be understood that the operations thereof may be provided by fewer, greater, or differently named modules.

The user interface module 502 may be configured to provide the user interface 110 to be displayed by way of the user device 105. For example, the user interface module 502 may be implemented by way of one or more web pages configured to accept the design requirements 130 from a user and provide output to the user including power supply designs 125. The user interface module 502 may be implemented using technologies such as Java, AJAX, Adobe Flex, Adobe Flash, Microsoft .NET, among others. The user interface module 502 may be configured to generate web pages via the application server 155 to be transmitted to the user device 105 via the communications network 135. These web pages may then be viewed by the user on the user device 105 using a web browser program.

Exemplary user interfaces 110 allowing for the specification of design requirements 130 and the viewing of power supply designs 125 are illustrated with respect to FIGS. 7-13 described below. It should be noted that the while specific user interfaces 110 are illustrated in the exemplary Figures, the particular user interfaces 110 presented by the visualizer design tool application 160 and the user interface module 502 may vary from implementation to implementation.

The requirements module 504 may be configured to utilize the user interface module 502 to allow the user of the user device 105 to specify design requirements 130 for the power supply designs 125. For example, the requirements module 504 may cause the user interface module 502 to generate web pages configured for receiving the design requirements 130.

The requirements module 504 may be configured to allow a user to specify design requirements 130 including an input voltage source 115. For example, a user may provide minimum, maximum, and nominal input voltage, ambient temperature, maximum input current and/or other critical design inputs about the input voltage source 115 and power supply 125.

The requirements module 504 may further be configured to allow a user to specify design requirements 130 including a load 120 to be provided power by the power supply design 125. For example, the user may provide voltage, current, name and other power supply attributes for a power supply load 120. In some examples, the requirements module 504 may allow for the import or upload of data regarding the design requirements 130.

The requirements module 504 may also be configured to allow a user to specify design requirements 130 including a preferred channel supplier and/or a preferred manufacturer. For example, the user may select a manufacturer of power supply components 205 to inform the visualizer design tool application 160 to choose power supply components 205 only from that manufacturer. As another example, the user may select a preferred channel supplier to inform the visualizer design tool application 160 to choose only from parts available for purchase from the indicated supplier. As yet another example, a preferred channel supplier or manufacturer may be automatically be selected based on uniform resource locator (URL) navigation. Selection of a manufacturer or a channel supplier may indicate a preference for parts from the selection manufacturer or supplier. Information regarding what parts and manufacturers are available from a supplier may be received from the suppliers, such as from supplier line cards, and may be stored in the data store 145.

In other examples, the requirements module 504 may be configured to allow a user to specify design requirements 130 for different types of designs. As some examples, the requirements module 504 may be configured to receive design requirements for LED arrays, operational amplifiers, audio amplifiers, filters, low-voltage differential signaling systems, analog-to-digital converters, sensor circuits, and phase-locked loops, among other types of circuit designs.

The component determination module 506 may be configured to determine one or more components that could be used to build circuits configured to meet the design requirements 130. For example, the component determination module 506 may be configured to determine one or more power supply components 205 that could be used to build circuits configured to power a power supply load 120 from an input voltage source 115. The component determination module 506 may determine a power supply component 205 that could satisfy the design requirements 130 by applying filters to component information 150 stored in data store 145. The filters may compare values specified in the design requirements 130 for the load 120, such as output voltage and output current, against values in corresponding information in the component information 150. In instances where a manufacturer or channel suppler is selected, the filters may further filter the component information 150 to include only parts made by the selected manufacturer or only parts or manufacturers available for purchase from the selected channel supplier.

As another example, the component determination module 506 may utilize values from the design requirements 130 relating to the input voltage source 115 as inputs to one or more design heuristics 165, where the outputs of the one or more design heuristics 165 may be used to determine which power supply components 205 could potentially satisfy power supply load 120 from the input voltage source 115. For instance, when designing a boost regulator circuit, a design heuristic 165 may be used to determine which power supply components 205 used in boost regulators may meet the switch current requirements implicit in the load 120 requirements for a particular power supply design 125. Accordingly, to determine which power supply components 205 may be used in that power supply architecture, the input voltage of the input voltage source 115 as well as the output voltage and output current of the load 120 specified by the design requirements 130 may be used to calculate a required switch current rating, where the required switch current rating is compared against the switch current ratings in the component information 150 stored in data store 145 to select only those power supply components 205 that can satisfy the design requirements 130

Thus, the component determination module 506 may determine a list of possible power supply components 205 satisfying the design requirements 130 that can be used in power supply designs 125. For example, as shown in FIG. 2, an LM25011 power supply component 205 may be used to meet the design requirements 130 for the power supply design 125. As another example, as shown in FIG. 3 an LM3150 power supply component 205 may also be used to meet the design requirements 130. In some examples, the component determination module 506 may further maintain a list of reasons for the exclusion of power supply components 205 that may be unsuitable for use in power supply designs 125 having the design requirements 130, so that a user may be informed why a particular power supply component 205 is not indicated as being available for use.

A circuit may contain many more supporting components in addition to a particular power supply component 205 that may be used to satisfy the design requirements 130. Based on the determined power supply components 205, the circuit design module 508 may be utilized to determine the supporting components, or parameters and bounds for the supporting components. The circuit design module 508 may further be configured to determine a circuit topology indicating how those additional supporting components may be arranged to create the circuit with the power supply components 205.

The circuit design module 508 may utilize design heuristics 165 and including various rules and mathematical formulas to select adequate values for the additional components. For example, if the design requirements 130 indicate that a load 120 is to be provided a minimal output voltage ripple, a design heuristic 165 may indicate that an output capacitor with a low equivalent series resistance (ESR) value may be chosen as a supporting component. As another example, if the design requirements 130 indicate that a power supply may be required to withstand sudden change in load current (i.e., transient response) then a design heuristic 165 may indicate that a larger output capacitor value may be chosen as a supporting component.

In some instances, rather than determine a particular value for a supporting component, the circuit design module 508 may instead utilize design heuristics 165 determine a range of potential values for an additional component of the circuit. For example, for a certain design, an output capacitor must have a capacitance greater than or equal to 100 µF and an equivalent series resistance of less than or equal to 100 mΩ. These rules may then be used by the circuit design module 508 to select supporting components from the parts described in the component information 150 of the data store 145.

The circuit optimization module 510 may be configured to aid in the determination of power supply components 205 and supporting components. For example, the circuit optimization module 510 may determine supporting components that satisfy the range of potential values determined by the circuit design module 508, while also accounting for design preferences indicated in the design requirements 130 through use of optimization heuristics 170. These optimizations and design preferences may accordingly guide the determination of some or even all of the components 205 and supporting components of the power supply designs 125.

Parameters of a component part may be determined based on the component information 150 stored in the data store 145. Accordingly, selection of component parts for a design may be based on an algorithm in which a target value is set for the parameters of the component part. The closer a component parameter is to a target value, the higher the score for that parameter. A weight may also be assigned to each parameter of a component. Thus, a final score for each component may be determined based on the initial score and the weight (e.g., determined as a product of the initial score and the weight). If two parameters with a same deviation from a target value have different weights, the one with a higher weight would receive a higher overall score. This weighted scoring algorithm allows selection of components taking into account multiple parameters at once, keeping a balance between important characteristic factors of the component part such as footprint, parasitic resistance, capacitance, and inductance.

As an example, a design requirement 130 may indicate a preference for power supply designs 125 having high efficiency or low voltage ripple. Accordingly, an optimization heuristic 170 may set a low target for an equivalent series resistance (ESR) parameter of an output capacitor to reduce power dissipation and/or ripple. An optimization heuristic 170 may further set a high weighting for the ESR parameter in relation to other parameters. Using these optimization heuristics 170, capacitors with low ESR would typically achieve higher scores than capacitors with higher ESR, giving the resultant designs improved efficiency.

The optimization heuristics 170 may further allow consideration of other parameters, such as size, capacitance, price and part availability in order to determine an overall score for a component. As an example, design requirements 130 may indicate a preference for designs having high efficiency, low cost, and parts that are in stock. Accordingly, one or more optimization heuristics 170 may place a relatively higher weight on a part being in stock at a fulfillment warehouse, a relatively higher weight on a part having a low price, and a relatively higher weight on a part having a low ESR. In such an example, a capacitor having a low ESR, but being out of stock at the fulfillment warehouse and having a high price may receive a lower overall score than a part one that is in stock, less expensive, but with a higher ESR.

In some instances, one or more of the component determination module 506, the circuit design module 508, and the circuit optimization module 510 may utilize a cutoff to generate up to a maximum number of power supply designs 125. This cutoff may indicate a maximum total number of power supply designs 125 to include in the universe of possible designs. In other instances, a cutoff may indicate a maximum number of components to select for the creation of power supply designs 125. For example, a cutoff may be implemented as a maximum number of power supply components 205 to select from the component information 150 stored in the data store 145 to use in the creation of power supply designs 125.

The schematic determination module 512 may be configured to produce a schematic diagram including the particular power supply component 205 and supporting components determined by the component determination module 506, circuit design module 508, and circuit optimization module 510. An exemplary schematic determination module 512 may be the schematic generator included in the WEBENCH Power Designer provided by National Semiconductor. In some examples, the schematic determination module 512 may be configured to generate a schematic that may be displayed to a user in a user interface 110 on a web page, by way of the user interface module 502.

For example, the schematic determination module 512 may be configured to draw an electrical schematic by way of the user interface module 502, using vector-based drawing techniques within a web browser application executed by a user device 105. The electrical schematic may show wires and components such as voltage regulator devices and capacitors. In some examples, the schematic determination module 512 may be configured to provide a scale adjustment to allow for a user to adjust the scale at while a schematic is drawn, and zoom in and out of the schematic.

The schematic determination module 512 may further be configured to allow for the selective editing of various components or wires of a schematic diagram, and the schematic determination module 512 may visually indicate which components and/or wires in the schematics may be modifiable. For example, components that are modifiable may be illustrated in color, while components that are non-modifiable may be presented in a black-and-white format. As another example, components that are modifiable may be presented accompanied by a particular graphic.

For components that are indicated as being editable, the schematic determination module 512 may allow for the user to substitute another component for the indicated component. For example, the schematic determination module 512 may allow for the substitution of a resistor or capacitor in the schematic with a part of another value, tolerance, manufacturer, or rating. Additionally, one or more ends of a wire included in the schematic may be capable of being moved by a user to allow for additional customization of the schematic.

The board layout module 514 may be configured to create a printed circuit board (PCB) layout according to a determined schematic, such as an electrical schematic determined by the schematic determination module 512. The board layout module 514 may determine an appropriate PCB layout according to various parameters, including the topology the circuit, the IC selected, the size of the selected components, whether the design requires a large amount of copper to dissipate heat or a heat sink to dissipate heat, and the like.

In some examples, the board layout module 514 may be configured to receive an indication of a size of a board on which to layout the components. For instance, the board layout module 514 may provide controls, by way of user interface module 502, to allow for user specification of one or more of PCB width, PCB height, and PCB mounting depth. In other examples, the board layout module 514 may automatically determine where the components are placed on a printed circuit board and delete the portions of the board not used by the components. Thus, the board layout module 514 may be configured to automatically crop the PCB layout based on the components used in the circuit.

In some examples, the board layout module 514 may be configured to determine a PCB layout according to a predetermined landing area approach. In such an approach, a PCB layout of the design is created with a mount for a particular integrated circuit (such as an LM2678 semiconductor) and also with landing pads for various supporting components to be used with the particular IC. The landing pads may be designed to accommodate a variety of combinations of supporting components, which vary in size and shape, by creating the landing pads for the supporting components large enough and spaced closely enough to accommodate different sizes of components that may potentially be used with the IC. Thus, a single PCB board may be used to accommodate many different schematics, having various sizes and varieties of surface mount components.

The electrical simulation module 516 may be configured to allow for an electrical simulation of an electrical schematic, allowing for a user to observe the performance of the circuit under simulated operating conditions. An exemplary electrical simulation module 516 may be the circuit simulation functionality included in the WEBENCH Power Designer provided by National Semiconductor. For example, the electrical simulation module 516 may be utilized to determine the behavior of the output voltage of a power supply design 125 over time as the load current is raised and lowered in a short amount of time to simulate a load transient.

The thermal simulation module 518 may be configured to identify heat problems on a PCB early on in the design process and correct the issues before a PCB goes into production. Early diagnosis of a thermal issue may save a time and avoid costly quality issues. The thermal simulation module 518 may be configured to simulate the thermal behavior of an electronic PCB having various components. The thermal simulation module 518 may use thermal models for components to aid in the analysis. For PCBs that are laid out using a standard PCB layout, the thermal simulation module 518 may further utilize a thermal model for the standard PCB layout.

The operating values module 520 may be configured to calculate key operating values for a circuit design, such as duty cycle, current through individual components, component power dissipation, efficiency, component temperatures, phase margin, crossover frequency, and other parameters important to the design. For instance, the operating values module 520 may utilize portions of the calculation modules included in the WEBENCH Power Designer provided by National Semiconductor to determine the key operating values for the circuit design.

Based on the PCB and components, the thermal simulation module 518 may utilize a conduction, radiation and/or convection solver. The thermal simulator module 518 may model the temperature of the PCB, power supply components 205 and surrounding space utilizing the power dissipation of power supply components 205, physical models of the components and PCB, and environmental conditions such as the ambient temperature, forced airflow velocity, PCB boundary conditions, PCB orientation, etc. For instance, the thermal simulation module 518 may utilize the WebTHERM module to conduct the thermal simulations. The output of the thermal simulation may be illustrated graphically by way of the user interface module 502, such as by a color contour plot of the PCB under the design's steady state electrical load 120 conditions, illustrating an estimate of the generated heat.

The bill of materials module 522 may be configured to determine a BOM including the list of parts used for each of the generated power supply designs. The bill of materials module 522 may further determine a total cost of the design and a total number of components for the power supply design. For example, the bill of materials module 522 may query the data store 145 for component information 150 related to pricing of the utilized components, and may determine an overall cost of the power supply design 125 based on a total sum of the cost of each utilized component.

The best results determination module 524 may be utilized to determine one or more best results from a set of power supply designs 125. For instance, the best results determination module 524 may determine a ranking of the individual designs in the set of power supply designs 125. The best results determination module 524 may determine the ordering and recommended designs by using a weighted scoring system. As an example, a design requirement 130 may indicate a preference for power supply designs 125 having high efficiency. Accordingly, based on the design requirement 130, the best results determination module 524 may rank the power supply designs 125 according to electrical efficiency for the overall power supply designs 125, where the overall efficiencies may be determined by the electrical simulation module 516.

The best results determination module 524 may determine the ordering while accounting for multiple variables simultaneously. Similar to as discussed above with regard to component selection, the best results ordering may use an algorithm in which a target value is set for one or more parameters of a power supply design 125. The closer a parameter of the power supply design 125 is to the corresponding target, the higher the score for that parameter. A weight may also be assigned to each parameter. Thus, a final score for each power supply design 125 may be determined based on the initial score and the weight (e.g., as a product of the score and weight values). For example, if two parameters with a same deviation from a target value have different weights, the one with the higher weight would receive a higher overall score. This weighted scoring algorithm allows ordering of power supply designs 125 taking into account multiple parameters at once, keeping a balance between important characteristic factors such as efficiency, footprint, BOM cost, BOM component count, and $V_{out}$ peak to peak ripple.

In some instances, the best results determination module 524 may utilize a cutoff to provide up to a maximum number of power supply designs 125. As an example, a cutoff may indicate a maximum total number of power supply designs 125 to include in the universe of possible designs.

The best results determination module 524 may further determine a recommended design determined to have a good balance between design tradeoffs. For example, the best results determination module 524 may determine the one of the power supply designs 125 having the best ranking as being the overall recommended design.

The tabular display module 526 may be configured to display a list of the determined power supply designs 125 by way of the user interface module 502. For example, the tabular display module 526 may present a user interface 110 including a table of power supply designs 125 with key parameters 210 displayed, with each row in the table indicating a particular power supply design 125 and associated values and key parameters 210. Key parameters 210 may include system footprint determined by the board layout module 514, system BOM cost and system component count determined by the bill of materials module 522, system efficiency determined by the operating values module 520, among others.

The values in the table may be arranged according to the ranking determined by the best results determination module 524. For instance, values in the table may be arranged with the best recommendation or recommendations at the top of a sortable list. As an example, a design requirement 130 may indicate a preference for designs having high efficiency. Accordingly, based on ranking determined by the best results determination module 524, the power supply designs 125 may be displayed in order according to electrical efficiency.

The graphical display module 528 may be configured to provide a graph of the determined power supply designs 125 by way of the user interface module 502. The graphical display module 528 may represent the tradeoffs between the various power supply designs 125 by representing various key parameters 210 as the X and Y axes of the graph. The graphical display module 528 may further represent the points within the graph as items of varying attributes, such as of varying size and/or color. For example, circles of different diameters may be used to signify correspondingly larger or smaller values. As another example, different colors may be used to represent differences in the values being plotted. This may allow the graphical display module 528 to indicate a third key parameter 210 as a third dimension of the graph and a fourth key parameter 210 as a fourth dimension of the graph.

As an example, the axes may default to key parameters 210 of system footprint and system efficiency, with a circle around each data point of variable size to represent the BOM cost. The size of the circle may accordingly vary in size to become larger for a higher BOM cost and smaller for a lower BOM cost. The graphical display module 528 may be configured to allow a user to configure the axes of the graph, allowing the user to visualize other key parameters 210 of the design, such as the $V_{out}$ peak to peak ripple, frequency, BOM count, among others.

The design list filter module 530 may be configured to allow for the filtering of the determined power supply designs 125 displayed by the tabular display module 526 and graphical display module 528. For example, the design list filter module 530 may provide slider controls, check boxes and other controls by way of the user interface module 502 that may be used to specify filter criteria for the displayed power supply designs 125. These controls may allow a user of the user device 105 to narrow down the list of power supply designs 125 according to the specified filter criteria. Because the filtering is performed based on the determined set of power supply designs 125 that form the universe of possible designs, filtering of the power supply designs 125 may be performed by the user device 105 without requiring any additional database access or interaction with the data store 145.

Exemplary filter criteria may include minimum and maximum efficiency, minimum and maximum footprint, minimum and maximum BOM cost, minimum and maximum BOM count, minimum and maximum ripple, minimum and maximum switching frequency, minimum and maximum crossover frequency, and minimum and maximum phase angle. Further exemplary filter criteria may include additional power supply component 205 features, such as: on/off pin, error pin, soft start, external synchronization, module, adjustable primary leakage inductance limit, adjustable frequency, synchronized switching, controller, and integrated switch. Still further exemplary filter criteria may include manufacturer and channel supplier.

The optimization control module 532 may be configured to allow a user to specify system level goals such as small footprint, low cost, or high efficiency. The optimization control module 532 may utilize the user interface module 502 to present one or more controls to a user device 105 in a user interface 110, and may receive input from the user from the one or more controls. The control or controls may allow the user to select a tradeoff indicating a preference for at least one key parameter 210 over a preference for at least one other key parameter 210. For example, a control may allow the user to prefer designs with small footprint over designs with high efficiency. The design tradeoff selected by way of the optimization control module 532 may provide the visualizer design tool application 160 with input regarding user preferences for key parameters 120 over other key parameters 120. This tradeoff information may then be used by the visualizer design tool application 160 for various purposes.

In some implementations, the design tradeoff may be used to control the generation of power supply designs 125. For example, based on the input from the control, the optimization control module 532 may be configured to cause the visualizer design tool application 160 to calculate power supply designs 125 containing power supplies optimized according to the system level goals indicated by the user. These power supply designs 125 may then be displayed to the user.

In other implementations, the design tradeoff may be used to filter a set of determined power supply designs 125. For example, the visualizer design tool application 160 may be configured to pre-calculate power supply designs 125 optimized according to each of the potential system level goals or sets of optimizations settings that may be indicated by the optimization control module 532. Then, based on input received from one or more optimization controls, the optimization control module 532 may be configured to cause the visualizer design tool application 160 to filter the displayed power supply designs 125 according to the particular optimization settings chosen by the user. By performing the filtering based on the pre-calculated power supply designs 125, optimized according to each of the optimizations settings available from the optimization controls, the filtering may be performed by the user device 105 without requiring any additional database access or interaction with the data store 145.

An exemplary optimization control module 532 may present a knob providing for selection of one of the following five sets of optimizations to use as the system design goals: a first optimization with the goals of smallest possible footprint accomplished through use of the highest possible switching frequencies; a second optimization with the goals of lowest cost with frequency pushed high to get smaller components; a third optimization with the goals of a balance of efficiency, footprint, low complexity, and cost; a fourth optimization with the goals of low cost with frequency pushed lower for increased efficiency; and a fifth optimization with the goal of highest possible efficiency.

The component acquisition module 534 may be configured to allow a user to purchase the list of parts used in a selected power supply design 125. Using the BOM for a power supply design 125, the component acquisition module 534 may be configured to confirm whether the parts are in stock by querying the component information 150 stored in data store 145. If the parts are determined to be in stock, the component acquisition module 534 may allow the user to purchase a set of parts for building all or a portion of the power supply design 125. The component acquisition module 534 may further be configured to provide assembly instructions for the board that shows the locations of all the components, soldering instructions, an electrical schematic, top-side and bottom-side copper layout diagrams, instructions for building and testing the circuit. In some examples, the component acquisition module 534 may provide an option for the user to receive an assembled version of the power supply design 125.

The architecture navigation module 536 may be configured to allow for navigation of the electrical schematic, such as the schematic determined by the schematic determination module 512. Upon selection of one of the power supply designs 125, such as through use of the tabular display module 526 and the graphical display module 528, the architecture navigation module 536 may be configured to display, by way of the user interface module 502, a user interface 110 including a schematic of the selected design. The architecture navigation module 536 may also be configured to allow the user to navigate to other modules such as a table of key operating values, charts of key operating values, electrical simulation, thermal simulation, optimization of the design for key goals and the ability to get a prototype kit of the design.

The report module 538 may be configured to create a report summarizing the attributes of one or more designs. For example, the report module 538 may be utilized by a user to view a report summarizing the attributes of a selected design from the set of power supply designs 125. The report may include system level key attributes 210 such as system efficiency, system BOM cost, footprint area, and BOM count. The report may further include specific information about the required input voltage source 115. In addition, the report may include information about the power supply design 125, including the corresponding schematic, BOM, and associated component information including electrical characteristics such as inductance, DC resistance, current rating, voltage rating, etc. Other information about the power supply design 125 may be included as well, such as operating values including duty cycle, efficiency, BOM cost, BOM footprint, currents through components, and power dissipation for components. The operating values may be included in a table or as plots of the operating value vs. other facts such as load 120 current for different voltages. The report may also contain simulation results, such as from the electrical simulation module 516 and/or thermal simulation module 518, which may be represented in numeric form, tabular form such as via tabular display module 526, and/or graphical form such as via graphical display module 528. Reports generated by the report module 538 may be provided in various formats, such as the portable document format (PDF).

Figure 6:
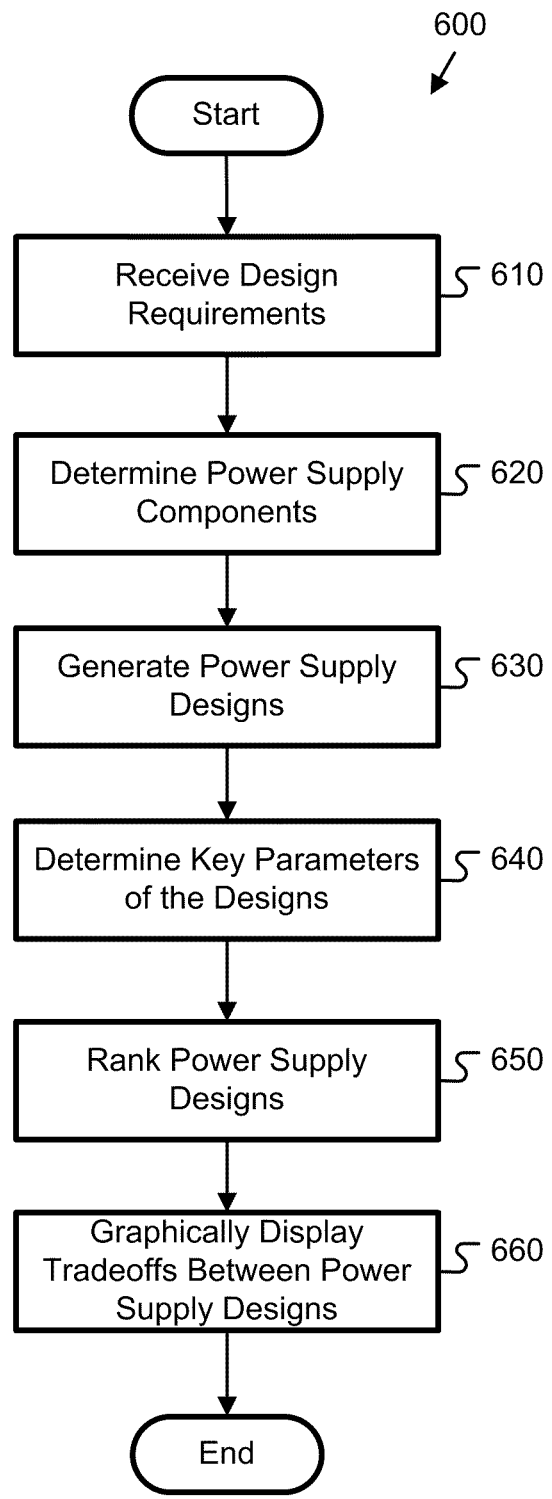
FIG. 6 illustrates an exemplary process flow for determining and visualizing power supply designs.

FIG. 6 illustrates an exemplary process flow 600 for the visualization of power supply designs 125 according to designs requirements 130. The process 600 may be performed by various systems, such as by the system 100 described above with respect to FIG. 1.

In block 610, a visualizer design tool application 160 receives design requirements 130 from a user device 105. For example, a communications network 135 may be in selective communication with a user device 105 and an application site 140. The application site 140 may serve as a hosting platform for an application server 155 running the visualizer design tool application 160. A user interface module 502 and a requirements module 504 of the visualizer design tool application 160 may be configured to provide a user interface 110 to a user device 105, such as a web page, where the user interface 110 may allow the user of the user device 105 to specify the design requirements 130 for a power supply design 125. The design requirements 130 may include information regarding a load 120 to be powered by an input voltage source 115. The design requirement 130 may further include specification of a set of design goals and tradeoffs that may be used to optimize the power supply designs 125.

In block 620, the visualizer design tool application 160 determines a set of power supply components 205. For example, a component determination module 506 of the visualizer design tool application 160 may be configured to determine a set of power supply components 205 that each could satisfy the design requirements 130 by applying filters to component information 150 stored in data store 145. The filters may compare values specified in the design requirements 130 for the load 120, such as output voltage and output current, against values in corresponding information in the component information 150. The component determination module 506 may further utilize values from the design requirements 130 relating to the input voltage source 115 as inputs to one or more design heuristics 165, where the outputs of the one or more design heuristics 165 may be used to determine which power supply components 205 could potentially satisfy the load 120 from the input voltage source 115.

In block 630, the visualizer design tool application 160 generates power supply designs 125 for the determined power supply components 205. For example, the visualizer design tool application 160 may utilize a component determination module 506, a circuit design module 508, and a circuit optimization module 510 to determine, for each power supply component 205, supporting components that could be used to build circuits for the power supply components 205, optimized according to the design goals and tradeoffs indicated in the design requirements 130.

For example, the circuit design module 508 may utilize design heuristics 165 incorporating rules and mathematical formulas to select ranges of values for supporting components to be used with the power supply components 205. The circuit optimization module 510 may determine supporting components that satisfy the range of potential values determined by the circuit design module 508, while also accounting for design goals and tradeoffs indicated in the design requirements 130 through use of optimization heuristics 170. These optimizations and design goals and tradeoffs may accordingly guide the determination of some or even all of the power supply components 205 and supporting components of the power supply designs 125.

In block 640, the visualizer design tool application 160 determines key parameters 210 of the determined power supply designs 125. For example, the visualizer design tool application 160 may utilize a schematic determination module 516 to produce an electrical schematic diagram, and a board layout module 514 to create a PCB layout according to the determined schematic. Then the visualizer design tool application 160 may utilize an electrical simulation module 516 to simulate the load transient behavior of the determined electrical schematic, and a thermal simulation module 518 to simulate the thermal behavior of the PCB layout. The power supply design tool application 160 may also utilize a bill of materials module 522 to determine a BOM including the list of parts used and the total part count for each of the power supply designs 125. The power supply design tool application 160 may also use an operating values module 520 to calculate the electrical efficiency of the circuit.

In block 650, the visualizer design tool application 160 ranks the determined power supply designs 125. This ranking may be determined based on the design goals and tradeoffs indicated in the design requirements 130. For example, the best results determination module 524 may utilize an ordering algorithm in which a target value is set for one or more key parameters 210 of a power supply design 125. The closer a key parameter 210 of the power supply design 125 is to the corresponding target, the higher the score for that key parameter 210. A weight may also be assigned to each key parameter 210 based on the design goals and tradeoffs specified by the user in the design requirements 130. Thus, a final score for each power supply design 125 may be determined based on the initial score and the weight (e.g., as a product of the score and weight values). For example, if two parameters with a same deviation from a target value have different weights, the one with the higher weight would receive a higher overall score. This weighted scoring algorithm allows ordering of power supply designs 125 taking into account multiple key parameters 210 at once, keeping a balance between important characteristic factors specified by the design requirements 130. The visualizer design tool application 160 may utilize the best results determination module 524 to determine one or more best results from a set of power supply designs 125 as the designs having the best ranking.

In block 660, the visualizer design tool application 160 graphically displays tradeoffs between the power supply designs 125. For example, the visualizer design tool application 160 may send the power supply designs 125 to the user device 105 that form the universe of possible designs for the design requirements 130. The user device 105 may utilize a tabular display module 526 to display a table of the power supply designs 125 and key parameters 210, with each row in the table indicating a particular power supply design 125 and associated values. The visualizer design tool application 160 may also utilize a graphical display module 528 to provide a graph of the determined power supply designs 125 representing tradeoffs between the various power supply designs 125 according to key parameters 210. In some examples, the visualizer design tool application 160 presents an indication of the best one or more power supply designs 125. Because the universe of possible power supply designs 125 has already been computed by the visualizer design tool application 160, the user device 105 may perform filtering of the determined power supply designs 125 displayed by the tabular display module 526 and graphical display module 528 without additional access or interaction with the data store 145. After block 660, the process 600 ends.

Figure 7:
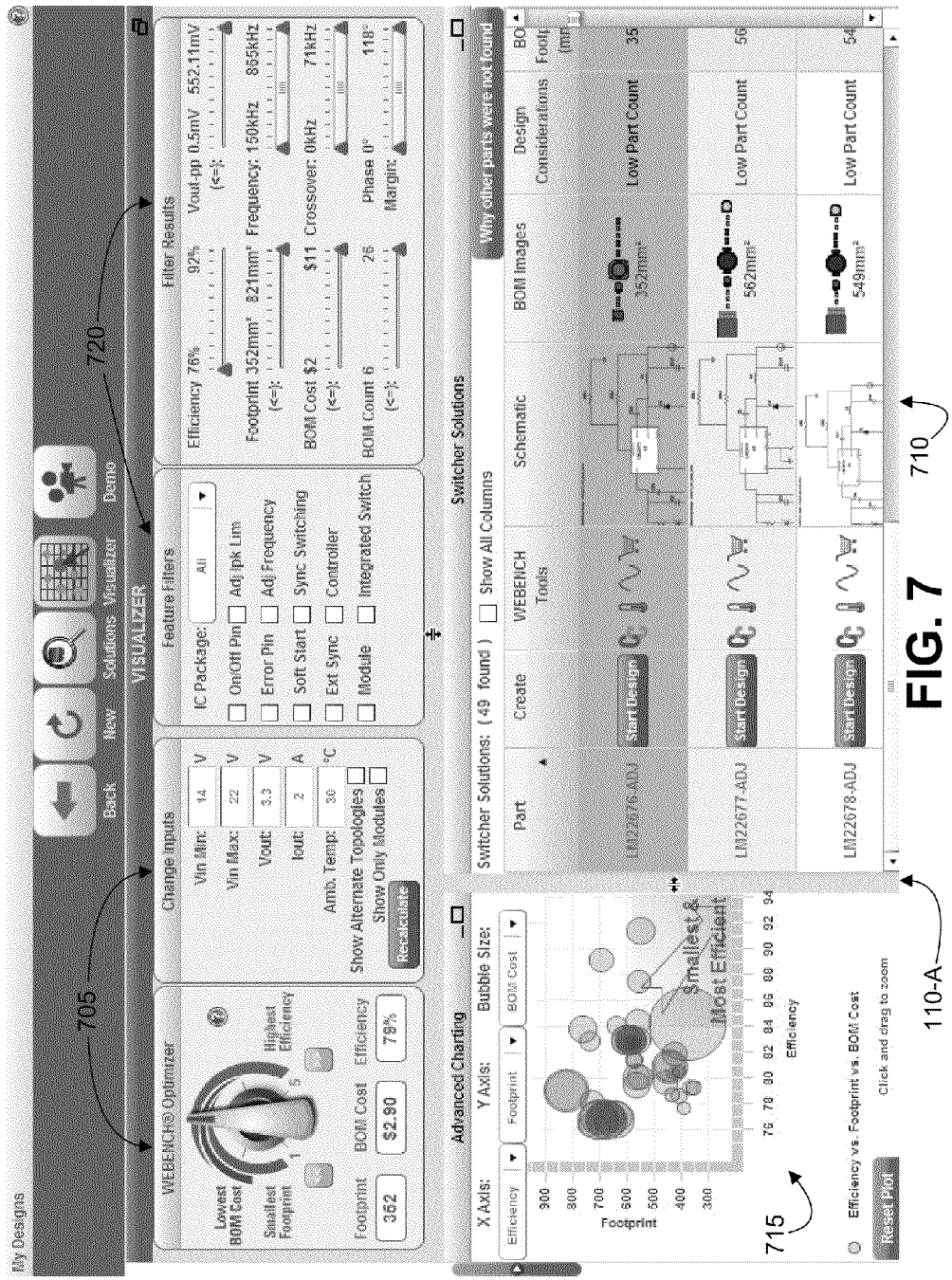
FIG. 7 illustrates an exemplary user interface for a visualizer design tool application.

FIG. 7 illustrates an exemplary user interface 110-A for a visualizer design tool application 160. The user interface 110 may include user input controls 705 for specifying design requirements 130 for requested power supply designs 125, a tabular list control 710 for the display of the power supply designs 125, a graphical display control 715 for the illustration of design tradeoffs among the power supply designs 125, and filtering controls 720 for filtering power supply designs 125. The controls 705-720 of user interface 110-A may be generated by a user interface module 502 of a visualizer design tool application 160. The user interface 110-A may be displayed by a user device 105, and allow for a user of the user device 105 to input design requirements 130 for power supply designs 125 to be generated by the visualizer design tool application 160. The user interface 110-A may also allow for the user to visualize, filter, and select power supply designs 125 generated by the visualizer design tool application 160.

The user input controls 705 may allow for a user of a user device 105 to input design requirements 130 for power supply designs 125. For example, the user input controls 705 may provide for the input of details of an input voltage source 115 to power the power supply designs 125, as well as details of a load 120 to be powered by the power supply designs 125. The user input controls 705 may further allow for the input of design requirements 130 relating to design tradeoffs or design goals relating to optimizations of the power supply designs 125. Further details regarding the user input controls 705 are discussed below with respect to FIGS. 8 and 9.

The tabular list control 710 may be created by a tabular display module 526 of the visualizer design tool application 160 and may allow for the display of a tabular representation of the generated power supply designs 125. The tabular list control 710 may display values for key parameters 210 of the power supply designs 125 such as efficiency, footprint, BOM cost, and BOM count. Further details regarding the tabular list control 710 are discussed below with respect to FIG. 10.

The graphical display control 715 may be created by a graphical display module 528 of the visualizer design tool application 160 and may allow for the graphical display of tradeoffs among the power supply designs 125. The graphical display control 715 may graph values corresponding to various key parameters 210 of the power supply designs 125. Further details regarding the graphical display control 715 are discussed below with respect to FIGS. 11 and 12.

The filtering controls 720 may allow for the filtering of power supply designs 125 according to various filter criteria. For example, the power supply designs 125 displayed in the tabular list control 710 and the graphical display control 715 may be filtered to correspond to the criteria entered into the filtering controls 720. Further details regarding the filtering controls 710 are discussed below with respect to FIG. 13.

Figures 8, 9:
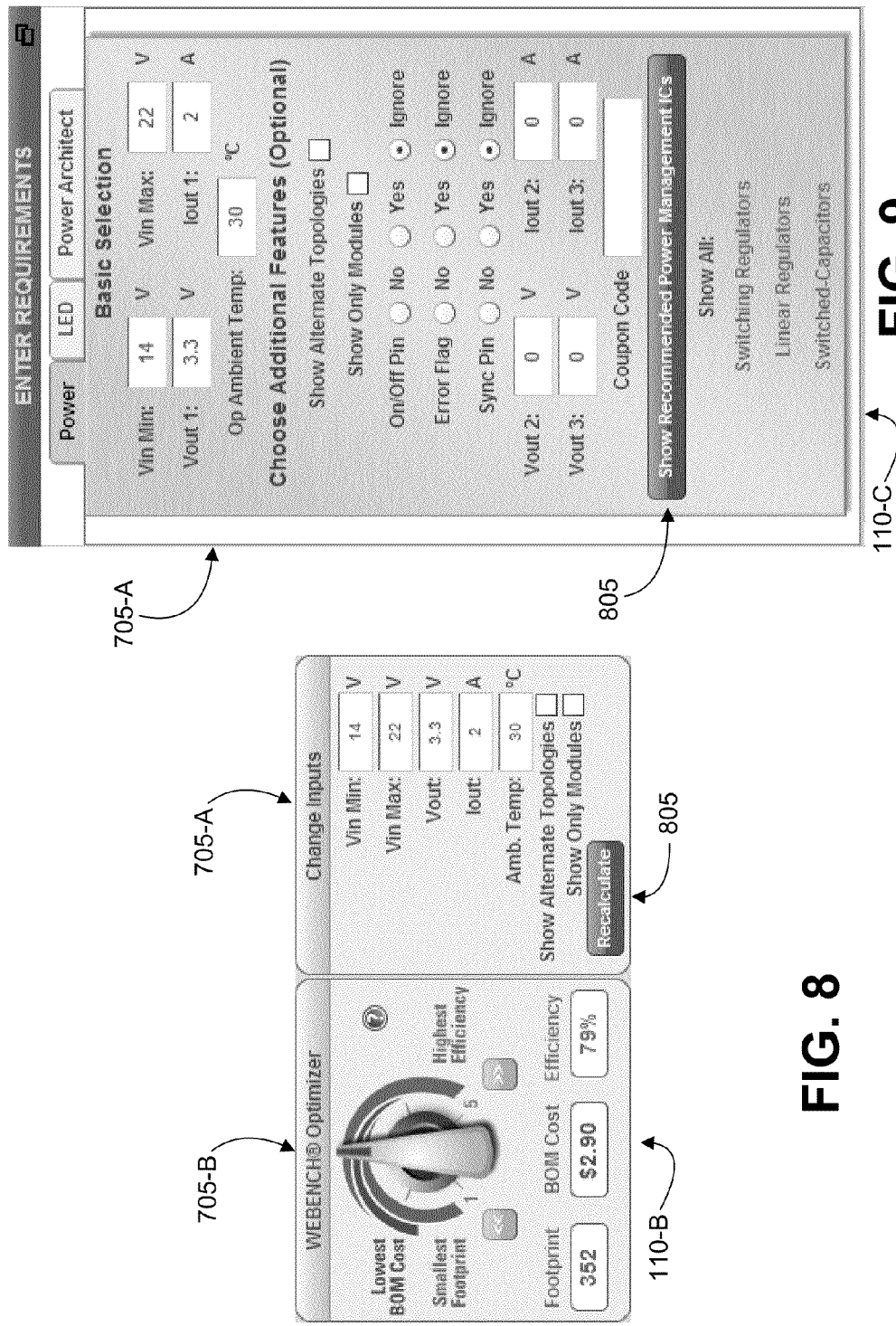
FIG. 8 illustrates an exemplary user interface for the input of design requirements for power supply designs.
FIG. 9 illustrates an alternate exemplary user interface for the input of design requirements for power supply designs.

FIG. 8 illustrates an exemplary user interface 110-B for the input of design requirements 130 for power supply designs 125. The user interface 110-B may include user input controls 705-A for specifying design requirements 130 for an input voltage source 115 and a load 120. The user interface 110-B may further include user input controls 705-B for specifying design tradeoffs. Additionally, the user interface 110-B may include a calculate control 805 configured to request the visualizer design tool application 160 to generate power supply designs 125 responsive to the design requirements 130 entered into the input controls 705-A and 705-B. While the user interface 110-B is shown by itself in FIG. 8 to facilitate explanation, in many examples the user interface 110-B may be presented as a portion of the overall user interface 110-A of the visualizer design tool application 160 such as shown in user interface 110-A of FIG. 7.

The input controls 705-A may include controls for the input of design requirements 130 related to the input voltage source 115 to power the power supply designs 125 and the load 120 to be powered by the power supply designs 125. Exemplary design requirements 130 that may be specified by the input controls 705-A include minimum and maximum input voltage of the input voltage source 115, output voltage and current for the load 120. The input controls 705-A may further allow for the specification of additional design requirements 130, such as an ambient temperature to consider for the power supply designs 125, whether to include alternate topologies in the generated power supply designs 125, and whether to only show power supply designs 125 utilizing integrated modules which contain many of the power supply components such as the voltage regulator, inductor and diode in one integrated package.

The input controls 705-B may include controls for the input of design requirements 130 related to design tradeoffs between key parameters 210 of the power supply designs 125. For example, an optimization control module 532 of the visualizer design tool application 160 may utilize the user interface module 502 to allow a user to specify system level goals such as small footprint, low cost, and/or high efficiency. The input controls 705-B may allow the user to select a tradeoff indicating a preference for at least one key parameter 210 over a preference for at least one other key parameter 210. For example, the control may allow the user to prefer designs with small footprint over designs with high efficiency.

In some instances, the optimization control module 532 may utilize the user interface module 502 to present the input control 705-B in the form of a knob, where each position of the knob represents different design tradeoffs between various design goals. As shown in FIG. 8, the input controls 705-B may present a knob providing for selection of one of the following sets of optimizations to use as the system design goals: a first optimization with the goals of smallest possible footprint accomplished through use of the highest possible switching frequencies; a second optimization with the goals of lowest cost with high frequency for smaller components; a third optimization with the goals of a balance of efficiency, footprint, low complexity, and cost; a fourth optimization with the goals of lowest cost with frequency pushed lower for increased efficiency; and a fifth optimization with the goal of highest possible efficiency, but with large components.

The input controls 705 may further include controls for the optional selection of a preferred channel supplier and/or a preferred manufacturer. For instance, the input controls 705 may provide a dropdown control including a list of manufacturers from which to select. Thus, the input controls 705 may provide for the selection of a manufacturer to use to filter the component information 150 in the data store 145, allowing the user to select the generation of power supply designs 125 preferring or only including parts from the selected manufacturer.

As another example, the input controls 705 may provide a dropdown control including a list of channel supplies from which to optionally select, allowing the user to select the generation of power supply designs 125 preferring or only including parts or manufacturers available for sale by the selected channel supplier. Selection of a channel supplier may be valuable to a user desiring to generate power supply designs 125 only using parts available from suppliers the can order from, and also may be valuable in allowing the user to get all the required parts for a design from a single source. This in turn may lower acquisition cost and makes it easier for a user to normalize or optimize the resulting bill of materials to the fewest number of suppliers, fewest number of components, at the highest volumes, and at the related lowest prices from a single source channel supplier.

The calculate control 805 may be configured to request the visualizer design tool application 160 to generate power supply designs 125 responsive to the design requirements 130 entered into the input controls 705. The user interface 110-B may further allow for the user to use the input controls 705 to update the design requirements 130. Then, the calculate control 805 may be selected by the user to generate new power supply designs 125 responsive to updated design requirements 130.

FIG. 9 illustrates an alternate exemplary user interface 110-C for the input of design requirements 130 for power supply designs 125. Similar to as discussed above with respect to user interface 110-B shown in FIG. 8, user interface 110-C may include user input controls 705-A for specifying design requirements 130 for an input voltage source 115, a load 120, as well as other design options.

In contrast to user interface 110-B, which may be included as a portion of the overall user interface 110-A of the visualizer design tool application 160, the user interface 110-C may be provided as a stand-alone user interface 110. Thus, the user interface 110-C may be configured to gather input from a user before the display of the entire visualizer design tool application 160. User interface 110-C may be useful in instances where it may be desirable to display a simplified design requirements 130 interface, without the complexity of the full visualizer design tool application 160 as shown in user interface 110-A.

Additionally, in some cases the user interface 110-C may not provide for the input of design requirements 130 related to design tradeoffs between key parameters 210 of the power supply designs 125. Accordingly, in such examples, the visualizer design tool application 160 may instead use a default setting for design tradeoffs. Providing a default for the design tradeoffs may further allow for the presentation of a more simplified user interface 110. However, to allow the user to modify the design tradeoffs, once the user has reviewed the generated power supply designs 125, the visualizer design tool application 160 may provide a user interface 110 allowing for the specification of design tradeoffs, such as by way of user interface 110-B.

As with the user interface 110-B, when the user has entered the design requirements 130 into the input controls 705-A of user interface 110-C, the user may select the calculate control 805 to cause the visualizer design tool application 160 to generate power supply designs 125 responsive to the design requirements 130.

Figure 10:
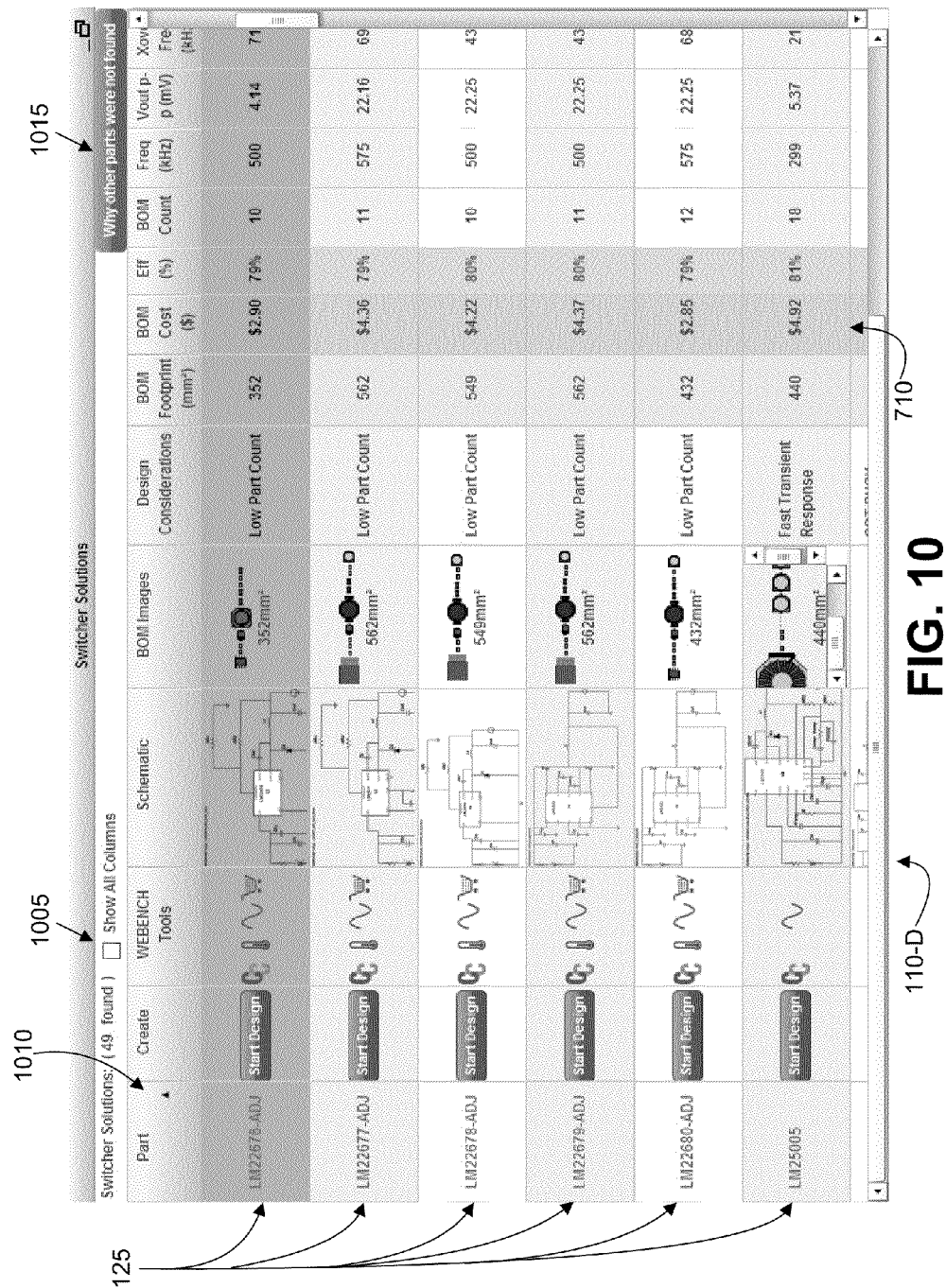
FIG. 10 illustrates an exemplary user interface for the tabular display of generated power supply designs.

FIG. 10 illustrates an exemplary user interface 110-D for the tabular display of generated power supply designs 125. As shown in the user interface 110-D, a plurality of power supply designs 125 are included in a tabular list control 710. The tabular list control 710 may be created by a tabular display module 526 of the visualizer design tool application 160. While the tabular list control 710 is shown by itself in FIG. 10 to facilitate explanation, in many examples the user interface 110-D may be presented as a portion of the visualizer design tool application 160 such as shown in user interface 110-A of FIG. 7.

The tabular list control 710 may include a plurality of rows of data, where each row of data corresponds to one of the power supply designs 125. In cases where there are more power supply designs 125 than fit in the tabular list control 710, the tabular list control 710 may provide for scrolling through the power supply designs 125, such as by way of a scroll bar control.

The tabular list control 710 may further indicate that one of the power supply designs 125 has been selected. As shown in the Figure, the first power supply design 125 in the tabular list control 710 is indicated as being selected.

The tabular list control 710 may include a plurality of columns, where each column may include a header labeling the included information as well as the information on the labeled aspect of the power supply designs 125. Exemplary columns may include a part number for a power supply component 205 included in the power supply design 125, a schematic diagram of the power supply design 125, representations of the components and their relative size as included in the power supply design 125, design considerations related to the power supply design 125, footprint for the power supply design 125, BOM cost for power supply design 125, efficiency for the power supply design 125, BOM count for the power supply design 125, frequency at which the power supply component 205 operates, voltage ripple, crossover frequency, phase margin, topology (e.g., Boost, Buck, Buck-Boost, etc.), Iout max, and IC cost.

The user interface 110-D may further provide a control 1005 that when selected provides additional columns of information into the tabular list control 710. Additional columns of information may include power supply component 205 features, such as: on/off pin, error pin, soft start, external synchronization, module, adjustable primary leakage inductance limit, adjustable frequency, synchronized switching, controller, and integrated switch.

To facilitate review of the plurality of power supply design 125, the tabular list control 710 may be configured to be sorted in ascending or descending order by column. The sort column and sort order may be indicated by a sort indication 1010 included in the header of the tabular list control 710. As shown, the tabular list control 710 includes an indication 1010 configured to inform the user that the tabular list control 710 is sorted according to the part number for a power supply component 205 included in the power supply design 125 column in ascending part order.

Figure 11:
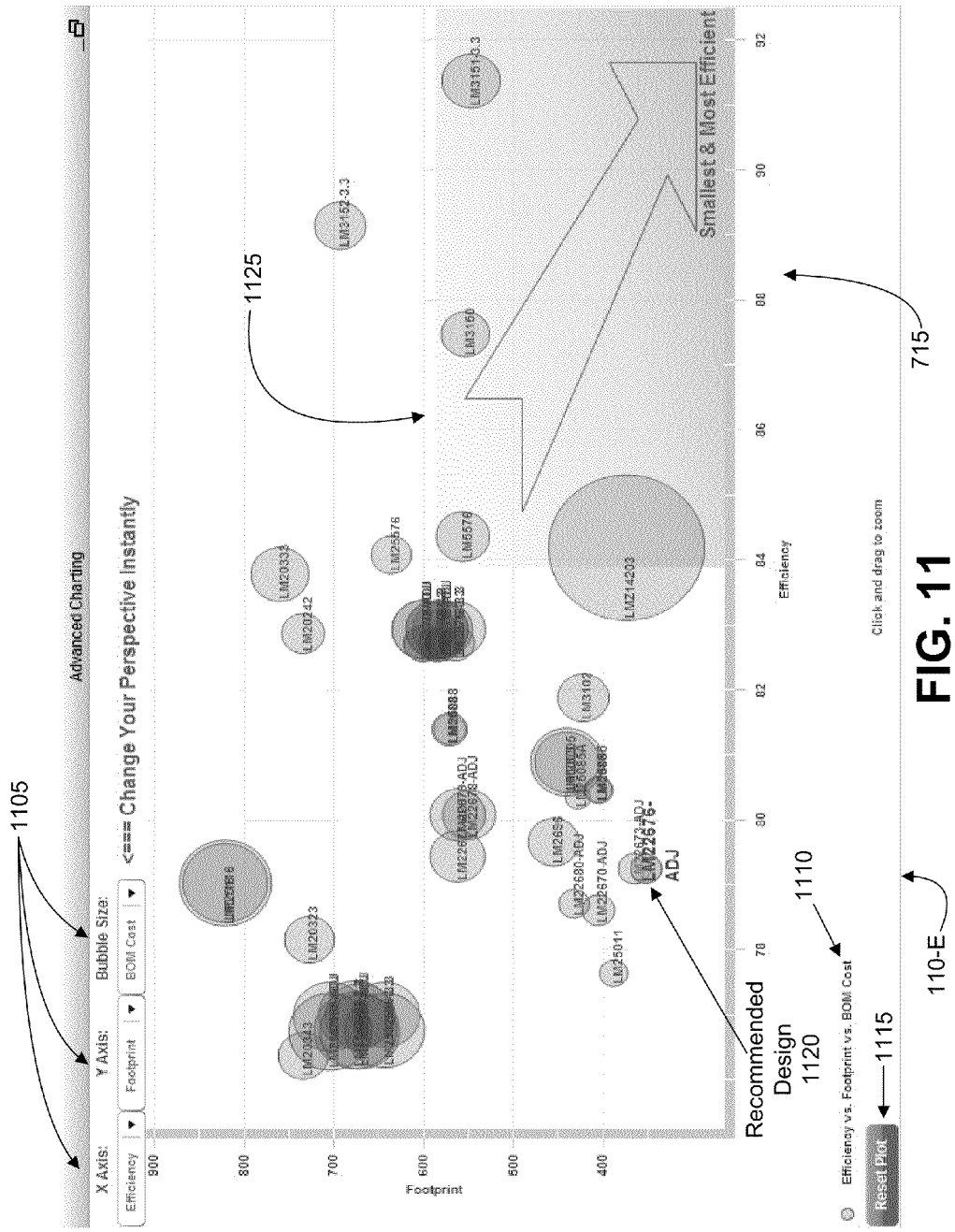
FIG. 11 illustrates an exemplary user interface for the graphical display of generated power supply designs.

FIG. 11 illustrates an exemplary user interface 110-E for the graphical display of generated power supply designs 125.

As shown in the user interface 110-E, a plurality of power supply designs 125 are graphically represented in a graphical display control 715. The graphical display control 715 may be created by a graphical display module 528 of the visualizer design tool application 160. While the graphical display control 715 is shown by itself in FIG. 11 to facilitate explanation, in many examples the user interface 110-E may be presented as a portion of the visualizer design tool application 160 such as shown in user interface 110-A of FIG. 7.

The graphical display control 715 may be configured to provide a graph of the determined power supply designs 125 representing design tradeoffs among the various power supply designs 125 according to key parameters 210. Exemplary graphical display controls 715 may allow for the visualization of the tradeoffs between two key parameters 210, or even among three or more key parameters 210.

An X-axis of a graph may represent values of a first key parameter 210, while a Y-axis of the graph may represent values of a second key parameter 210. By way of the graphical display control 715, these two key parameters 210 may be plotted against one another. Additionally, a Z-axis of the graph may be used to represent values of a third key parameter 210. To represent a third dimension on a two-dimensional display, aspects of the plot points may be used to represent the third dimension, such as varying size, color, and/or shape of the plot points.

For example, as shown in FIG. 11 the X-axis of the graph is configured to represent system efficiency, while the Y-axis is configured represent system footprint. The circle size in the graphical display 810 is configured to indicate system BOM cost, where a larger circle represents a larger cost, and a smaller circle represents a smaller cost.

The dropdown controls 1105 may indicate which axes of the graphical display control 715 are configured to represent which key parameters 210. The dropdown controls 1105 may further be used to configure which key parameters 210 are represented by which axes of the graphical display control 715. Thus, axes may be reconfigured to display tradeoffs among different key parameters 210 as well. As some examples, one or more of the X-axis, the Y-axis, and the Z-axis may be reconfigured to represent any of total efficiency, power dissipation, total footprint, total bill of materials cost, total component count, among others key parameters 210.

Figure 12:
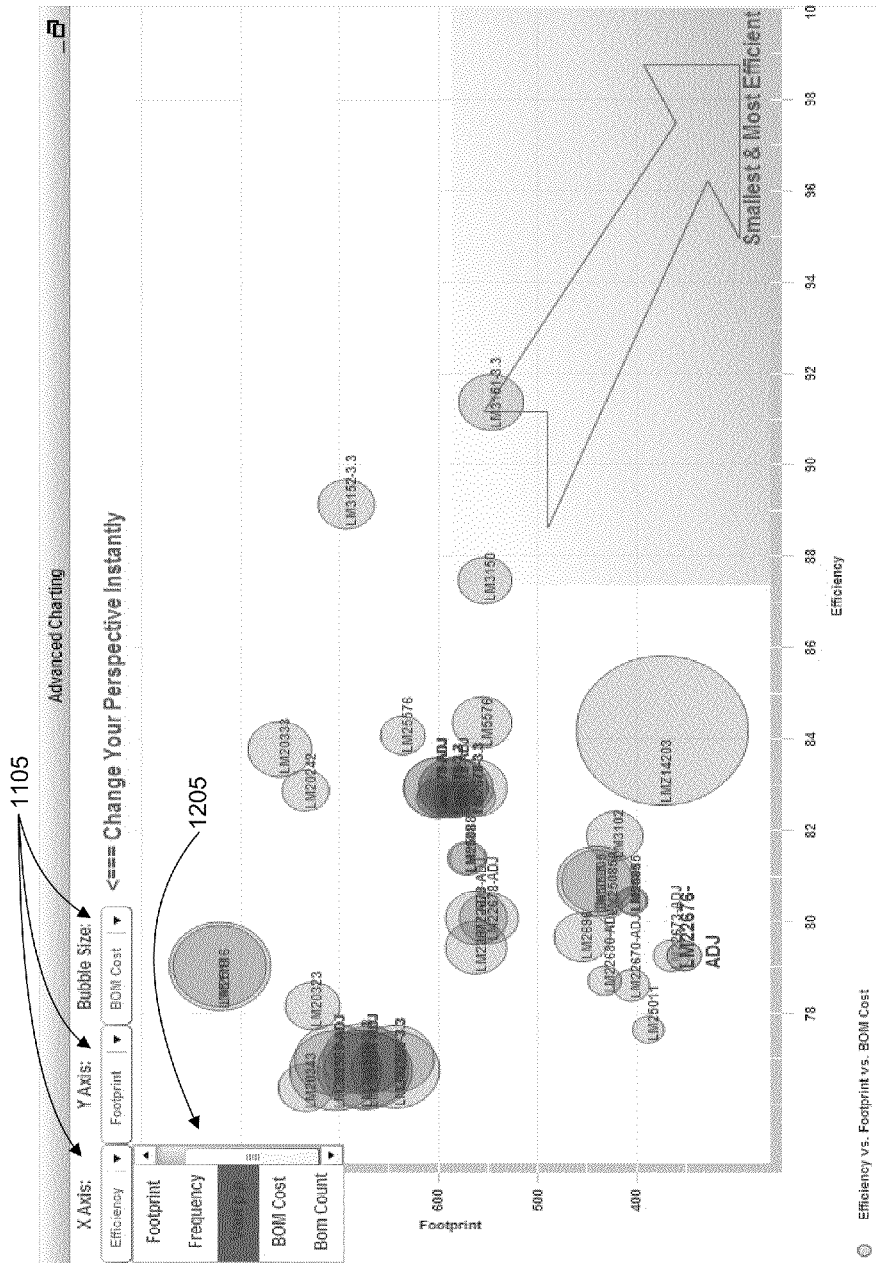
FIG. 12 illustrates an exemplary user interface for the selection of key parameters for the graphical display of generated power supply designs.

FIG. 12 illustrates an exemplary user interface 110-F for the selection of a key parameter 210 for the graphical display of generated power supply designs 125. In particular, FIG. 12 illustrates an exemplary selection of key parameters 210 for an axis of the graphical display control 715. Upon user selection of the illustrated X-axis dropdown control 1105, the graphical display control 715 may be configured to present a dropdown window 1205 including various key parameters 210 that may be visually represented in the graphical display control 715. Upon selection of one of the key parameters 210 from the dropdown window 1205, the graphical display control 715 may reconfigure the X-axis to represent design tradeoffs with respect to the newly selected key parameter 210.

Returning to FIG. 11, the graphical display control 715 may be configured to provide one or more predetermined key parameter selections 1110 of key parameters 210 to display. A predetermined key parameter selection 1110 is illustrated as providing for the visualization of efficiency vs. footprint vs. BOM cost. Upon selection of the predetermined key parameter selection 1110, the axes of the graphical display control 715 may quickly be reconfigured to represent design tradeoffs with respect to the indicated key parameters 210.

The graphical display control 715 may also be configured to provide for returning of the graphical display control 715 to a default configuration. Upon selection of a reset plot control 1115, the axes of the graphical display control 715 may quickly be reconfigured to represent design tradeoffs with respect to the default configuration.

In addition to representing various design tradeoffs among the various power supply designs 125 according to key parameters 210, the graphical display control 715 may further be configured to provide a recommended design indication 1120. The recommended design indication 1120 may highlight one of the plurality of power supply design 125 determined to embody a good tradeoff between the key parameters 210. The visualizer design tool application 160 may utilize the best results determination module 524 to determine the power supply design 125 from the set of power supply designs 125 as the design having the best ranking and thus to be highlighted by the recommended design indication 1120.

Based on the key parameters 210 represented by the axes of the graphical display control 715, the graphical display control 715 may further be configured to provide a preferred quadrant visualization 1125. The preferred quadrant visualization 1125 may indicate on the graphical display control 715 which power supply designs 125 provide a good tradeoff based on the key parameters 210 displayed by the graphical display control 715. Accordingly, the preferred quadrant visualization 1125 may provide an additional graphical way to view the tradeoffs between the power supply designs 125. In particular, the quadrant visualization 1125 may provide for the visualization of design tradeoffs based on the user-configurable key parameters 210 being displayed, not merely based on the design tradeoffs specified by the design requirements 130.

Figure 13:
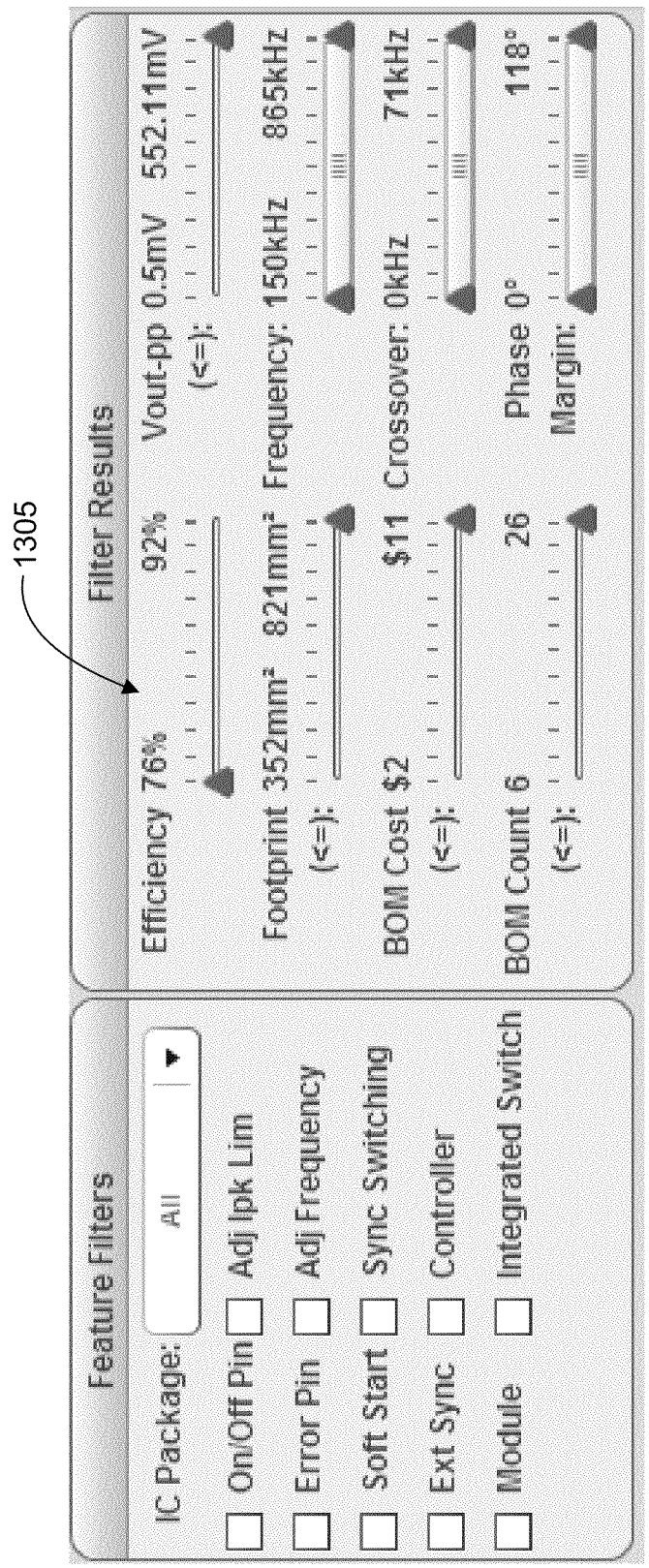
FIG. 13 illustrates an exemplary user interface for the filtering of power supply designs.

FIG. 13 illustrates an exemplary user interface 110-G for the filtering of power supply designs 125. The user interface 110-G may include filtering controls 1305 for specifying filter criteria to use when filtering a set of power supply designs 125. While the user interface 110-G is shown by itself in FIG. 13 to facilitate explanation, in many examples the user interface 110-G may be presented as a portion of the overall user interface 110-A of the visualizer design tool application 160 such as shown in user interface 110-A of FIG. 7.

The filtering may be performed by a design list filter module 530 of the visualizer design tool application 160, and may allow for filtering of the power supply designs 125 by the user device 105 according to filter criteria specified by filtering controls 1305. Because the filtering is performed based on the determined set of power supply designs 125 that form the universe of possible designs, filtering of the power supply designs 125 may be performed without requiring any additional database access or interaction with the data store 145. Thus, the filtering may be performed by a user device 105, without interaction with an application server 155.

For example, the filtering controls 1305 may allow a user to specify filter criteria including whether a power supply design 125 includes a power supply component 205 having features such as: on/off pin, error pin, soft start, external synchronization, module, adjustable primary leakage inductance limit, adjustable frequency, synchronized switching, controller, and integrated switch. As additional examples, the filtering controls 1305 may allow a user to specify filter criteria including minimum and maximum efficiency, minimum and maximum footprint, minimum and maximum BOM cost, minimum and maximum BOM count, maximum $V_{out}$ peak to peak ripple, minimum and maximum frequency, minimum and maximum crossover frequency, minimum and maximum phase margin.

As another example, while not shown in FIG. 13, the filtering controls 1305 may allow a user to specify filter criteria including a manufacturer and/or a channel supplier to use to filter the power supply designs 125. For instance, the filtering controls 1305 may provide a dropdown control including a list of manufacturers from which to select, and/or a dropdown control including a list of channel supplies from which to select. Upon selection of a manufacturer, the user device 105 may filter the power supply designs 125 to display designs only including parts made by the selected manufacturer. Upon selection of a channel supplier, the user device 105 may filter the presentation of power supply designs 125 by only the parts and manufacturers supplied by the selected channel supplier. The user may select different channel suppliers and thus compare the power supply designs 125 available from one channel supplier to the power supply designs 125 available through another.

It should be noted that in some examples, the visualizer design tool application 160 may be configured to pre-calculate power supply designs 125 optimized according to each of a plurality of sets of optimizations settings. Then, based on the input from a control providing for selection of one of the sets of optimization settings, the optimization control module 532 may be configured to cause the visualizer design tool application 160 to filter the displayed power supply designs 125 according to the particular optimization settings chosen by the user by way of the optimization control module 532.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
   a database configured to store information including characteristics of a plurality of components; and
   a server computing apparatus in communication with the database and configured to:
      receive design requirements indicative of a desired power supply design;
      query the database for a plurality of sets of components each corresponding to a power supply design that satisfies the design requirements;
      generate a plurality of power supply designs each satisfying the design requirements, including the associated components; and
      calculate the values for at least one key parameter of the generated power supply designs, such that the power supply designs are differentiated by the at least one key parameter;
      wherein the at least one key parameter is indicative of one of footprint, efficiency and a bill of materials cost; and
   wherein the respective values calculated for the at least one key parameter represent design tradeoffs for the power supply designs, each satisfying the design requirements.

2. The system of claim 1, further comprising a user computing apparatus in communication with the server computing apparatus, wherein the user computing apparatus is configured to:
   send the design requirements to the server computing apparatus in a request for power supply designs;
   receive the plurality of power supply designs from the server computing apparatus responsive to the request; and
   display selected ones of the plurality of power supply designs according to a display format that arranges multiple power supply designs according to the at least one key parameter.

3. The system of claim 1, wherein the power supply designs are ranked according to the at least one key parameter.

4. The system of claim 1, wherein the power supply designs are arranged for graphical display according to the at least one key parameter.

5. The system of claim 4, wherein the values for at least two key parameters are calculated and the power supply designs are differentiated based on the at least two key parameters, and wherein the power supply designs are arranged for graphical display according to a two-dimensional presentation corresponding to the at least two key parameters.

6. The system of claim 1, wherein the design requirements are indicative of an input voltage source to power the power supply designs and an output load voltage supplied by the power supply designs.

7. The system of claim 1, wherein at least two key parameters are calculated, and wherein the power supply designs are optimized according to the design tradeoffs represented by the at least two key parameters.

8. The system of claim 7, wherein optimizing the power supply designs includes:
   assigning relative weights and target values for the at least two key parameters-for each of the plurality of power supply designs;
   determining initial scores indicative of how close each of the at least two key parameters are to the respective target values for the at least two key parameters;
   calculating a weighted score for each key parameter based on the respective initial score and assigned weight; and
   calculating a final score for each power supply design based on the respective weighted scores for the at least two key parameters.

9. A method, comprising:
receiving, at a server computing apparatus design requirements indicative of a desired power supply design;
determining a plurality of sets of components each corresponding to a power supply design that satisfies the design requirements;
generating a plurality of power supply designs each satisfying the design requirements, including the associated components that satisfy the design requirements;
calculating the values for at least one key parameter of the generated power supply designs such that these power supply designs are differentiated by the at least one key parameter, wherein the at least one key parameter is indicative of one of footprint, efficiency and a bill of materials cost; and wherein the respective values calculated for the at least one key parameter represent design tradeoffs for the power supply designs, each satisfying the design requirements; and
communicating the generated power supply designs responsive to the request.

10. The method of claim 9, wherein the power supply designs are differentiated based on at least two key parameters, and wherein the power supply designs are arranged for graphical display according to a two-dimensional presentation corresponding to the values of the at least two key parameters.

11. The method of claim 9, wherein the design requirements are indicative of an input voltage source to power the power supply designs and an output load voltage supplied by the power supply designs.

12. The method of claim 9, wherein at least two key parameters are calculated, and further comprising optimizing the power supply designs according to the design tradeoffs represented by the at least two key parameters.

13. The method of claim 12, wherein optimizing the power supply designs comprises:
assigning relative weights and target values for the at least two key parameters of the power supply designs;
calculating initial scores for each of the key parameters, where the closer the value calculated for a key parameter is to the corresponding target value, the higher the score for that key parameter;
calculating a weighted score for each key parameter based on the respective initial score and assigned weight;
determining final scores for each power supply design based on the respective weighted scores for the at least two key parameters.

14. A method, comprising:
sending, from a user computing apparatus to a server computing apparatus, a request including design requirements indicative of a desired power supply design;
receiving, by the user computing apparatus, a plurality of power supply designs responsive to the request, each satisfying the design requirements, and each power supply design being characterized by:
the design requirements;
associated components that satisfy the design requirements; and
calculated values for at least one key parameter of the power supply designs such that the power supply designs are differentiated by the at least one key parameter, and
wherein the at least one key parameter is indicative of one of footprint, efficiency and a bill of materials cost; and
wherein the respective values calculated for the at least one key parameter represent design tradeoffs for the power supply designs, each satisfying the design requirements; and
displaying the plurality of power supply designs according to a selected display format.

15. The method of claim 14, wherein the power supply designs are differentiated based on at least two key parameters, and wherein the power supply designs are graphically displayed according to a two-dimensional presentation corresponding to the values of the at least two key parameters.

16. The method of claim 14, wherein the design requirements are indicative of an input voltage source to power the power supply designs and an output load voltage to be supplied by the power supply.

17. The method of claim 14, wherein at least two key parameters are calculated, and wherein the received power supply designs are optimized by:
assigning relative weights and target values for the at least two key parameters of the power supply designs;
calculating initial scores for each of the key parameters, where the closer the value calculated for a key parameter is to the corresponding target value, the higher the score for that key parameter;
calculating a weighted score for each key parameter based on the respective initial score and assigned weight;
determining final scores for each power supply design based on the respective weighted scores for the at least two key parameters.

* * * * *